US012627048B2

(12) United States Patent
Wu et al.

(10) Patent No.: US 12,627,048 B2
(45) Date of Patent: May 12, 2026

(54) ANTENNA UNIT AND MULTI-BEAM ANTENNA

(71) Applicants: Beijing BOE Technology Development Co., Ltd., Beijing (CN); BOE TECHNOLOGY GROUP CO., LTD., Beijing (CN)

(72) Inventors: Qianhong Wu, Beijing (CN); Jingwen Guo, Beijing (CN); Chunxin Li, Beijing (CN); Jianxing Liu, Beijing (CN); Zibo Cao, Beijing (CN); Jianyun Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 234 days.

(21) Appl. No.: 18/642,107

(22) Filed: Apr. 22, 2024

(65) Prior Publication Data

US 2024/0313399 A1 Sep. 19, 2024

Related U.S. Application Data

(63) Continuation of application No. PCT/CN2023/082084, filed on Mar. 17, 2023.

(51) Int. Cl.
*H01Q 3/46* (2006.01)
*H01Q 9/04* (2006.01)

(52) U.S. Cl.
CPC ............ *H01Q 3/46* (2013.01); *H01Q 9/0414* (2013.01)

(58) Field of Classification Search
CPC ....... H01Q 3/46; H01Q 9/0414; H01Q 21/065
See application file for complete search history.

(56) References Cited

U.S. PATENT DOCUMENTS

| | | | | |
|---|---|---|---|---|
| 2020/0036103 A1* | 1/2020 | Ariumi | .................. | H01Q 21/24 |
| 2022/0158342 A1* | 5/2022 | Kausar | ...................... | H01Q 3/24 |

FOREIGN PATENT DOCUMENTS

| | | |
|---|---|---|
| CN | 108767493 A | 11/2018 |
| CN | 109560374 A | 4/2019 |
| CN | 109888480 A | 6/2019 |
| CN | 112670715 A | 4/2021 |
| CN | 212968071 U | 4/2021 |
| CN | 113097733 A | 7/2021 |

* cited by examiner

*Primary Examiner* — Minh Tran
(74) *Attorney, Agent, or Firm* — WHDA, LLP

(57) ABSTRACT

The present disclosure provides an antenna unit and a multi-beam antenna. The antenna unit includes: a first dielectric substrate; a reference electrode layer; a first feed line and a radiation layer, the first feed line being electrically coupled to the radiation layer; and at least one layer of metasurface including a second dielectric substrate and at least one patch unit, the patch unit including a plurality of patch structures arranged at intervals and side by side. For any one of the patch units, an electromagnetic wave radiated by the radiation layer has different transmission phases after passing through the plurality of patch structures, and transmission phases of the plurality of patch structures increase or decrease sequentially.

20 Claims, 70 Drawing Sheets

Realized Gain Plot 2

Realized Gain Plot 2

Realized Gain Plot 2

Port3

Realized Gain Plot 2

Port3

Realized Gain Plot 2

Realized Gain Plot 2

Port3

ANTENNA UNIT AND MULTI-BEAM ANTENNA

CROSS-REFERENCE TO RELATED APPLICATIONS

This application is a continuation application of the PCT application No. PCT/CN2023/082084 filed on Mar. 17, 2023, which is incorporated herein by reference in its entirety.

TECHNICAL FIELD

The present disclosure relates to the field of communications technology, in particular to an antenna unit and a multi-beam antenna.

BACKGROUND

Antennae include omnidirectional antennae and directional antennae, depending on radiation characteristics. The omnidirectional antenna has a wide coverage range, but a gain in each direction is low. The directional antenna has high-gain radiation in a specified direction, and the higher the gain, the narrower the radiation beam width. Each of the two types of radiating antennae has a single function, and it is impossible to meet the diverse requirements on a modern communication system. Hence, the design of a multi-beam antenna is of great significance.

Common implementation schemes for the multi-beam antenna include matrix beamforming schemes. For example, multiple beams are generated through Butler matrix multi-port feeding, or a plurality of feed sources is arranged on a surface of lens, e.g., Luneberg lens, so as to generate beams in different directions. For the former, a feeding network is complex; and for the latter, a three-dimensional (3D) printing technology needs to be adopted, so a manufacturing process is relatively difficult.

SUMMARY

An object of the present disclosure is to provide an antenna unit and a multi-beam antenna, so as to at least solve one of the technical problems in the related art.

In a first aspect, the present disclosure provides in some embodiments an antenna unit, including: a first dielectric substrate having a first surface and a second surface arranged opposite to the first surface; a reference electrode layer arranged at a side of the second surface away from the first surface; a first feed line and a radiation layer arranged at a side of the second surface away from the first surface, the first feed line being electrically coupled to the radiation layer; and at least one layer of metasurface including a second dielectric substrate and at least one patch unit, the second dielectric substrate having a third surface and a fourth surface arranged opposite to the third surface, the second surface being arranged opposite to the third surface, the patch unit being arranged at a side of the fourth surface away from the third surface, and the patch unit including a plurality of patch structures arranged at intervals and side by side. For any one of the patch units, an electromagnetic wave radiated by the radiation layer has different transmission phases after passing through the plurality of patch structures, and transmission phases of the plurality of patch structures increase or decrease sequentially.

In a possible embodiment of the present disclosure, for any one of the patch units, an electromagnetic wave radiated by the radiation layer has an equal phase difference after passing through adjacent patch structures.

In a possible embodiment of the present disclosure, the plurality of patch structures on the metasurface is arranged in an array form, the patch units are arranged side by side in a row direction, and the plurality of patch structures arranged side by side in the row direction has an equal transmission phase for the electromagnetic wave.

In a possible embodiment of the present disclosure, the plurality of patch structures on the metasurface is arranged in an array form, the patch units are arranged side by side in a column direction, and the plurality of patch structures arranged side by side in the column direction has an equal transmission phase for the electromagnetic wave.

In a possible embodiment of the present disclosure, the patch structure includes a first sub-patch, a second sub-patch, a third sub-patch, a fourth sub-patch, a fifth sub-patch, and a sixth sub-patch; the first sub-patch and the second sub-patch are arranged in a crosswise manner; orthogonal projections of the third sub-patch, the fourth sub-patch, the fifth sub-patch and the sixth sub-patch onto the first dielectric substrate are all of an annular-sector shape; each of the orthogonal projections of the third sub-patch, the fourth sub-patch, the fifth sub-patch and the sixth sub-patch onto the first dielectric substrate has a first arc edge and a second arc edge arranged opposite to the first arc edge, and the first arc edges of the orthogonal projections of the third sub-patch, the fourth sub-patch, the fifth sub-patch and the sixth sub-patch onto the first dielectric substrate are located on a same circle, and the second arc edges of orthogonal projections of the third sub-patch, the fourth sub-patch, the fifth sub-patch and the sixth sub-patch onto the first dielectric substrate are located on a same circle; and two ends of the first sub-patch are respectively coupled to the third sub-patch and the fourth sub-patch, and two ends of the second sub-patch are respectively coupled to the fifth sub-patch and the sixth sub-patch.

In a possible embodiment of the present disclosure, a spacing between the third sub-patch and the fifth sub-patch is a first spacing, a spacing between the third sub-patch and the sixth sub-patch is a second spacing, a spacing between the fourth sub-patch and the fifth sub-patch is a third spacing, a spacing between the fourth sub-patch and the sixth sub-patch is a fourth spacing, and values of the first spacing, the second spacing, the third spacing and the fourth spacing are equal.

In a possible embodiment of the present disclosure, the radiation layer is formed integrally with the first feed line.

In a possible embodiment of the present disclosure, there is a plurality of metasurfaces, a spacing is provided between adjacent metasurfaces, and the patch structures in the metasurfaces are arranged in a one-to-one manner.

In a second aspect, the present disclosure provides in some embodiments a multi-beam antenna, including a plurality of the above-mentioned antenna units. At least two of the antenna units have different feed directions.

In a possible embodiment of the present disclosure, the multi-beam antenna includes four antenna units arranged in an array form and having different feed directions.

In a possible embodiment of the present disclosure, a coordinate system is established with a center of the multi-beam antenna as an origin, a row direction as an X-axis, a column direction as a Y-axis, and a thickness direction of the multi-beam antenna as a Z-axis; and two of the plurality antenna units arranged adjacent to each other in the row or column direction are arranged rotationally symmetrical with each other about the Z-axis.

In a possible embodiment of the present disclosure, a coordinate system is established with a center of the multi-beam antenna as an origin, a row direction as an X-axis, a column direction as a Y-axis, and a thickness direction of the multi-beam antenna as a Z-axis; and two of the plurality antenna units arranged adjacent to each other in the row or column direction are arranged symmetrical with each other about a plane formed by the Y-axis, the origin, and the Z-axis.

DETAILED DESCRIPTION

In order to make the objects, the technical solutions and the advantages of the present disclosure more apparent, the present disclosure will be described hereinafter in a clear and complete manner in conjunction with the drawings and embodiments.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, any two of the following X-axis, Y-axis and Z-axis are perpendicular to each other, a Z-axis direction refers to a thickness direction of a first dielectric substrate, one of X-axis and Y-axis directions is a horizontal direction, and the other is a vertical direction. The following description will be given when the X-axis direction is the horizontal direction and the Y-axis direction is the vertical direction.

Figure 1:
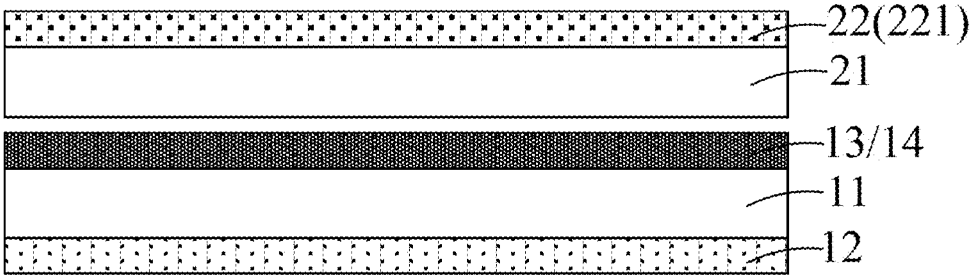
FIG. 1 is a sectional view of an antenna unit according to one embodiment of the present disclosure.
Figure 2:
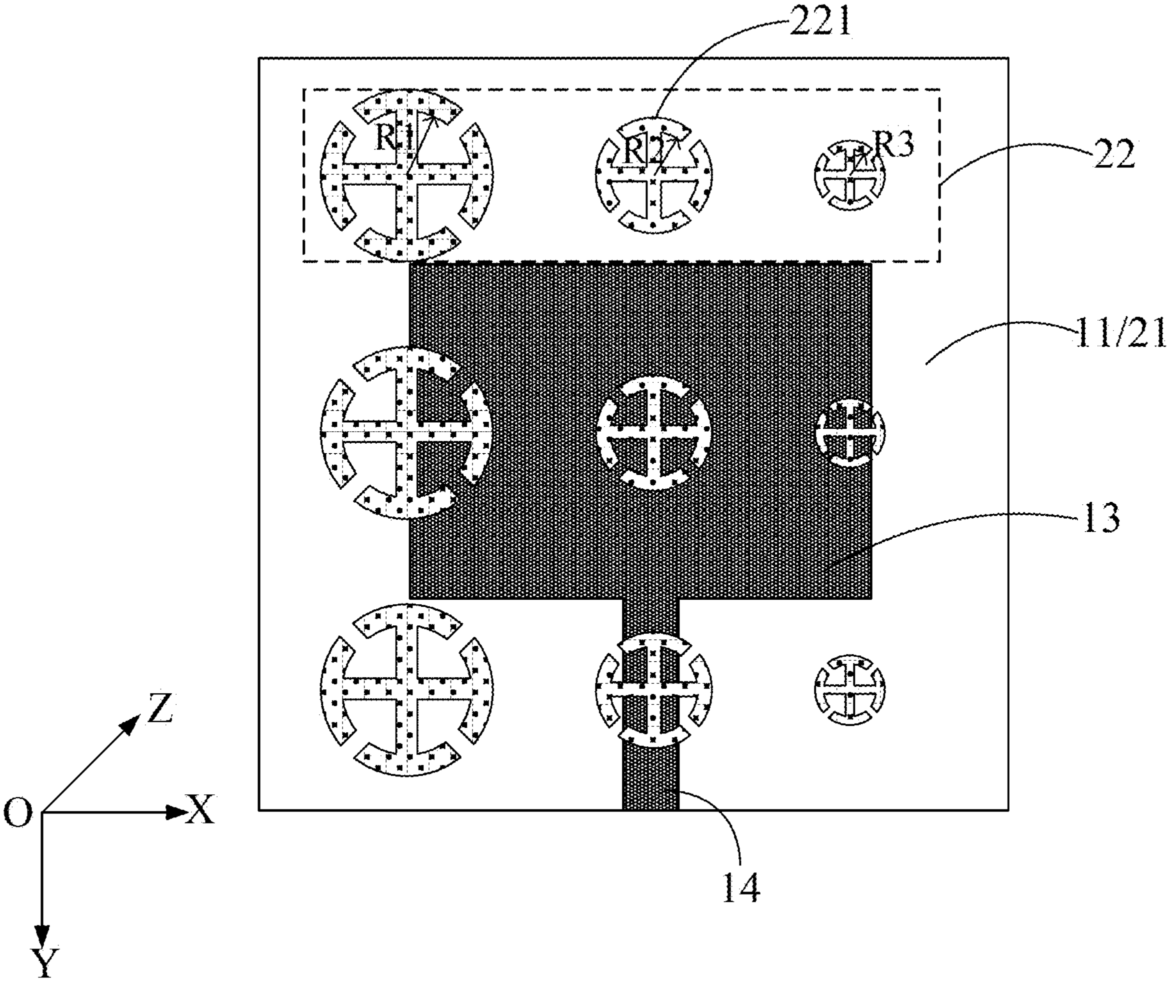
FIG. 2 is a top view of the antenna unit according to one embodiment of the present disclosure.
Figure 3:
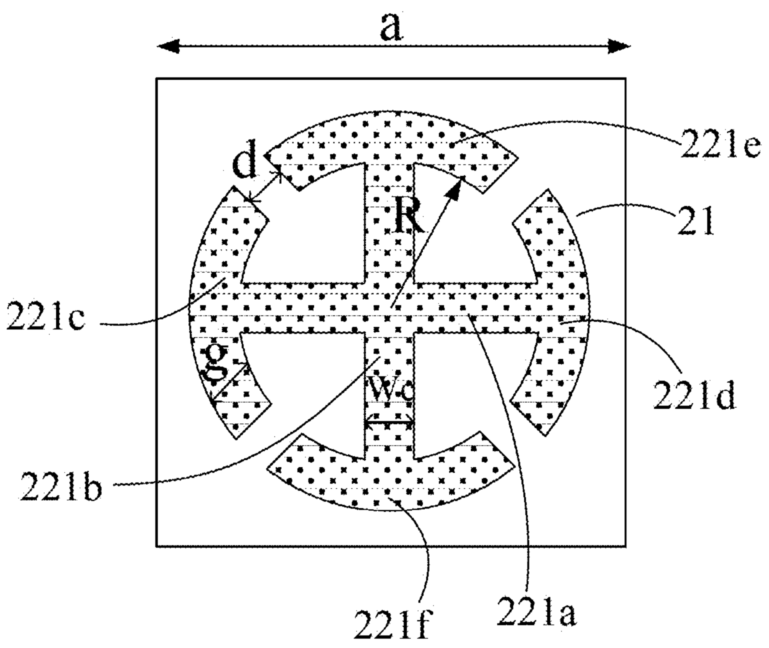
FIG. 3 is a top view of a patch structure of the antenna unit according to one embodiment of the present disclosure.
Figure 4:
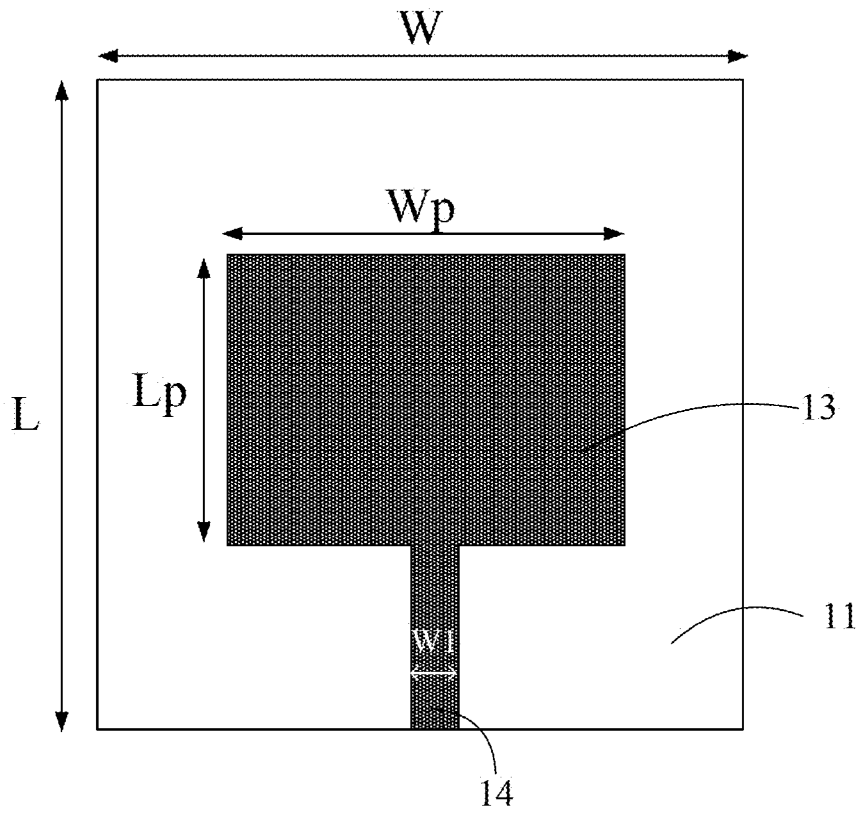
FIG. 4 is a top view of a radiation layer and a first feed line of the antenna unit according to one embodiment of the present disclosure.

FIG. 1 is a sectional view of an antenna unit according to one embodiment of the present disclosure, FIG. 2 is a top view of the antenna unit according to one embodiment of the present disclosure, FIG. 3 is a top view of a patch structure 221 of the antenna unit according to one embodiment of the present disclosure, and FIG. 4 is a top view of a radiation layer 13 and a first feed line 14 of the antenna unit according to one embodiment of the present disclosure. As shown in FIG. 1 to FIG. 4, the antenna unit in the embodiments of the present disclosure includes a first dielectric substrate 11, a reference electrode layer 12, a first feed line 14, the radiation layer 13 and at least one layer of metasurface. The metasurface includes a second dielectric substrate 21 and at least one patch unit 22. The first dielectric substrate 11 has a first surface and a second surface arranged opposite to the first surface. The second dielectric substrate 21 has a third surface and a fourth surface arranged opposite to the third surface. The second surface and the third surface are arranged opposite to each other. The reference electrode layer 12 is arranged at a side of the second surface away from the first surface. The first feed line 14 is electrically coupled to the radiation layer 13. The first feed line 14 and radiation layer 13 are arranged between the second surface and the third surface. The patch unit 22 is arranged on the fourth surface, and includes a plurality of patch structures 221 arranged at intervals and side by side. For any one of the patch units 22, an electromagnetic wave radiated by the radiation layer 13 has different transmission phases after passing through the plurality of patch structures 221, and transmission phases of the plurality of patch structures increase or decrease sequentially. It should be appreciated that, the phase adjustment of the electromagnetic wave is not achieved through the patch structures 221 individually, but through metasurface units formed by the patch structures 221 and the corresponding second dielectric substrate 21. In other words, each patch unit 22 corresponds to multiple metasurface units formed by the metasurface. At a position where each patch unit 22 is located, the electromagnetic wave radiated by the radiation layer 13 has different transmission phases after passing through the metasurface units.

It should be appreciated that, in FIG. 2, the antenna unit includes three patch units 22, and each patch unit 22 includes three patch structures 221, i.e., the antenna unit includes 3×3 patch structures 221. However, the quantity of patch structures 221 in the antenna unit will not be limited thereto. The reference electrode layer 12 includes but not limited to a ground layer. In the embodiments of the present disclosure, the description will be given by merely taking the ground layer as the reference electrode layer 12.

According to the antenna unit in the embodiments of the present disclosure, the metasurface is provided, and the patch structures 221 in the patch unit 22 on the metasurface are designed in such a manner that the patch structures 221 have different transmission phases for the electromagnetic wave. As a result, it is able for an antenna including the antenna unit to control a beam direction.

In some embodiments of the present disclosure, for any one of the patch units 22, the electromagnetic wave radiated by the radiation layer 13 has an equal phase difference after passing through the plurality of patch structures 221 arranged adjacent to each other. For example, as shown in FIG. 2, a phase difference of the electromagnetic wave passing through a first patch structure 221 and a second patch structure 221, as viewed from left to right, is equal to a phase difference of the electromagnetic wave passing through the second patch structure 221 and a third patch structure 221.

In some embodiments of the present disclosure, referring to FIG. 3, the patch structure 221 includes a first sub-patch 221*a*, a second sub-patch 221*b*, a third sub-patch 221*c*, a fourth sub-patch 221*d*, a fifth sub-patch 221*e*, and a sixth sub-patch 221*f*. The first sub-patch 221*a* and the second sub-patch 221*b* are arranged in a crosswise manner. For example, the first sub-patch 221*a* and the second sub-patch 221*b* are arranged in a vertically crosswise manner. Orthogonal projections of the third sub-patch 221*c*, the fourth sub-patch 221*d*, the fifth sub-patch 221*e* and the sixth sub-patch 221*f* onto the first dielectric substrate 11 are each of an annular-sector shape. Each of the orthogonal projections of the third sub-patch 221*c*, the fourth sub-patch 221*d*, the fifth sub-patch 221*e* and the sixth sub-patch 221*f* onto the first dielectric substrate has a first arc edge and a second arc edge arranged opposite to the first arc edge. The first arc edges of the orthogonal projections of the third sub-patch 221*c*, the fourth sub-patch 221*d*, the fifth sub-patch 221*e* and the sixth sub-patch 221*f* onto the first dielectric substrate are located on a same circle. The second arc edges of the orthogonal projections of the third sub-patch 221*c*, the fourth sub-patch 221*d*, the fifth sub-patch 221*e* and the sixth sub-patch 221*f* onto the first dielectric substrate 11 are located on a same circle. Two ends of the first sub-patch 221*a* are respectively coupled to the third sub-patch 221*c* and the fourth sub-patch 221*d*, and two ends of the second sub-patch 221*b* are respectively coupled to the fifth sub-patch 221*e* and the sixth sub-patch 221*f*. In other words, a center of an intersection of the first sub-patch 221*a* and the second sub-patch 221*b* is a first center. An orthogonal projection of the first center onto the first dielectric substrate 11 is spaced apart from any point on the first arc edge of the orthogonal projection of the third sub-patch 221*c* onto the first dielectric substrate 11 by a first distance. The orthogonal projection of the first center onto the first dielectric substrate 11 is spaced apart from any point on the first arc edge of the orthogonal projection of the fourth sub-patch 221*d* onto the first dielectric substrate 11 by a second distance. The orthogonal projection of the first center onto the first dielectric substrate 11 is spaced apart from any point on the first arc edge of the orthogonal projection of the fifth sub-patch 221*e* onto the first dielectric substrate 11 by a third distance. The orthogonal projection of the first center onto the first dielectric substrate 11 is spaced apart from any point on the first arc edge of the orthogonal projection of the sixth sub-patch 221*f* onto the first dielectric substrate 11 by a fourth distance. Values of the first distance, the second distance, the third distance and the fourth distance are equal. For each patch structure 221, the value of the first distance determines a size of a circular opening defined by each patch structure 221, i.e., a phase of an electromagnetic wave signal passing through the patch structure 221.

Furthermore, for each patch structure 221, a spacing between the third sub-patch 221*c* and the fifth sub-patch 221*e* is a first spacing, a spacing between the third sub-patch 221*c* and the sixth sub-patch 221*f* is a second spacing, a spacing between the fourth sub-patch 221*d* and the fifth sub-patch 221*e* is a third spacing, and a spacing between the fourth sub-patch 221*d* and the sixth sub-patch 221*f* is a fourth spacing. Values of the first spacing, the second spacing, the third spacing and the fourth spacings are equal.

In some embodiments of the present disclosure, the patch structure 221 is not limited to the above-mentioned structure, and it may also have a double-ring opened-loop structure defined by the sub-patches. Of course, apart from defining the above-mentioned circular, opened loop, the patch structure 221 may also define an opened loop in a rectangular or triangular shape or the like. In the embodiments of the present disclosure, the description will be given when the patch structure 221 has the above-mentioned structure.

Figure 5:
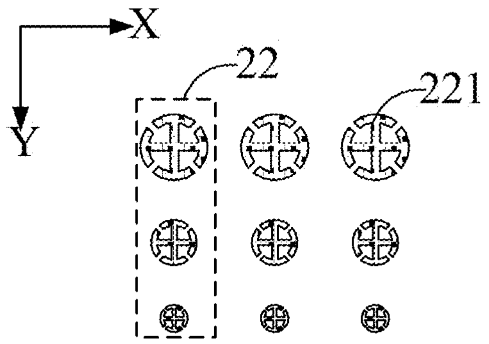
FIG. 5 is a schematic view showing the arrangement of a patch structure in a metasurface according to one embodiment of the present disclosure.
Figure 6:
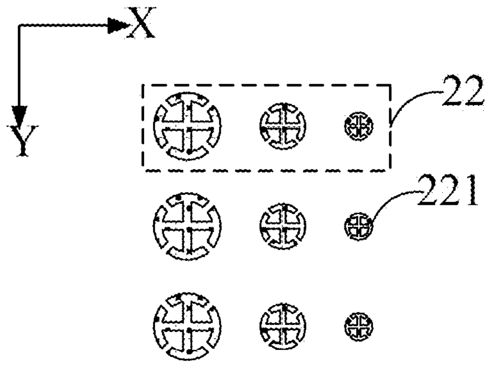
FIG. 6 is another schematic view showing the arrangement of the patch structure in the metasurface according to one embodiment of the present disclosure.

In some embodiments of the present disclosure, FIG. 5 is a schematic view showing the arrangement of the patch structure 221 in the metasurface according to one embodiment of the present disclosure. As shown in FIG. 5, when the patch structures 221 in the metasurface are arranged in an array form and the patch units 22 are arranged in a row direction (i.e., from left to right), the patch structures 221 in a same row (from left to right) have a same size, that is, the patch structures 221 in the same row have a same transmission phase for the electromagnetic wave. FIG. 6 is another schematic view showing the arrangement of the patch structure in the metasurface according to one embodiment of the present disclosure. As shown in FIG. 6, when the patch structures 221 in the metasurface are arranged in an array form and the patch units 22 are arranged in a column direction (i.e., from top to bottom), the patch structures 221 in a same column (from top to bottom) has a same size, that is, the patch structures 221 in the same column have a same transmission phase for the electromagnetic wave.

In some embodiments of the present disclosure, as shown in FIG. 4, the radiation layer 13 is formed integrally with the first feed line 14, i.e., the radiation layer 13 and the first feed line 14 are arranged at a same layer. In this way, it is able to effectively reduce an insertion loss. The first feed line 14 is specifically a microstrip line.

In some embodiments of the present disclosure, there is a plurality of metasurfaces. For example, there are two layers of metasurfaces, and at this time, the patch structures 221 of the two layers of the metasurfaces are arranged in a one-to-one manner, i.e., the two layers of the metasurfaces are two completely identical structures.

In some embodiments of the present disclosure, a material of each of the first dielectric substrate 11 and the second dielectric substrate 21 is FR4, glass, polyethylene terephthalate (PET), or polyimide (PI). In the following simulation experiments, the materials of the first dielectric substrate 11 and the second dielectric substrate 21 are FR4.

In some embodiments of the present disclosure, a material of each of the radiation layer 13, the first feed line 14 and the metasurface is metal, which includes but not limited to copper.

In order to clarify the performance of the antenna unit in the embodiments of the present disclosure, the performance of the antenna unit will be described hereinafter through simulation in accordance with the specific materials and sizes of the first dielectric substrate 11, the second dielectric substrate 21, the radiation layer 13, the first feed line 14 and the metasurface.

Referring to FIGS. 1 to 4, the antenna unit includes the first dielectric substrate 11, the second dielectric substrate 21, the reference electrode layer 12, the first feed line 14, the radiation layer 13 and the metasurface. The metasurface includes three patch units 22, and each patch unit 22 includes three patch structures 221, i.e., the metasurface includes 3×3 patch structures 221. Each patch structure 221 of the patch unit 22 includes the above-mentioned first sub-patch 221*a*, second sub-patch 221*b*, third sub-patch 221*c*, fourth sub-patch 221*d*, fifth sub-patch 221*e* and sixth sub-patch 221*f*. The first distances for the three patch structures 221 of each patch unit 22 are R1, R2, and R3, respectively. The material of each patch structure 221 is metal, such as copper. The first sub-patch 221*a* and the second sub-patch 221*b* of each patch structure 221 have a same size (equal length and width). A width of the first sub-patch 221*a* is Wc, widths of the third sub-patch 221*c*, fourth sub-patch 221*d*, fifth sub-patch 221*e* and sixth sub-patch 221*f* are g, and the first spacing is d. The materials of the first feed line 14 and the radiation layer 13 are metal, such as copper. A width of the first feed line 14 is W1, and a thickness of each of the first sub-patch 221*a*, the second sub-patch 221*b*, the third sub-patch 221*c*, the fourth sub-patch 221*d*, the fifth sub-patch 221*e*, the sixth sub-patch 221*f*, the radiation layer 13 and the first feed line 14 is D. A width of the first dielectric substrate 11 is W and a length of the first dielectric substrate 11 is L. A width of the first dielectric substrate 11 corresponding to each patch structure 221 is a, a width of the radiation layer 13 is Wp, and a length of the radiation layer 13 is Lp. The width Wp and length Lp of the radiation layer 13 depend on a working frequency band of the antenna unit, where a=14 mm, wc=1 mm, g=1 mm, d=1 mm, D=17 μm. A material of each of the first dielectric substrate 11 and the second dielectric substrate 21 is FR4, a dielectric constant is 4.4, a loss tangent is 0.02, and a thickness is 1.6 mm. L=W=42 mm, Lp=17 mm, Wp=30 mm, and W1=3.1 mm. A spacing hg between the radiation layer 13 and the metasurface is 10 mm.

Figure 7:
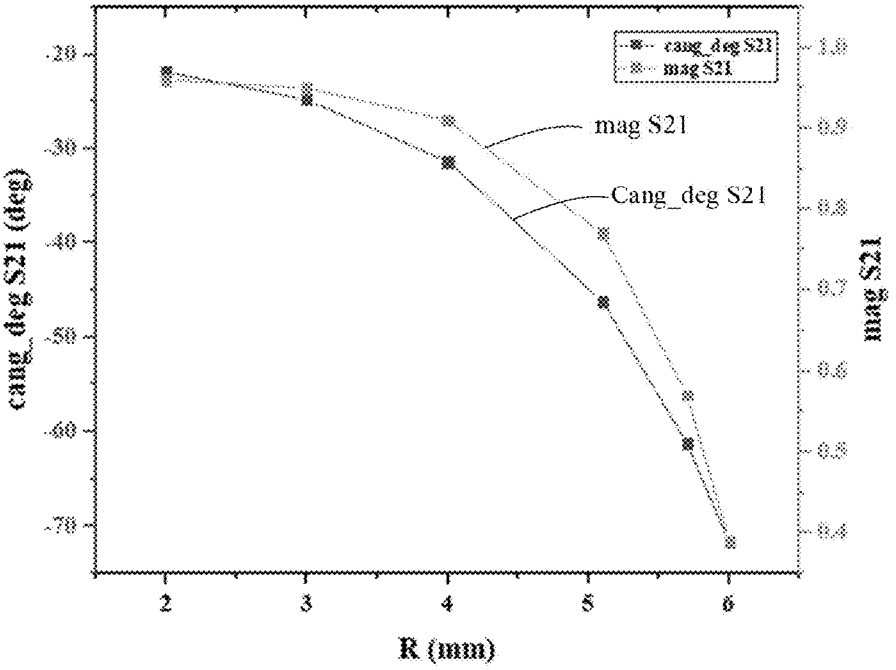
FIG. 7 is a curve diagram showing a simulation result of changes of a transmission intensity and a phase of a metasurface unit along with a first distance R according to one embodiment of the present disclosure.
Figure 8:
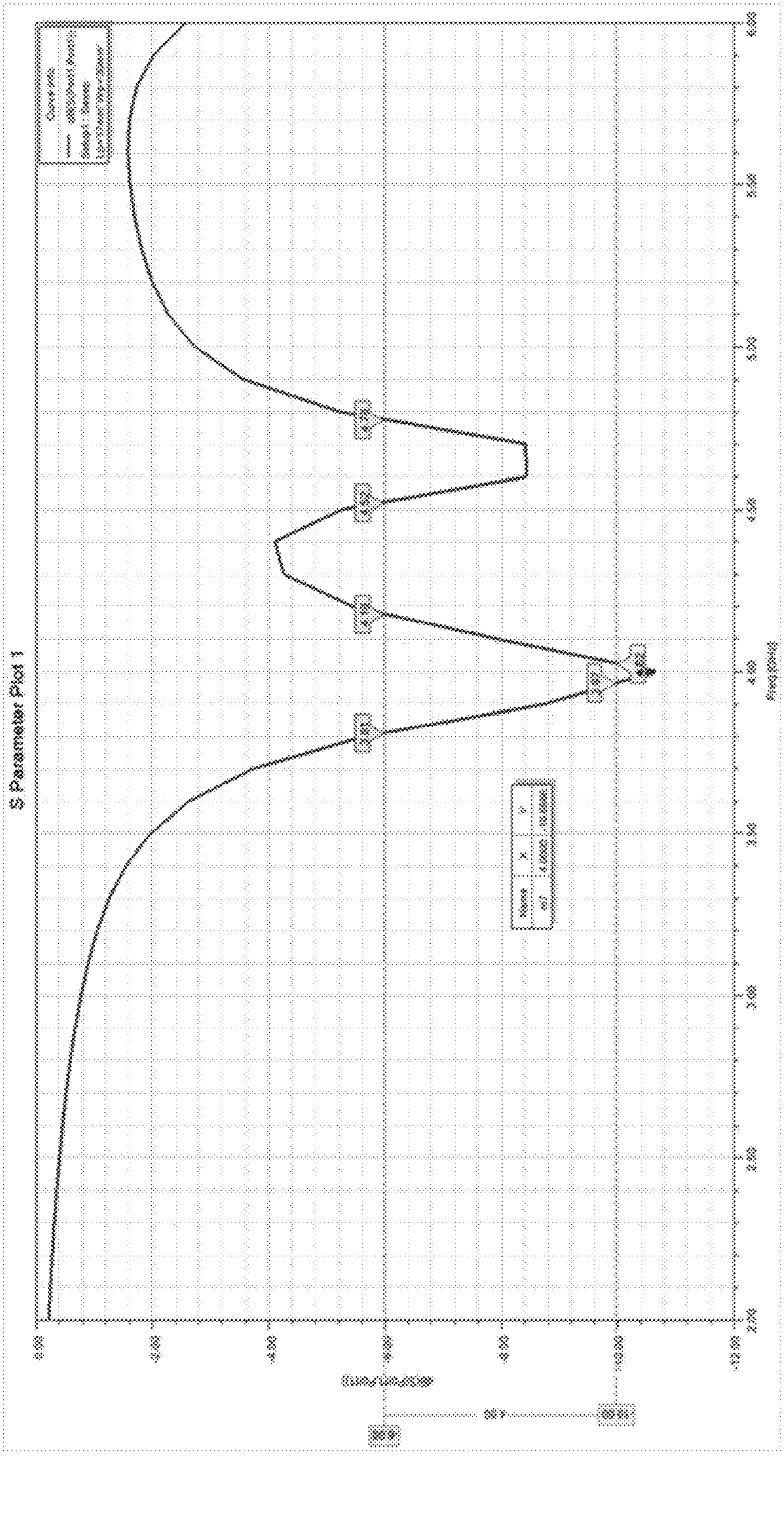
FIG. 8 is a simulation diagram of an S parameter of a metasurface-free antenna unit merely with a microstrip therebelow according to one embodiment of the present disclosure.
Figure 9:
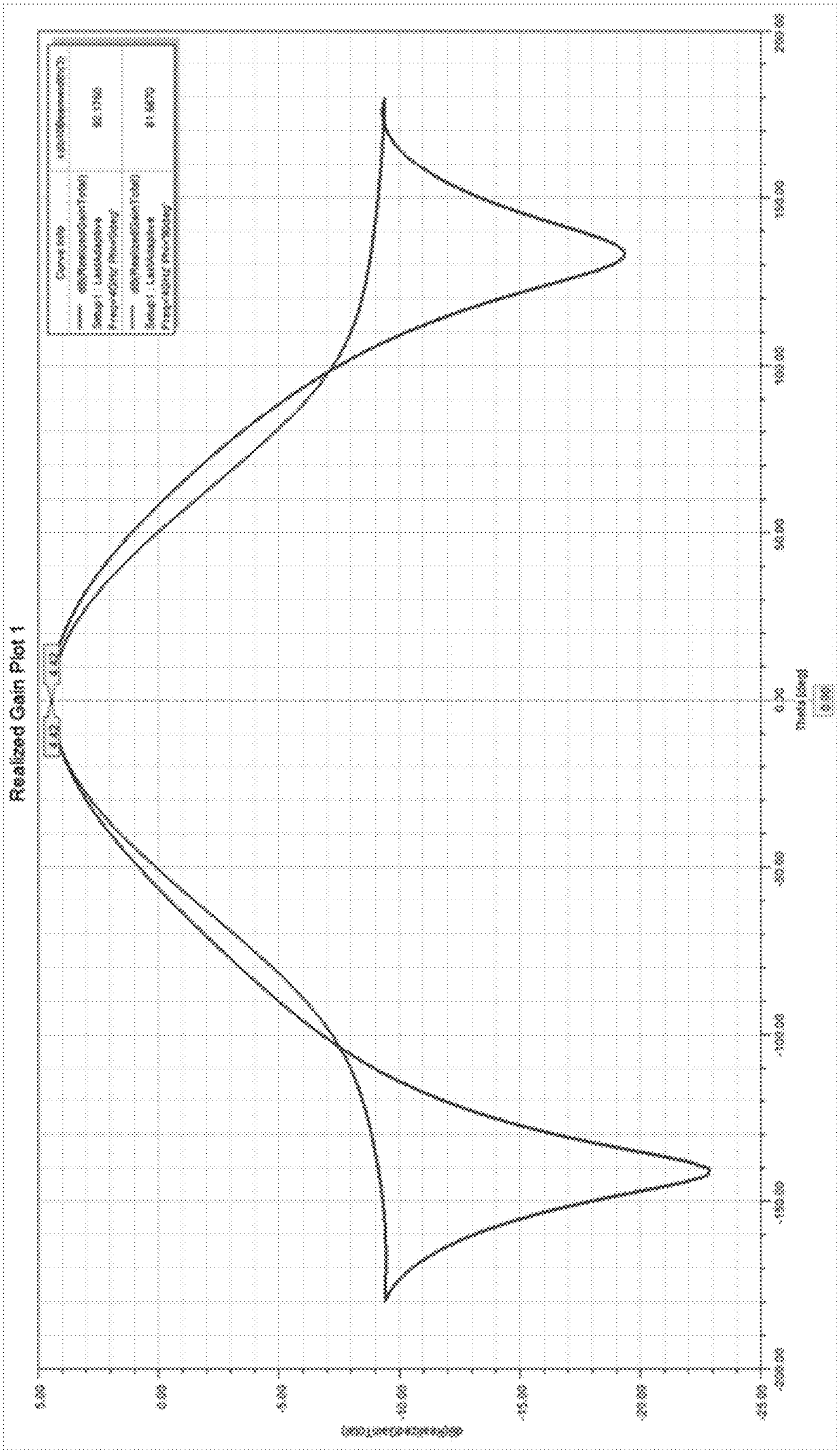
FIG. 9 is a two-dimensional simulation diagram of the metasurface-free antenna unit merely with a microstrip therebelow at 4 GHz according to one embodiment of the present disclosure.
Figure 10:
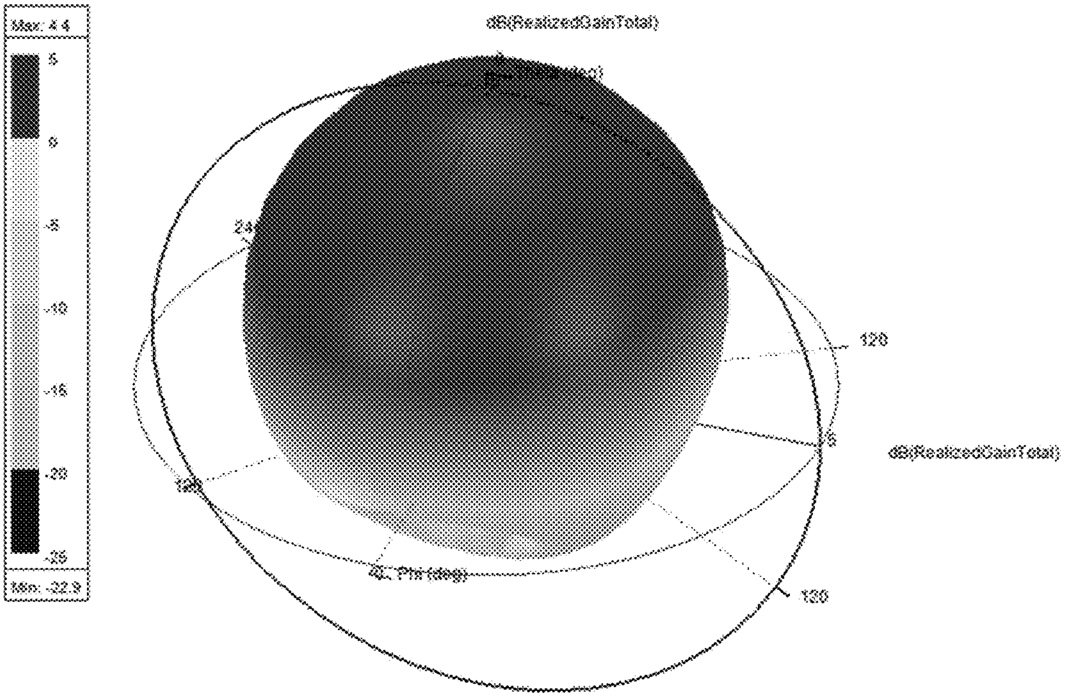
FIG. 10 is a three-dimensional simulation diagram of the metasurface-free antenna unit merely with a microstrip therebelow at 4 GHz according to one embodiment of the present disclosure.

FIG. 7 is a is a curve diagram showing a simulation result of changes of a transmission intensity and a phase of a metasurface unit along with the first distance R according to one embodiment of the present disclosure, FIG. 8 is a simulation diagram of an S parameter of a metasurface-free antenna unit merely with a microstrip therebelow according to one embodiment of the present disclosure, FIG. 9 is a two-dimensional simulation diagram of the metasurface-free antenna unit merely with a microstrip therebelow at 4 GHz according to one embodiment of the present disclosure, and FIG. 10 is a three-dimensional simulation diagram of the metasurface-free antenna unit merely with a microstrip therebelow at 4 GHz according to one embodiment of the present disclosure. As shown in FIGS. 7 to 10, one of center frequencies of the microstrip antenna is 4 GHz; for S11≤−6 dB, working frequency bands are 3.81 GHz to 4.18 GHz and 4.52 GHz to 4.78 GHz; and for S11≤−10 dB, a working frequency band is 3.97 GHz to 4.02 GHz. A maximum gain of the antenna at 4 GHz is 4.42 dBi, a 3 dB beam width is 92°/82°, and a maximum radiation direction of the antenna unit is the Z-axis.

Figure 11:
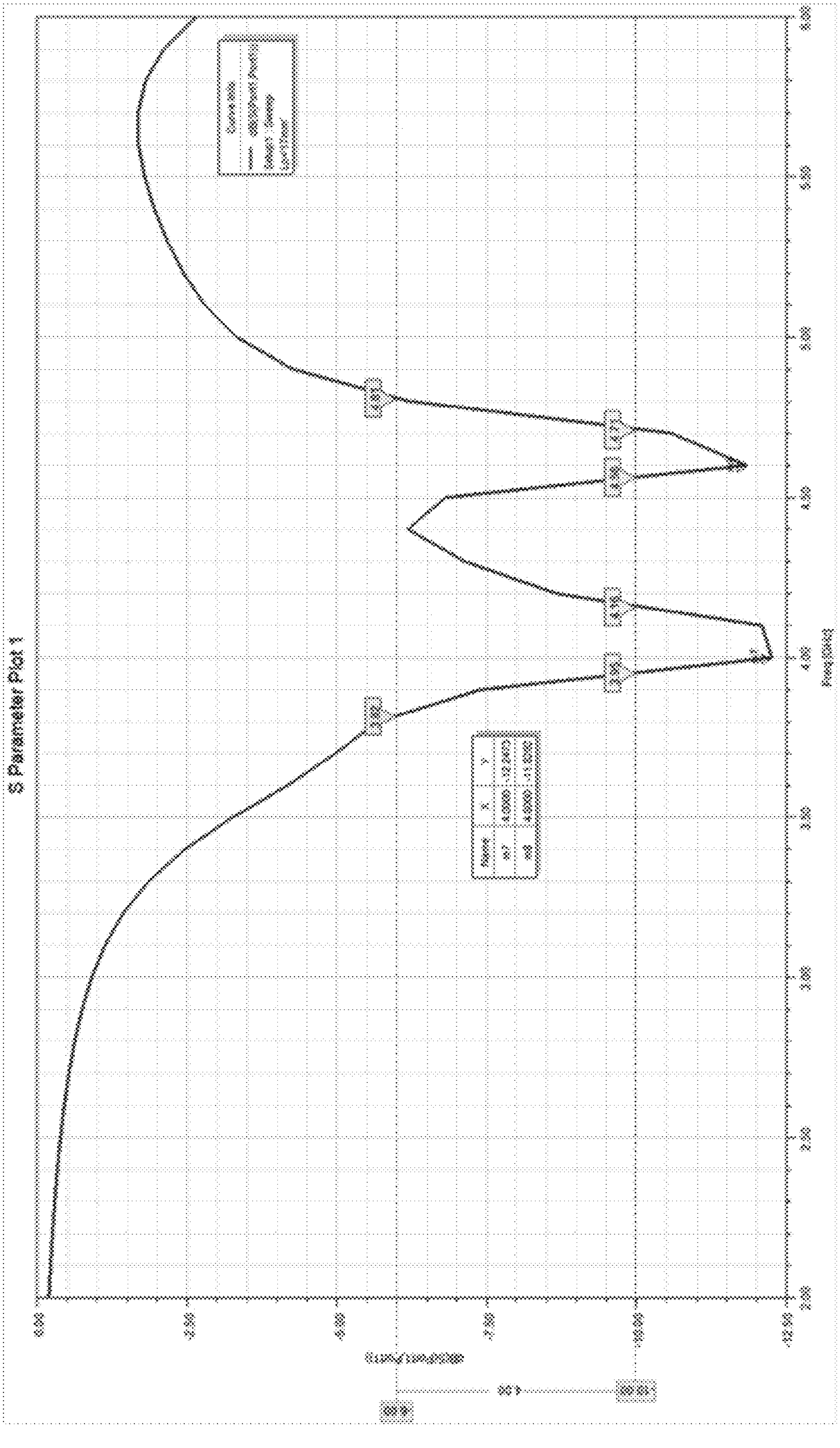
FIG. 11 is a simulation diagram of the S parameter of the antenna unit according to one embodiment of the present disclosure.
Figure 12:
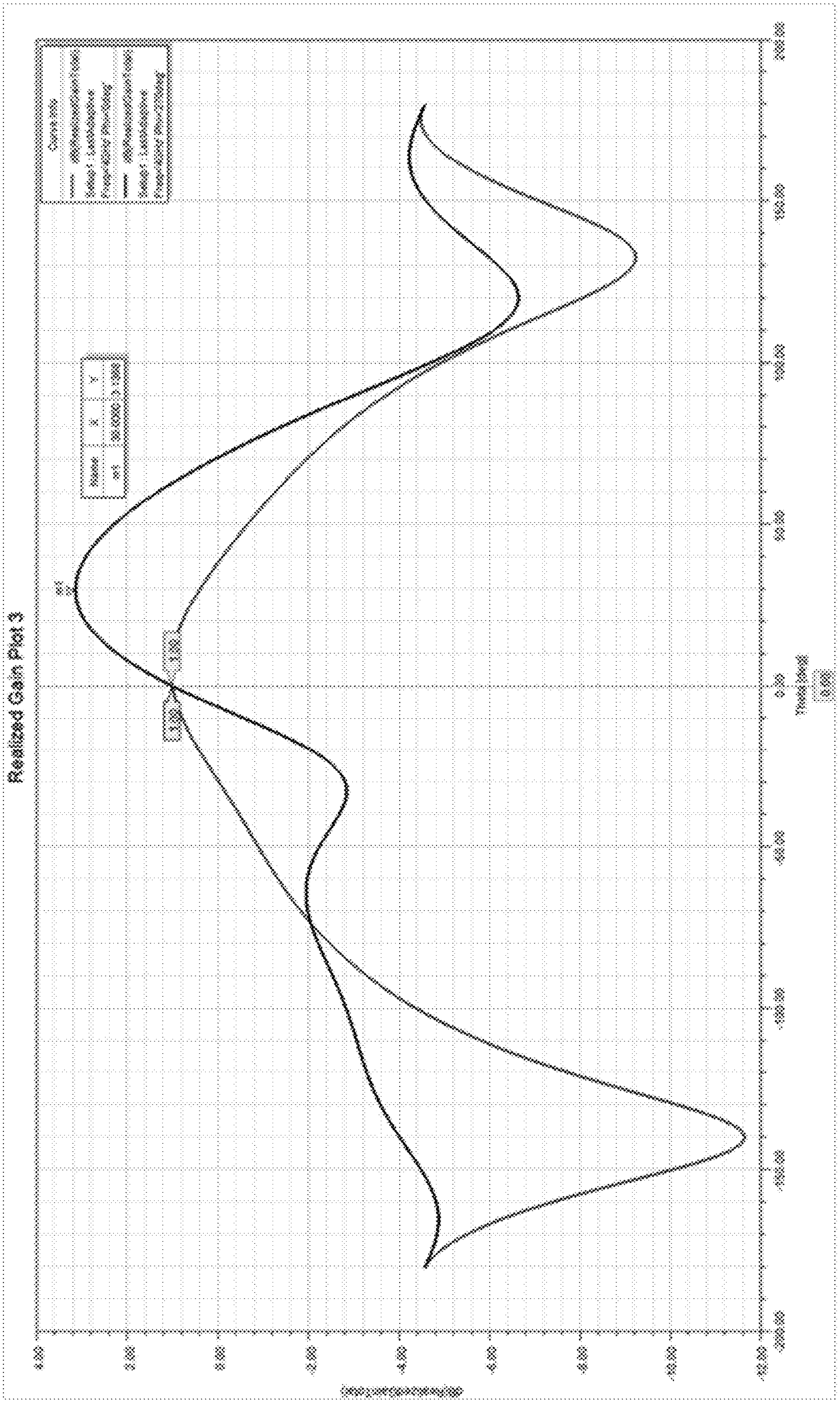
FIG. 12 is a two-dimensional simulation diagram of the antenna unit at 4 GHz according to one embodiment of the present disclosure.
Figure 13:
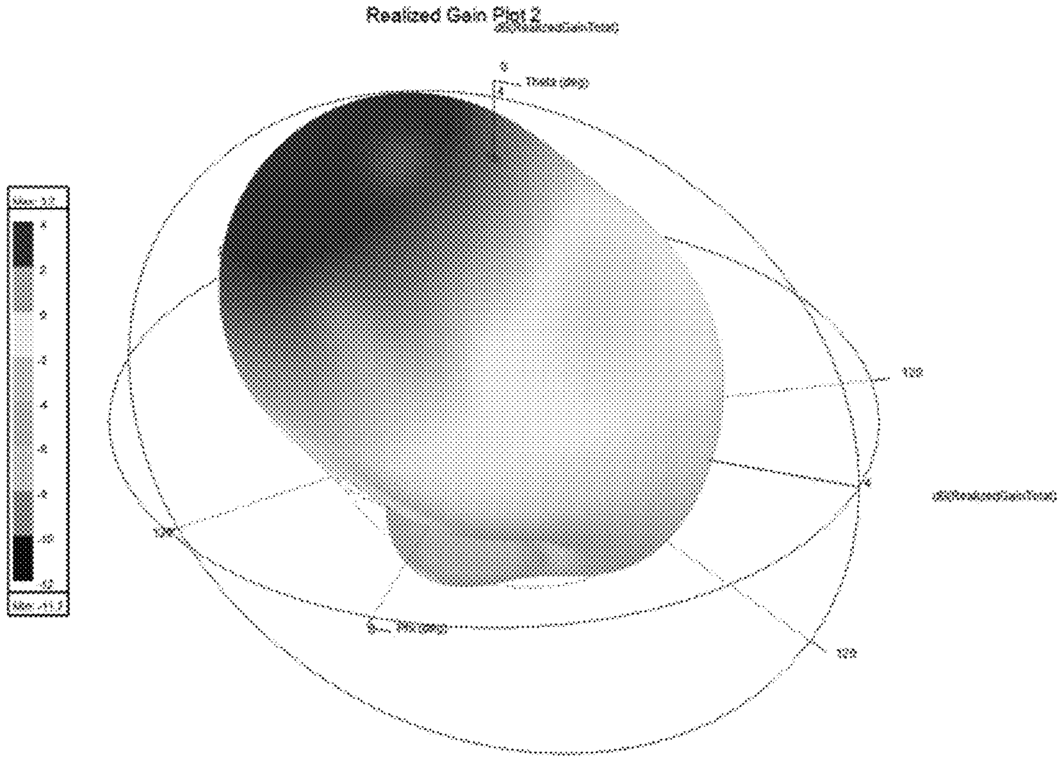
FIG. 13 is a three-dimensional simulation diagram of the antenna unit at 4 GHz according to one embodiment of the present disclosure.

Beam control and verification are performed on the antenna unit including 3×3 patch structures 221 on the metasurface. When the first distances for the three patch structures 221 in each patch unit 22 are R1=6 mm, R2=5.1 mm and R3=2 mm respectively, theoretically the patch units 22 are arranged on the metasurface with a phase difference of Δψ=25°. Based on the formula $$\theta = \arcsin\left(\frac{\lambda\Delta\psi}{2\pi a}\right),$$

a theoretical pitch angle θ=21.8° Can be generated. FIG. 11 is a simulation diagram of the S parameter of the antenna unit according to one embodiment of the present disclosure, FIG. 12 is a two-dimensional simulation diagram of the antenna unit at 4 GHz according to one embodiment of the present disclosure, and FIG. 13 is a three-dimensional simulation diagram of the antenna unit at 4 GHz according to one embodiment of the present disclosure. As shown in FIGS. 11 to 13, center frequencies of the antenna are 4 GHz and 4.6 GHz; for S11≤−6 dB, a working frequency band is 3.82 GHz to 4.81 GHz; and for S11≤−10 dB, working frequency bands are 3.95 GHz to 4.16 GHz and 4.56 GHz to 4.71 GHz. A maximum gain of the antenna at 4 GHz is 3.14 dBi, and a maximum radiation direction of the antenna is φ=270° and θ=30°. Similarly, when the first distances for the three patch structures 221 in each patch unit 22 are R1=2 mm, R2=5.1 mm and R3=6 mm respectively, a maximum gain of the antenna at 4 GHz is 3.14 dBi, and a maximum radiation direction of the antenna is φ=90° and θ=30°, which is exactly symmetrical with the above-mentioned simulation result. When R1=5.7 mm, R2=5.1 mm and R3=4 mm, theoretically the patch units 22 are arranged on the metasurface with a phase difference of Δψ=15°, and a theoretical scanning angle θ=12.9°. Through actual simulation, a maximum gain of the antenna at 4 GHz is 6.53 dBi, and a maximum radiation direction of the antenna is φ=270° and θ=16°. Hence, it is able to control the beam direction (φ, θ) through controlling the first distances R1, R2, R3 of the three patch structures 221 in the patch unit 22.

The present disclosure further provides in some embodiments a multi-beam antenna, which includes a plurality of the above-mentioned antenna units. At least two antenna units in the multi-beam antenna have different feed directions, so different beam directions are generated through exciting different feed ports.

In some embodiments of the present disclosure, in the antenna units of the multi-beam antenna, the first dielectric substrates 11 are of an integral piece, the second dielectric substrates 21 are of an integral piece, and the reference electrode layers 12 are of an integral piece.

In some embodiments of the present disclosure, the plurality of antenna units of the multi-beam antenna is arranged in an array form. For example, the multi-beam antenna includes four antenna units, i.e., a 2×2 antenna array. In the embodiments of the present disclosure, the description will be given by taking four antenna units arranged in an array form as an example. Furthermore, feed directions of the four antenna units in the multi-beam antenna are different. The following description will be given in conjunction with specific embodiments, and the feed ports of the four antenna units, i.e., feed ends of the first feed line 14, are Port1, Port2, Port3, and Port4.

Figure 14:
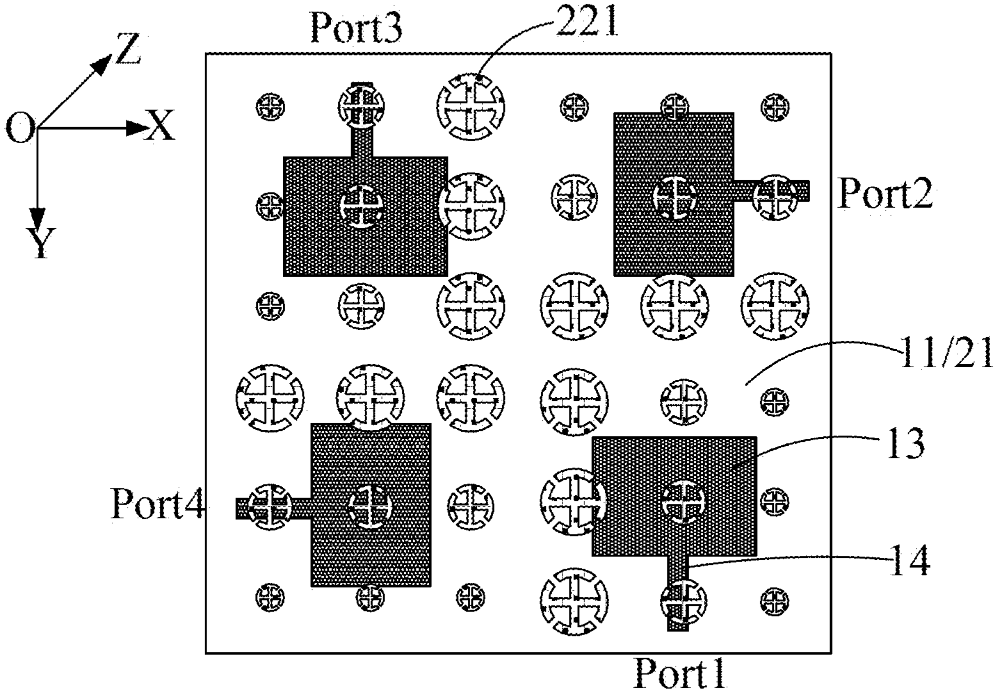
FIG. 14 is a top view of a multi-beam antenna according to a first embodiment of the present disclosure.
Figure 15:
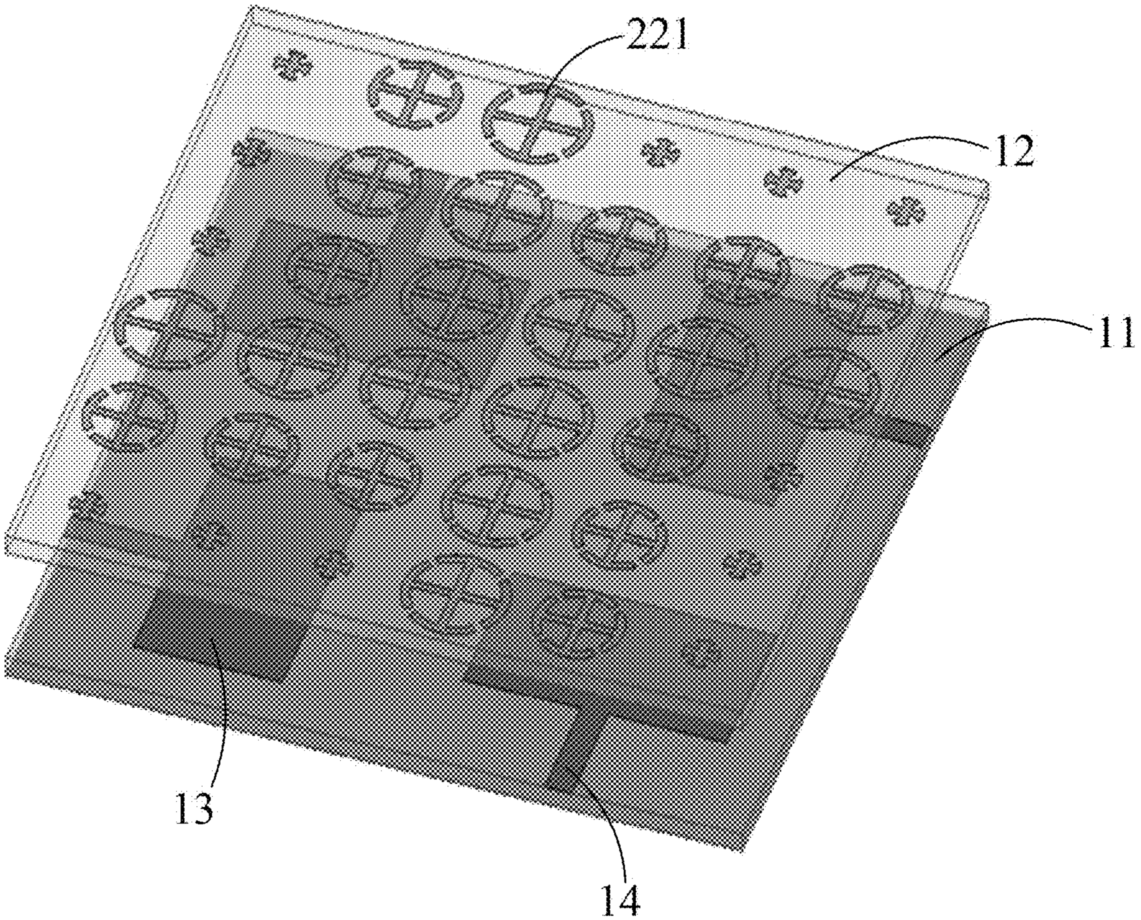
FIG. 15 is a solid view of the multi-beam antenna according to the first embodiment of the present disclosure.

FIG. 14 is a top view of the multi-beam antenna according to a first embodiment of the present disclosure, and FIG. 15 is a solid view of the multi-beam antenna according to the first embodiment of the present disclosure. As shown in FIGS. 14 and 15, a coordinate system is established with a center of the multi-beam antenna as an origin, a row direction (i.e., a horizontal direction) as an X-axis, a column direction (i.e., a vertical direction) a Y-axis, and a thickness direction of the multi-beam antenna (a thickness direction of the first dielectric substrate 11) as a Z-axis. Two adjacent antenna units in the row or column direction are arranged rotationally symmetrically with each other about the Z-axis. For example, taking the antenna unit in a fourth quadrant of the coordinate system as a reference, the antenna unit in a first quadrant is obtained through rotating the antenna unit in the fourth quadrant around the Z-axis by 90°, the antenna unit in a second quadrant is obtained through rotating the antenna unit in the fourth quadrant around the Z-axis by 180°, and the antenna unit in a third quadrant is obtained through rotating the antenna unit in the fourth quadrant around the Z-axis by 270°.

Figure 16:
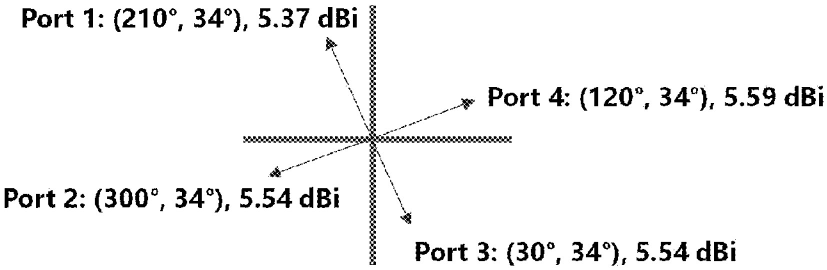
FIG. 16 is a schematic diagram showing beam directions (φ, θ) and gains obtained in accordance with a pattern simulation result of the multi-beam antenna according to the first embodiment of the present disclosure.
Figure 17:
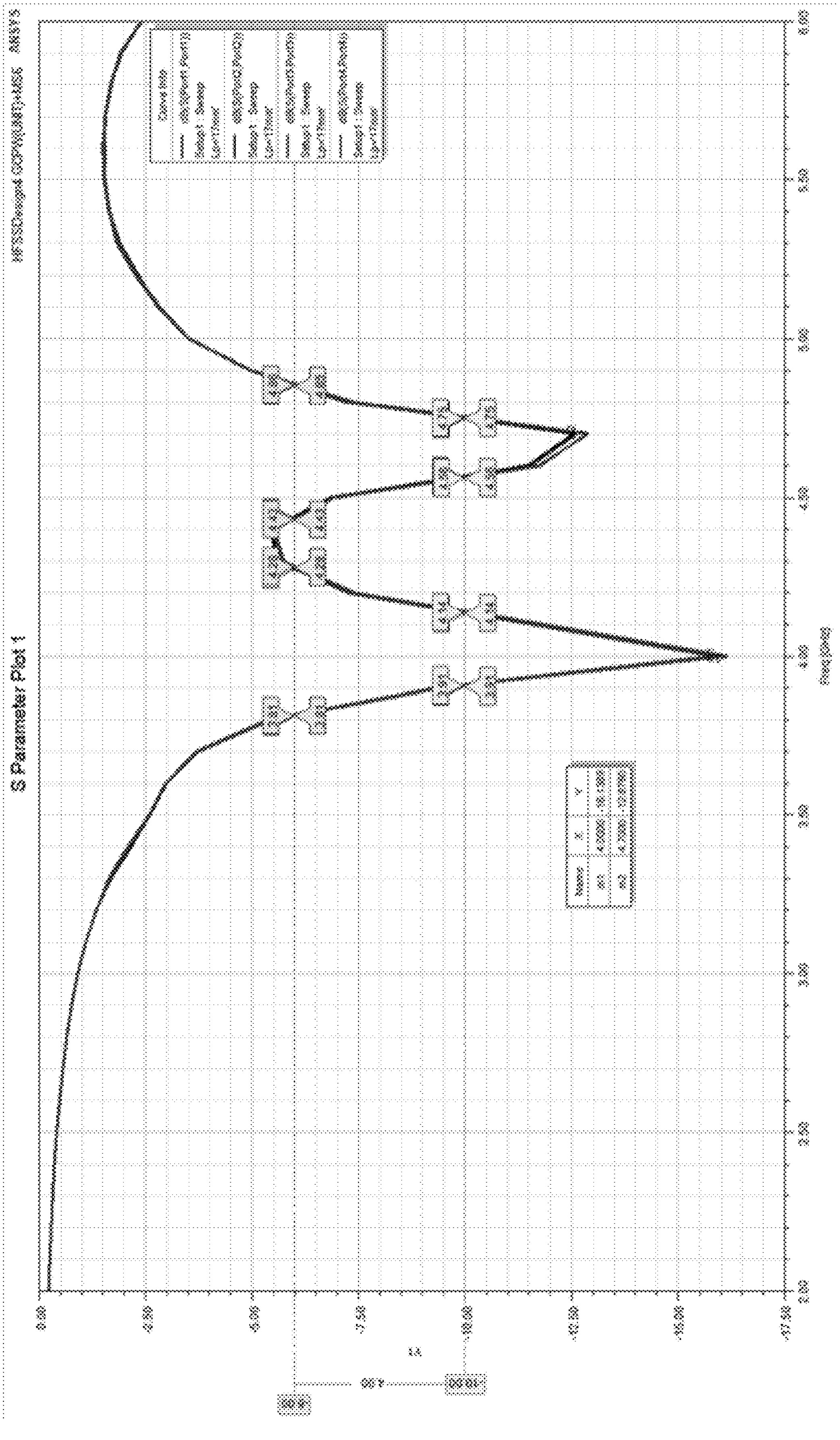
FIG. 17 is a simulation diagram of the S parameters of Port 1, Port 2, Port 3, and Port 4 of the multi-beam antenna according to the first embodiment of the present disclosure.
Figure 18:
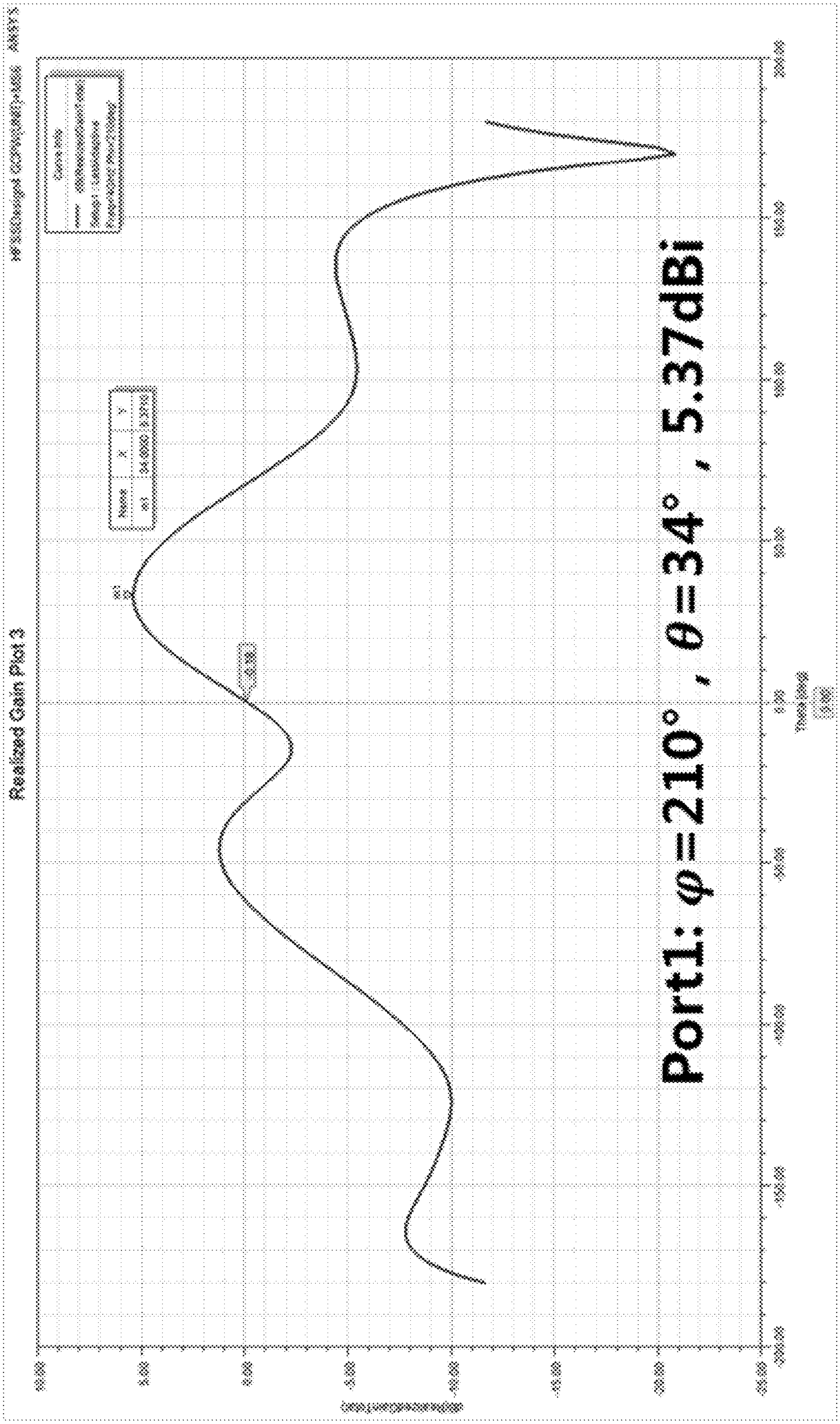
FIG. 18 is a two-dimensional simulation diagram of the multi-beam antenna when Port 1 is excited according to the first embodiment of the present disclosure.
Figure 19:
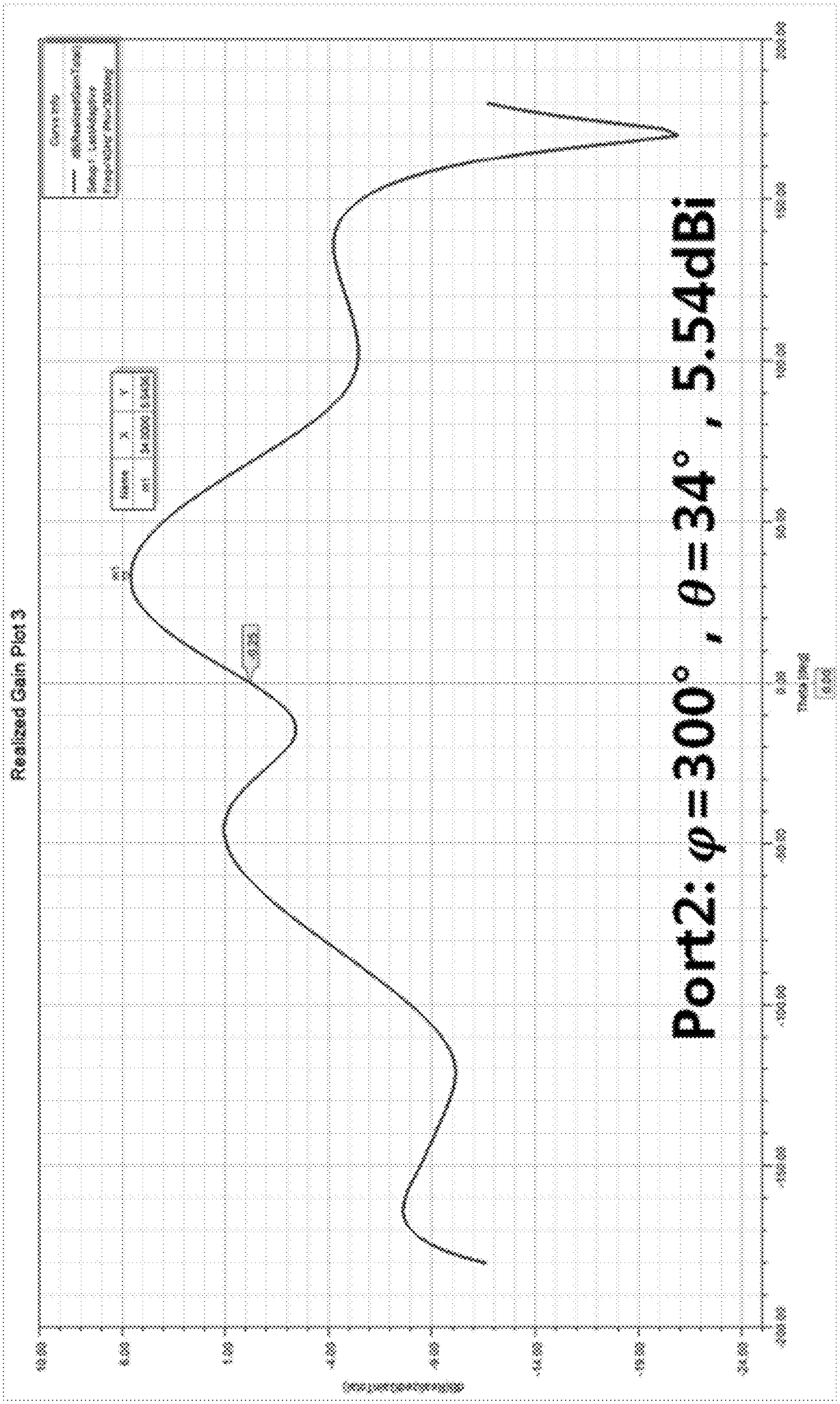
FIG. 19 is a two-dimensional simulation diagram of the multi-beam antenna when Port 2 is excited according to the first embodiment of the present disclosure.
Figure 20:
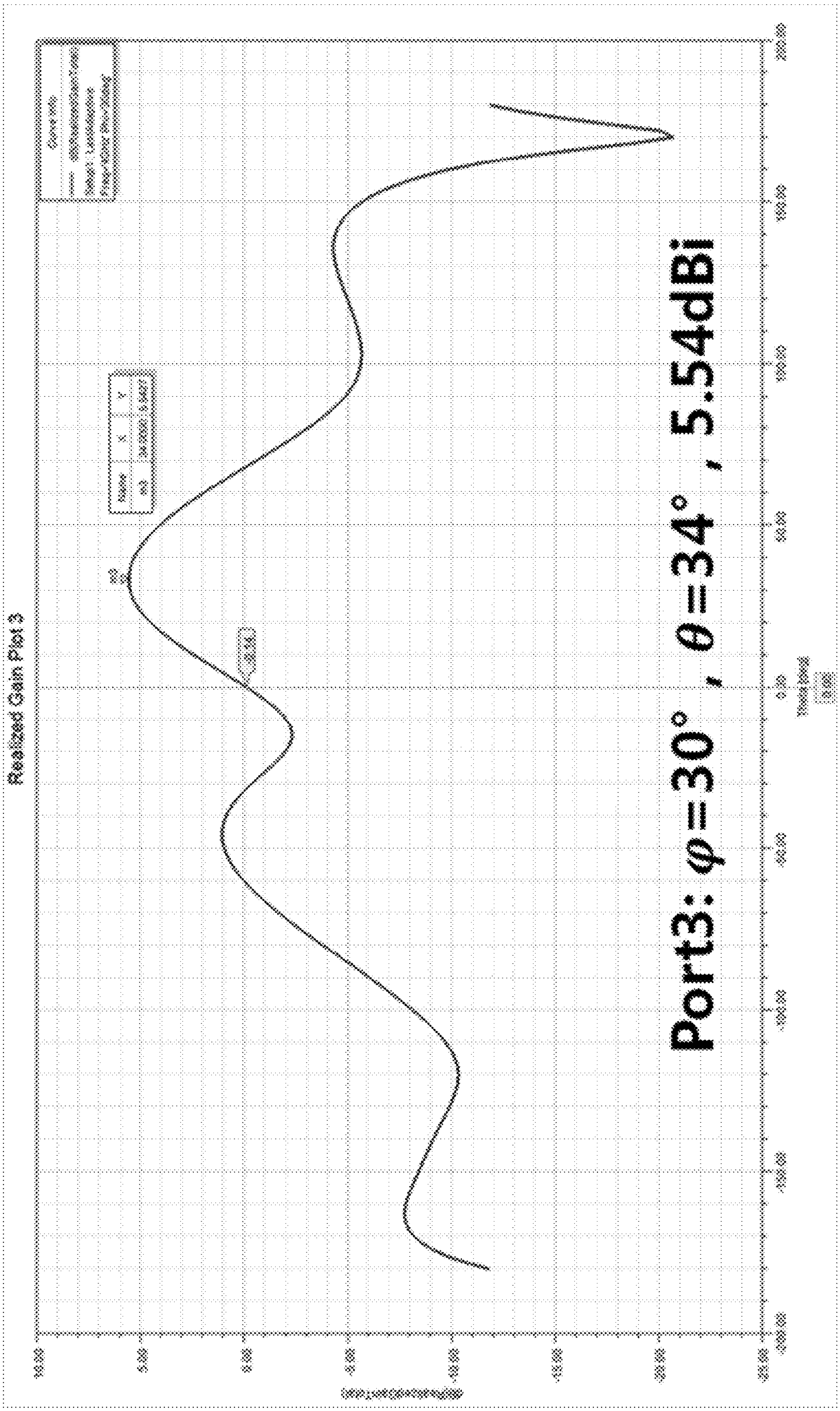
FIG. 20 is a two-dimensional simulation diagram of the multi-beam antenna when Port 3 is excited according to the first embodiment of the present disclosure.
Figure 21:
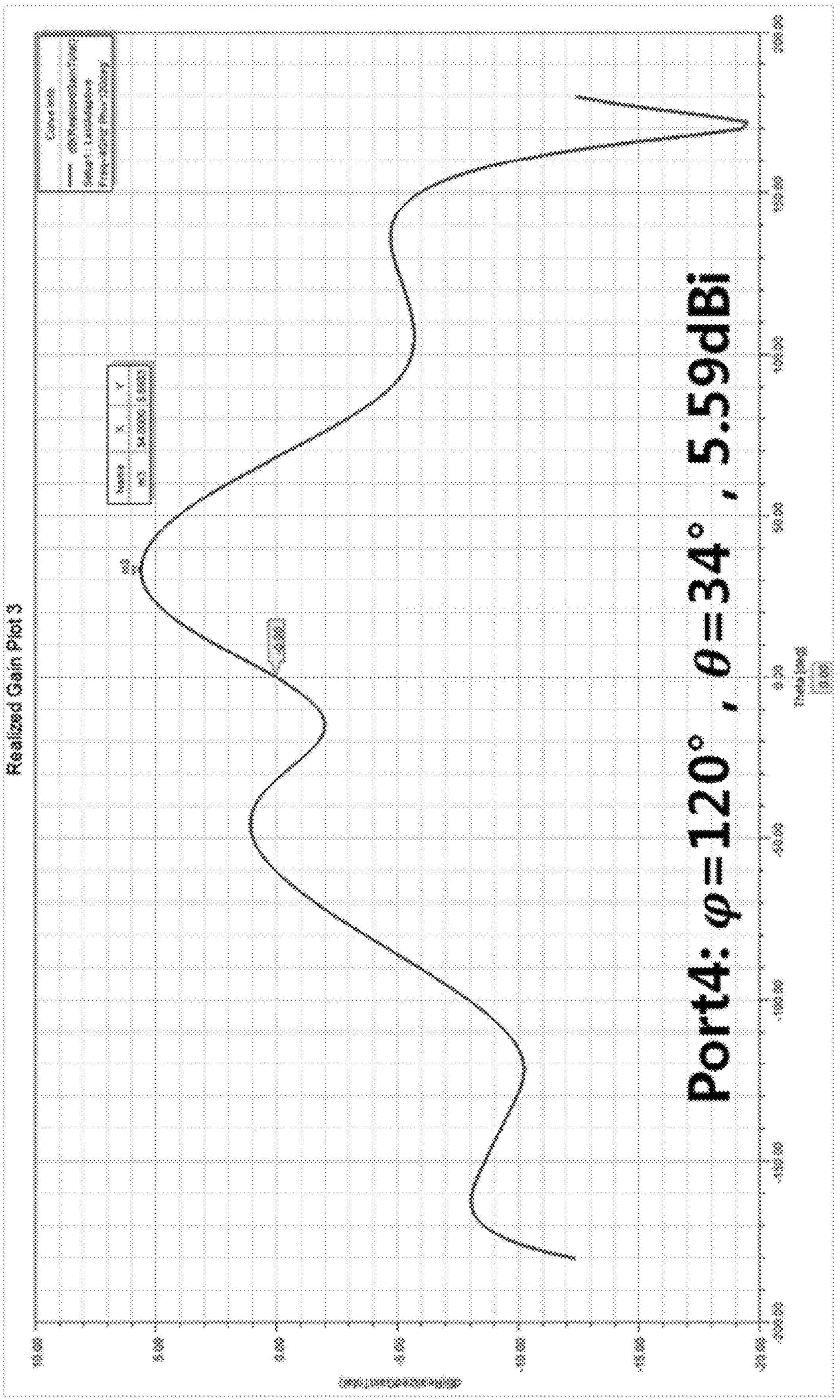
FIG. 21 is a two-dimensional simulation diagram of the multi-beam antenna when Port 4 is excited according to the first embodiment of the present disclosure.
Figure 22:
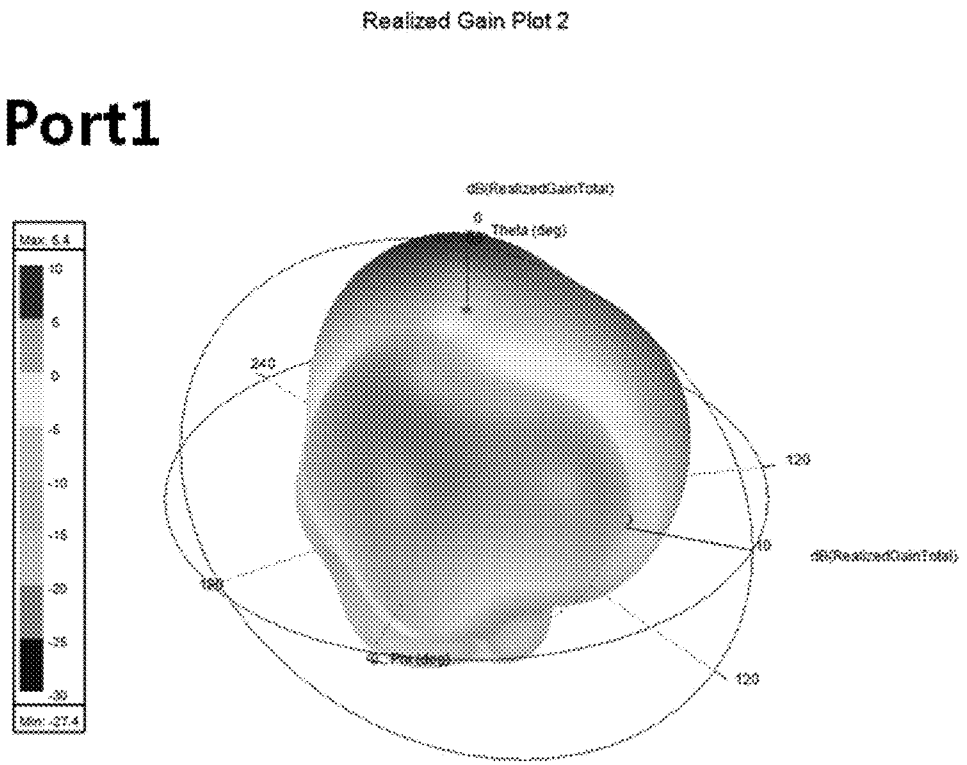
FIG. 22 is a three-dimensional simulation diagram of the multi-beam antenna when Port 1 is excited according to the first embodiment of the present disclosure.
Figure 23:
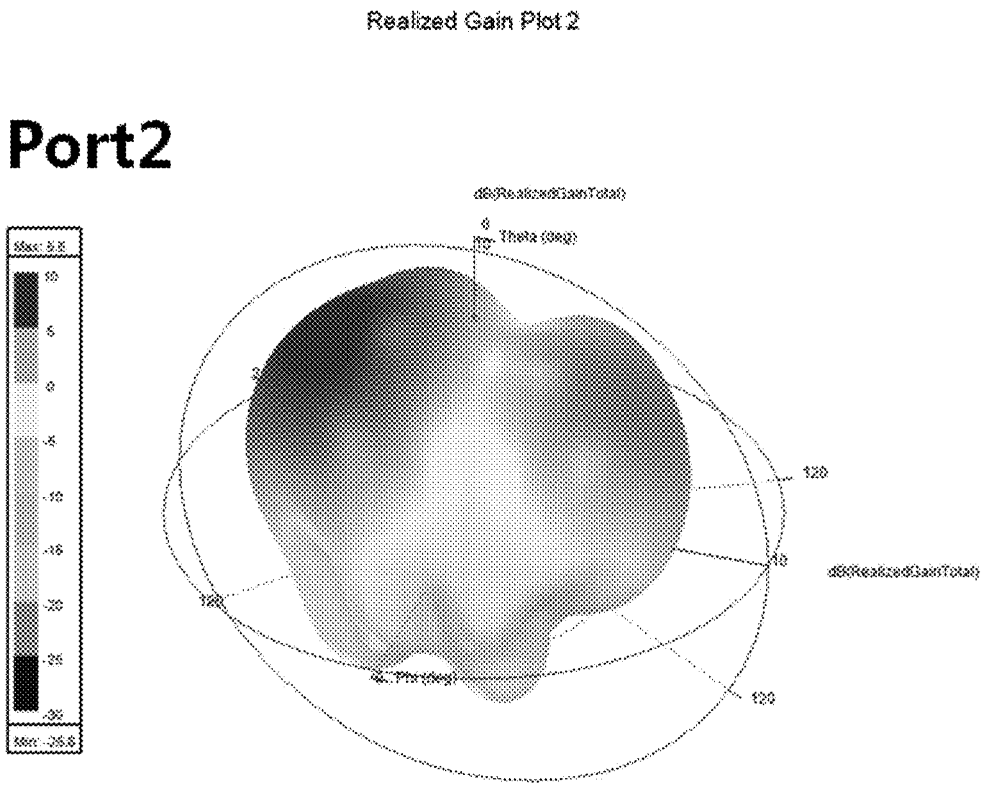
FIG. 23 is a three-dimensional simulation diagram of the multi-beam antenna when Port 2 is excited according to the first embodiment of the present disclosure.
Figure 24:
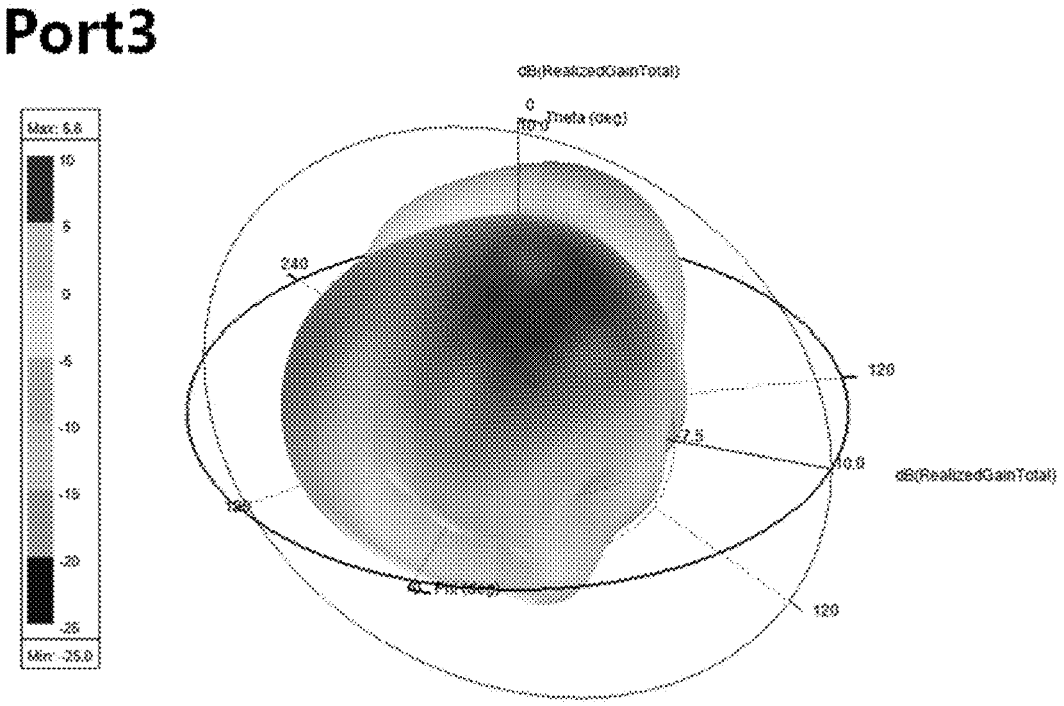
FIG. 24 is a three-dimensional simulation diagram of the multi-beam antenna when Port 3 is excited according to the first embodiment of the present disclosure.
Figure 25:
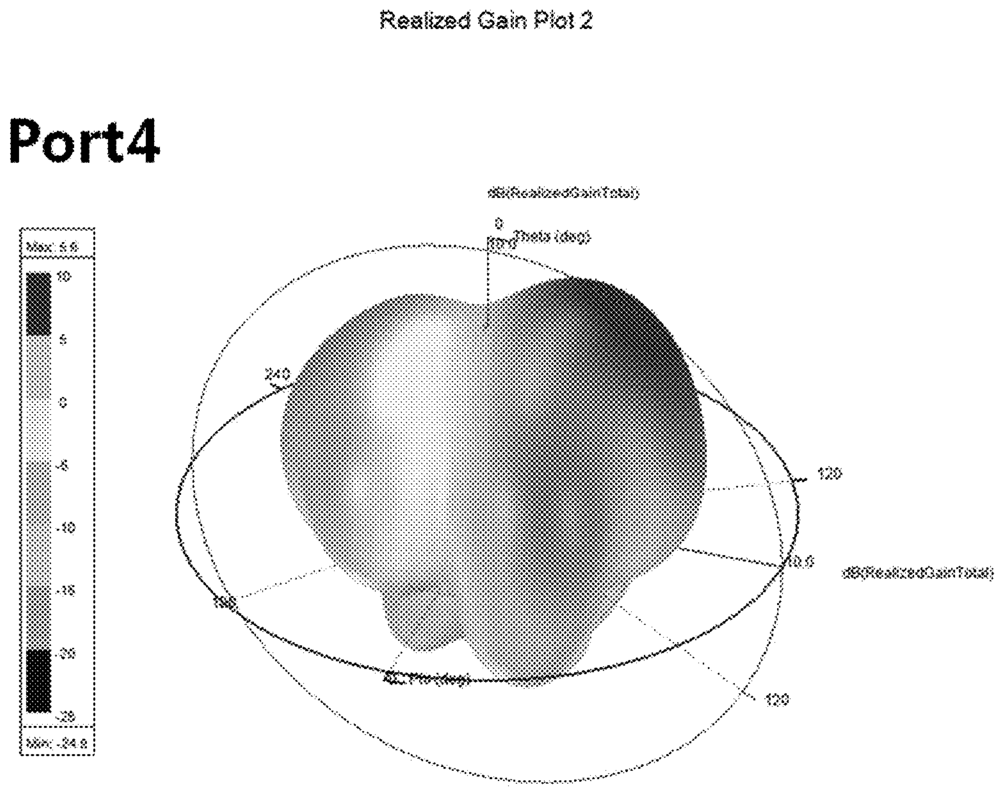
FIG. 25 is a three-dimensional simulation diagram of the multi-beam antenna when Port 4 is excited according to the first embodiment of the present disclosure.

When the four antenna units are each the antenna unit in FIG. 14 and the first distances for the three patch structures 221 in the patch unit 22 of each antenna unit are R1=6 mm, R2=5.1 mm and R3=2 mm, different feed ports are excited so as to obtain different beam directions. FIG. 16 is a schematic diagram showing beam directions (φ, θ) and gains obtained in accordance with a pattern simulation result of the multi-beam antenna according to the first embodiment of the present disclosure. As shown in FIG. 16, for four beams, φ is 210°/300°/30°/120° with a difference of 90°, θ is 34°, and a maximum gain of the antenna is 5.37 dBi to 5.59 dBi. FIG. 17 is a simulation diagram of the S parameters of Port 1, Port 2, Port 3, and Port 4 of the multi-beam antenna according to the first embodiment of the present disclosure, FIG. 18 is a two-dimensional simulation diagram of the multi-beam antenna when Port 1 is excited according to the first embodiment of the present disclosure, FIG. 19 is a two-dimensional simulation diagram of the multi-beam antenna when Port 2 is excited according to the first embodiment of the present disclosure, FIG. 20 is a two-dimensional simulation diagram of the multi-beam antenna when Port 3 is excited according to the first embodiment of the present disclosure, FIG. 21 is a two-dimensional simulation diagram of the multi-beam antenna when Port 4 is excited according to the first embodiment of the present disclosure, FIG. 22 is a three-dimensional simulation diagram of the multi-beam antenna when Port 1 is excited according to the first embodiment of the present disclosure, FIG. 23 is a three-dimensional simulation diagram of the multi-beam antenna when Port 2 is excited according to the first embodiment of the present disclosure, FIG. 24 is a three-dimensional simulation diagram of the multi-beam antenna when Port 3 is excited according to the first embodiment of the present disclosure, and FIG. 25 is a three-dimensional simulation diagram of the multi-beam antenna when Port 4 is excited according to the first embodiment of the present disclosure. Based on specific simulation results in FIGS. 17 to 25, it is able to not only provide different beam directions, but also improve impedance matching of the antenna unit through the metasurface. Through comparing FIG. 8 with FIG. 17, an S11 curve moves down as a whole. For S11≤−6 dB, working frequency bands are 3.81 GHz to 4.28 GHz and 4.43 GHz to 4.85 GHz; and for S11≤−10 dB, working frequency bands are 3.91 GHz to 4.14 GHz and 4.56 GHz to 4.75 GHz.

Figure 26:
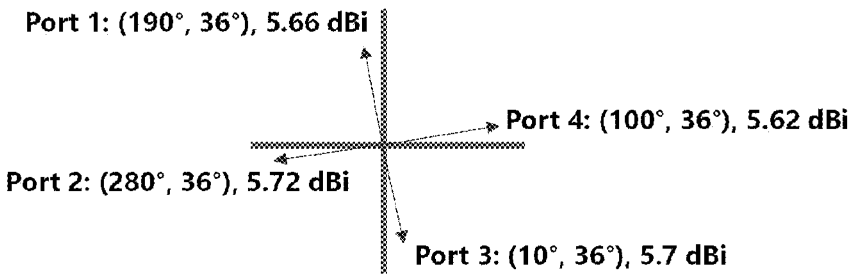
FIG. 26 is another schematic diagram showing the beam directions (φ, θ) and the gains obtained in accordance with the pattern simulation result of the multi-beam antenna according to the first embodiment of the present disclosure.
Figure 27:
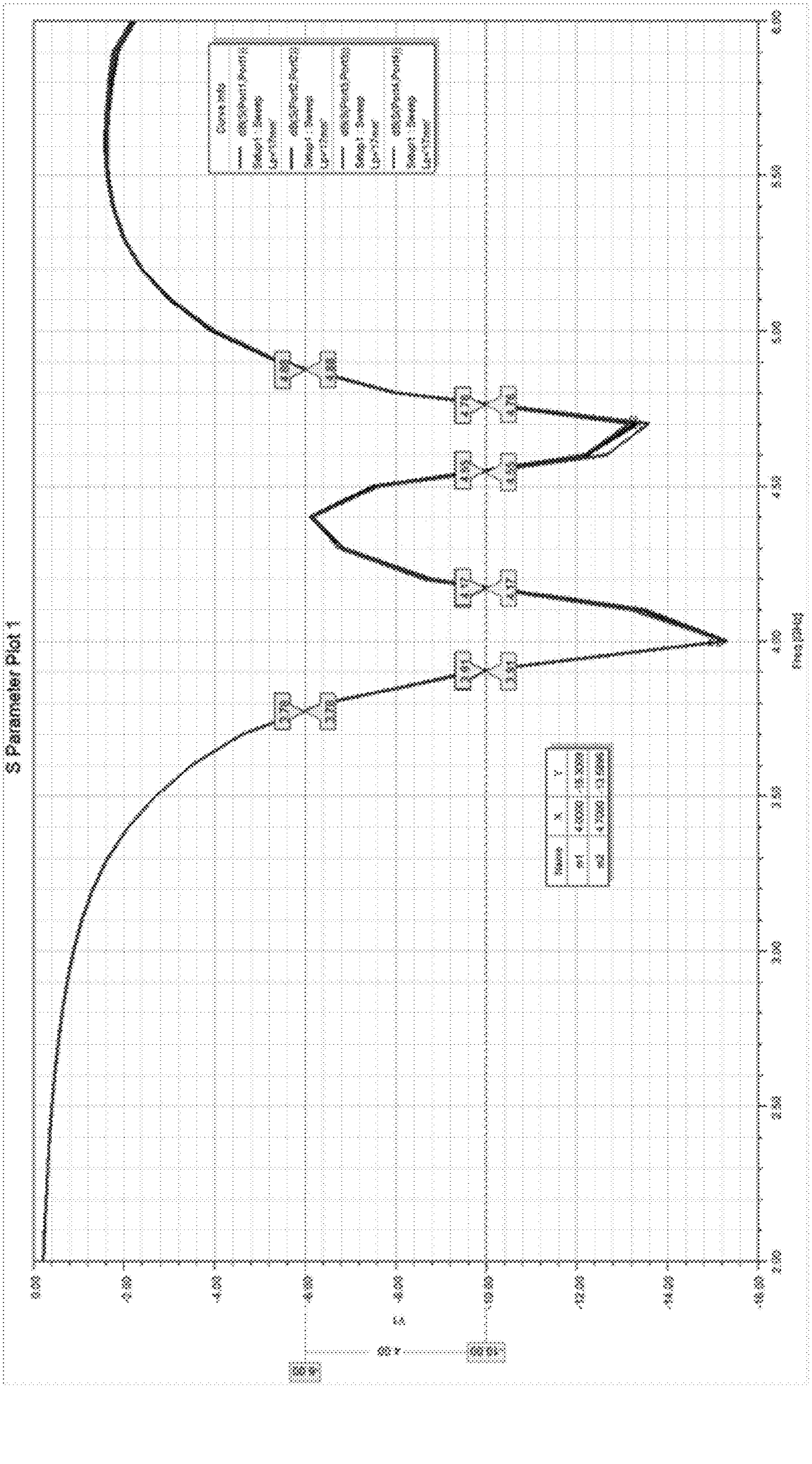
FIG. 27 is another simulation diagram of the S parameters of Port 1, Port 2, Port 3, and Port 4 of the multi-beam antenna according to the first embodiment of the present disclosure.
Figure 28:
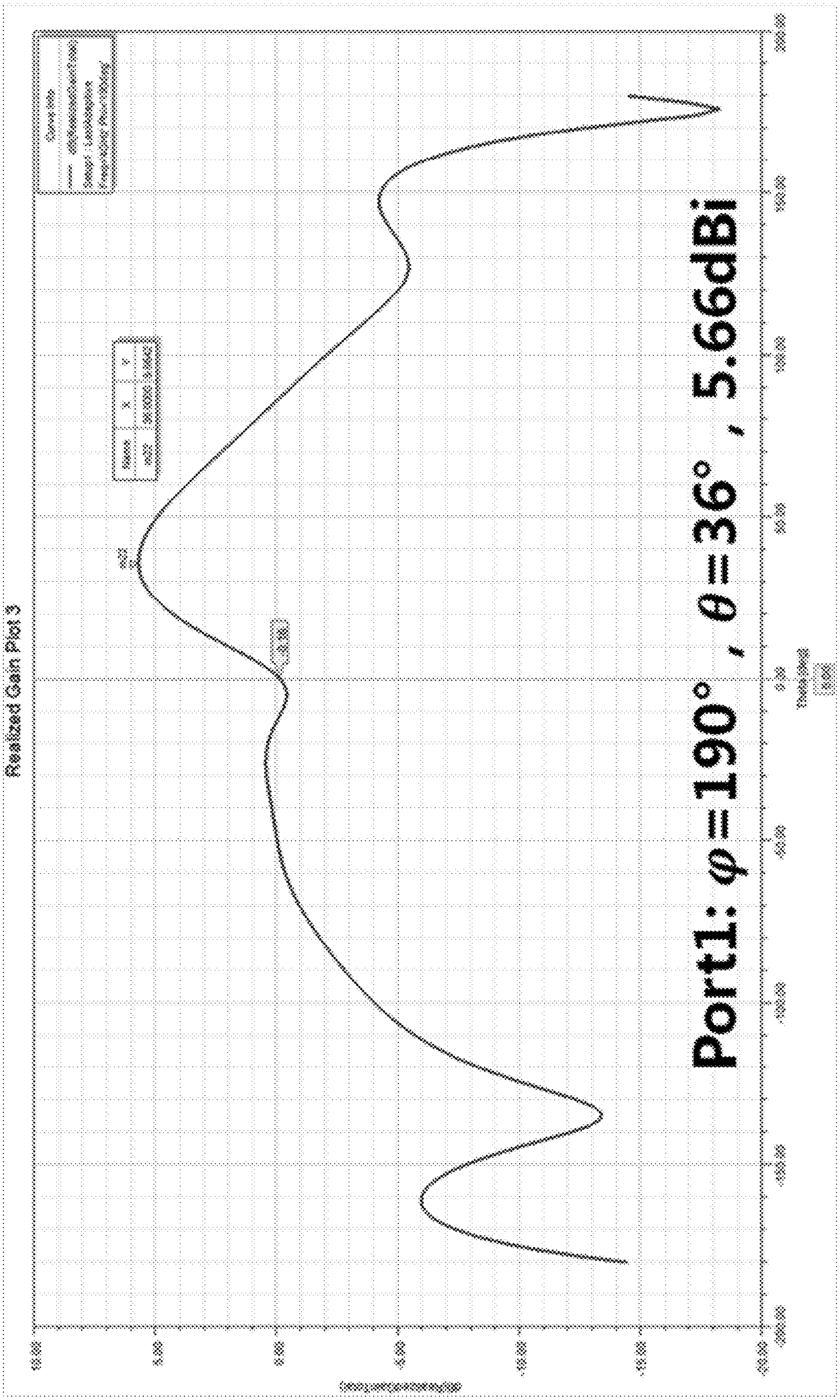
FIG. 28 is another two-dimensional simulation diagram of the multi-beam antenna when Port 1 is excited according to the first embodiment of the present disclosure.
Figure 29:
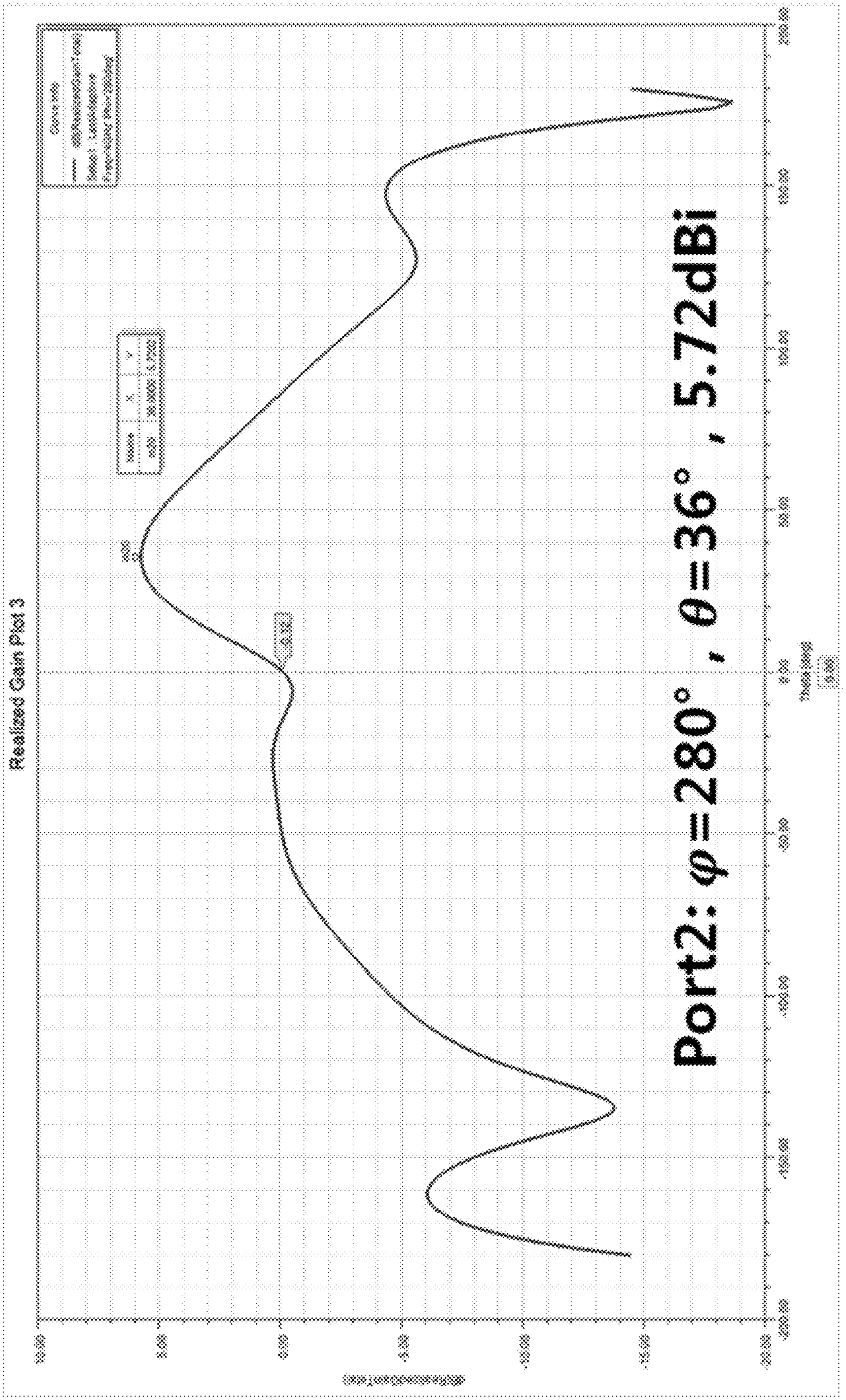
FIG. 29 is another two-dimensional simulation diagram of the multi-beam antenna when Port 2 is excited according to the first embodiment of the present disclosure.
Figure 30:
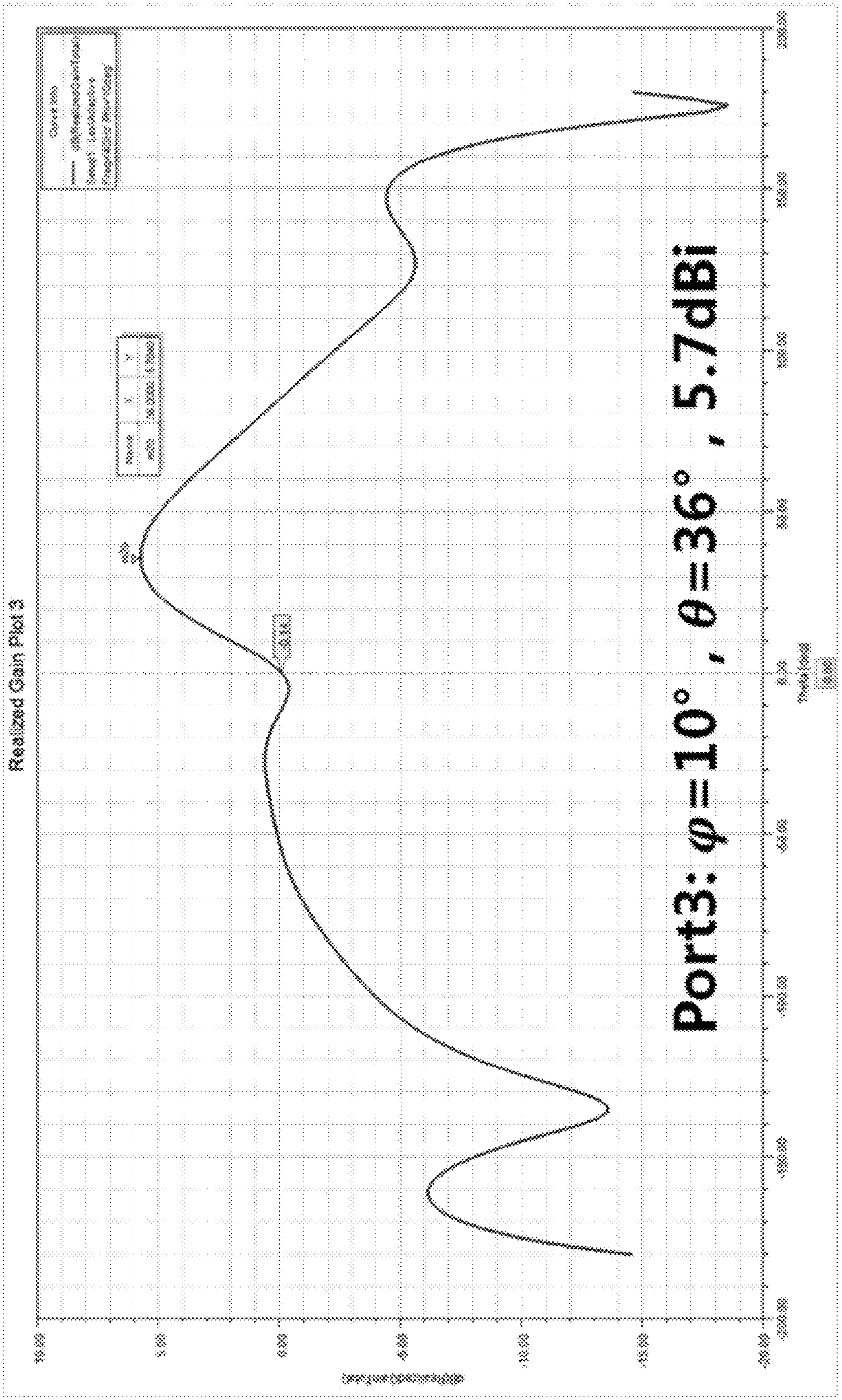
FIG. 30 is another two-dimensional simulation diagram of the multi-beam antenna when Port 3 is excited according to the first embodiment of the present disclosure.
Figure 31:
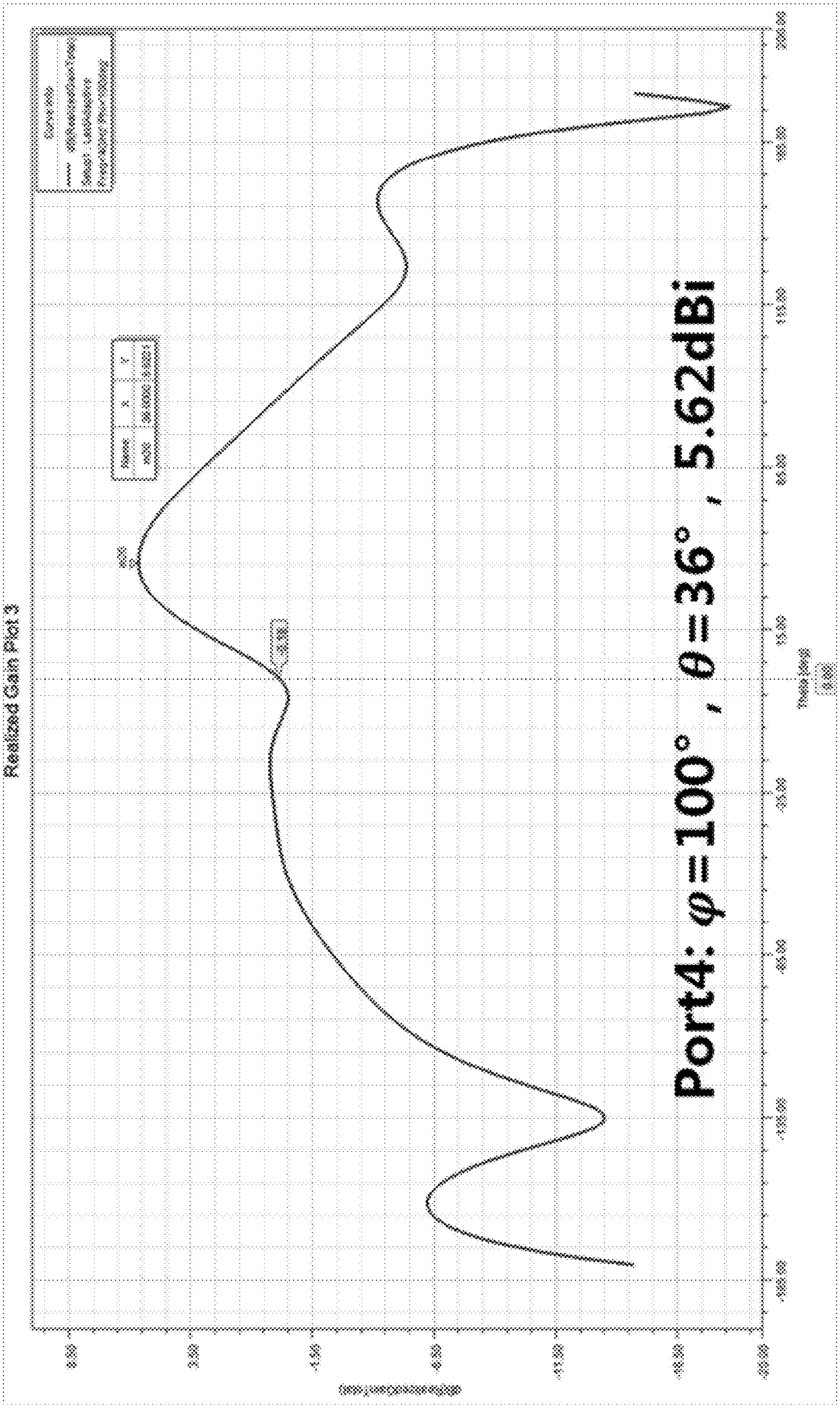
FIG. 31 is another two-dimensional simulation diagram of the multi-beam antenna when Port 4 is excited according to the first embodiment of the present disclosure.
Figure 32:
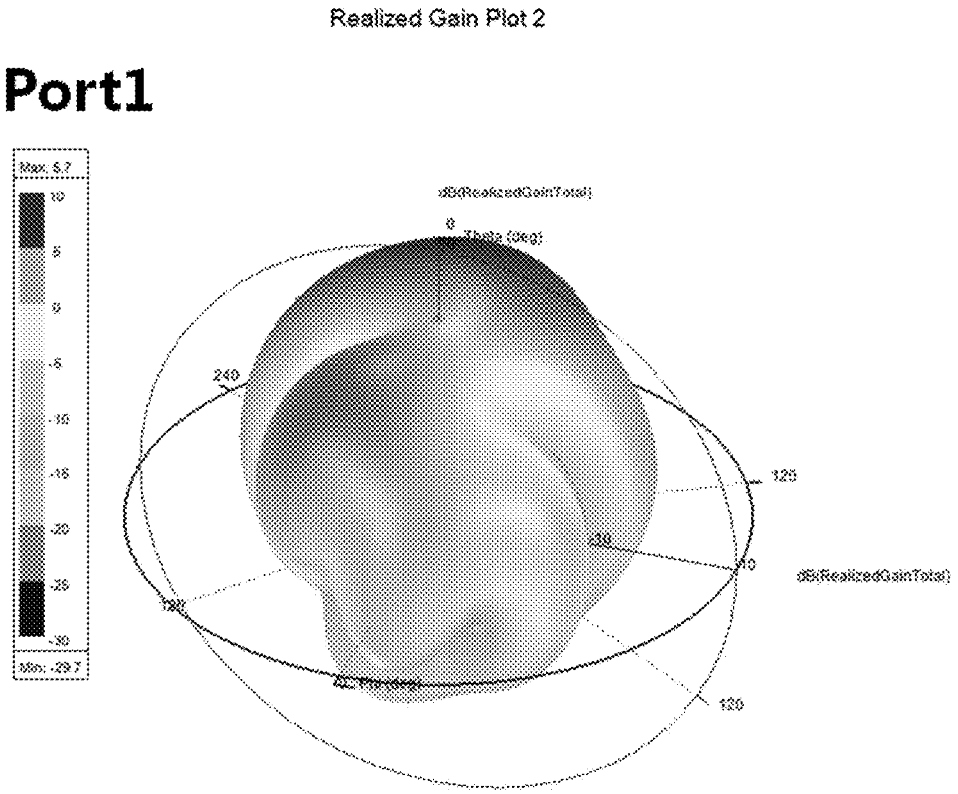
FIG. 32 is another three-dimensional simulation diagram of the multi-beam antenna when Port 1 is excited according to the first embodiment of the present disclosure.
Figure 33:
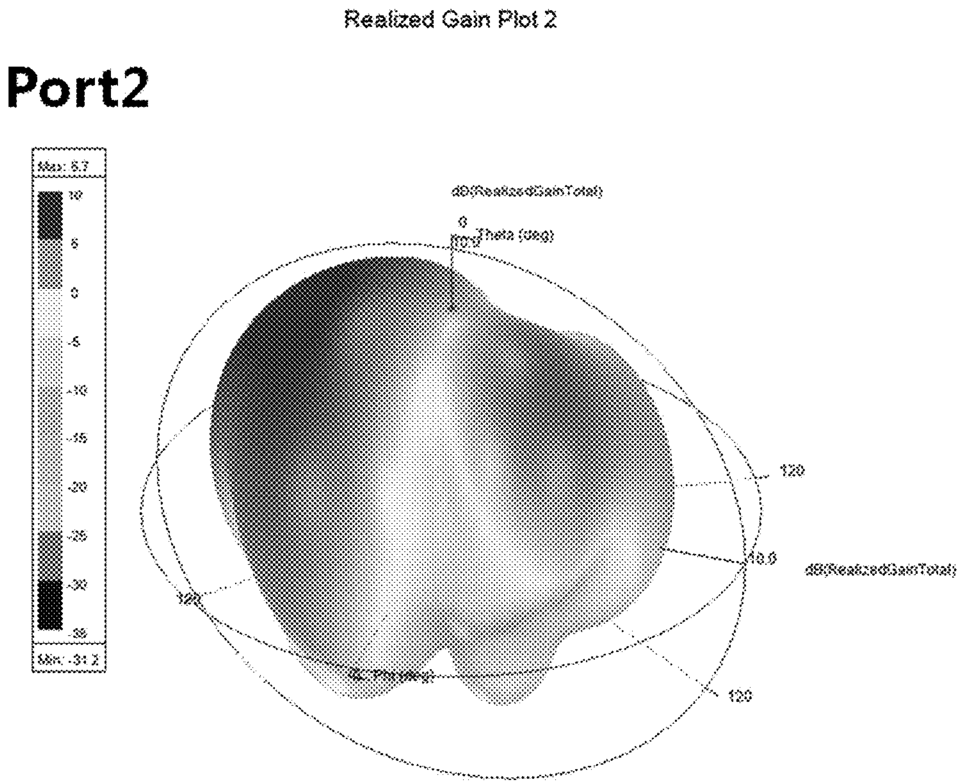
FIG. 33 is another three-dimensional simulation diagram of the multi-beam antenna when Port 2 is excited according to the first embodiment of the present disclosure.
Figure 34:
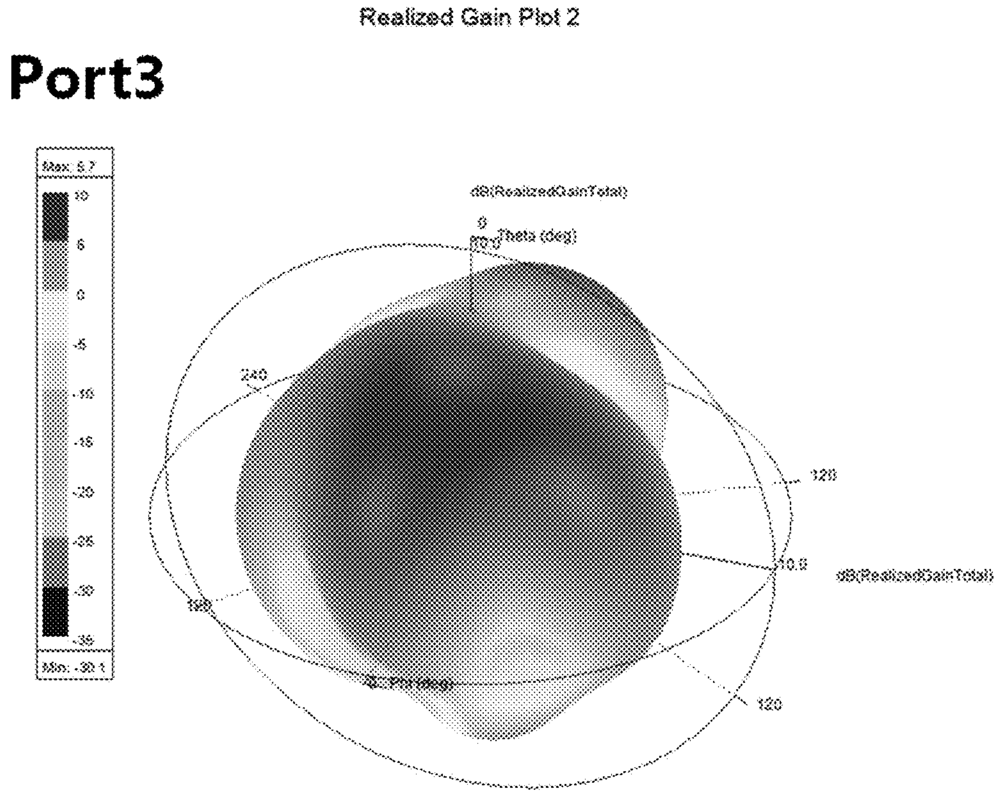
FIG. 34 is another three-dimensional simulation diagram of the multi-beam antenna when Port 3 is excited according to the first embodiment of the present disclosure.
Figure 35:
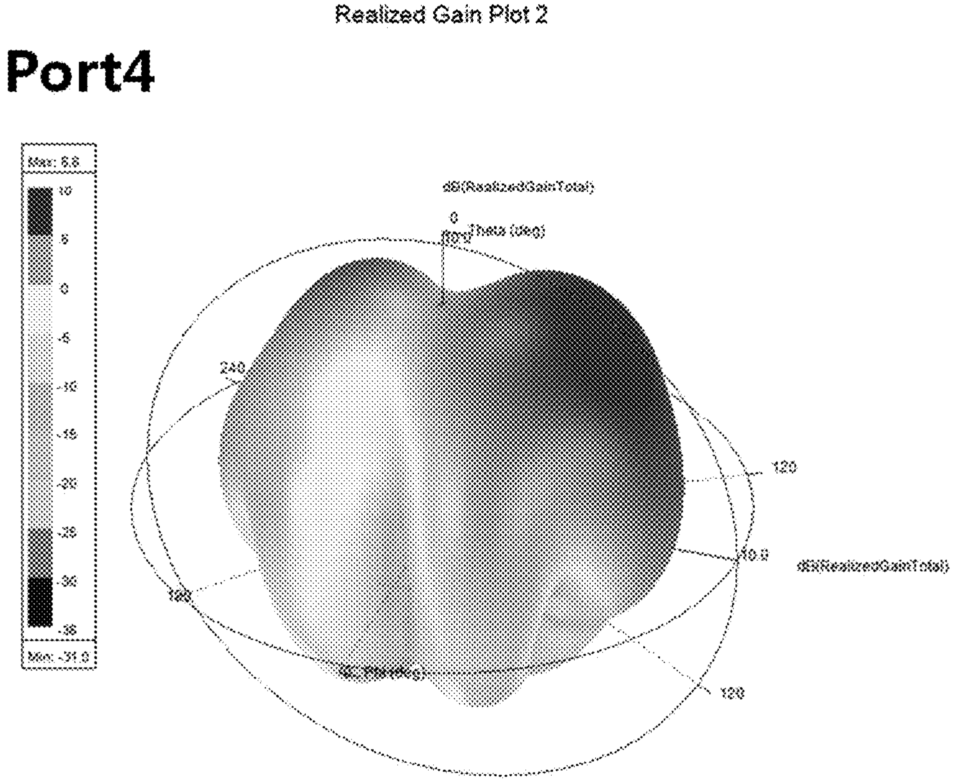
FIG. 35 is another three-dimensional simulation diagram of the multi-beam antenna when Port 4 is excited according to the first embodiment of the present disclosure.

When the first distances for the three patch structures 221 in the patch unit 22 of each antenna unit are R1=5.7 mm, R2=5.1 mm and R3=4 mm, different feed ports are excited to obtain different beam directions. FIG. 26 is another schematic diagram showing the beam directions (φ, θ) and the gains obtained in accordance with the pattern simulation result of the multi-beam antenna according to the first embodiment of the present disclosure. As shown in FIG. 26, for the four beams, φ is 190°/280°/10°/100° with a difference of 90°, θ is 36°, and a maximum gain of the antenna is 5.62 dBi to 5.72 dBi. FIG. 27 is another simulation diagram of the S parameters of Port 1, Port 2, Port 3, and Port 4 of the multi-beam antenna according to the first embodiment of the present disclosure, FIG. 28 is another two-dimensional simulation diagram of the multi-beam antenna when Port 1 is excited according to the first embodiment of the present disclosure, FIG. 29 is another two-dimensional simulation diagram of the multi-beam antenna when Port 2 is excited according to the first embodiment of the present disclosure, FIG. 30 is another two-dimensional simulation diagram of the multi-beam antenna when Port 3 is excited according to the first embodiment of the present disclosure, FIG. 31 is another two-dimensional simulation diagram of the multi-beam antenna when Port 4 is excited according to the first embodiment of the present disclosure, FIG. 32 is another three-dimensional simulation diagram of the multi-beam antenna when Port 1 is excited according to the first embodiment of the present disclosure, FIG. 33 is another three-dimensional simulation diagram of the multi-beam antenna when Port 2 is excited according to the first embodiment of the present disclosure, FIG. 34 is another three-dimensional simulation diagram of the multi-beam antenna when Port 3 is excited according to the first embodiment of the present disclosure, and FIG. 35 is another three-dimensional simulation diagram of the multi-beam antenna when Port 4 is excited according to the first embodiment of the present disclosure. Specific simulation results are shown in FIGS. 27 to 35. As compared with the above, through selecting different sizes of the patch structures 221 of the metasurface, the four beams are caused to deflect by 20° more in a clockwise direction.

Figure 36:
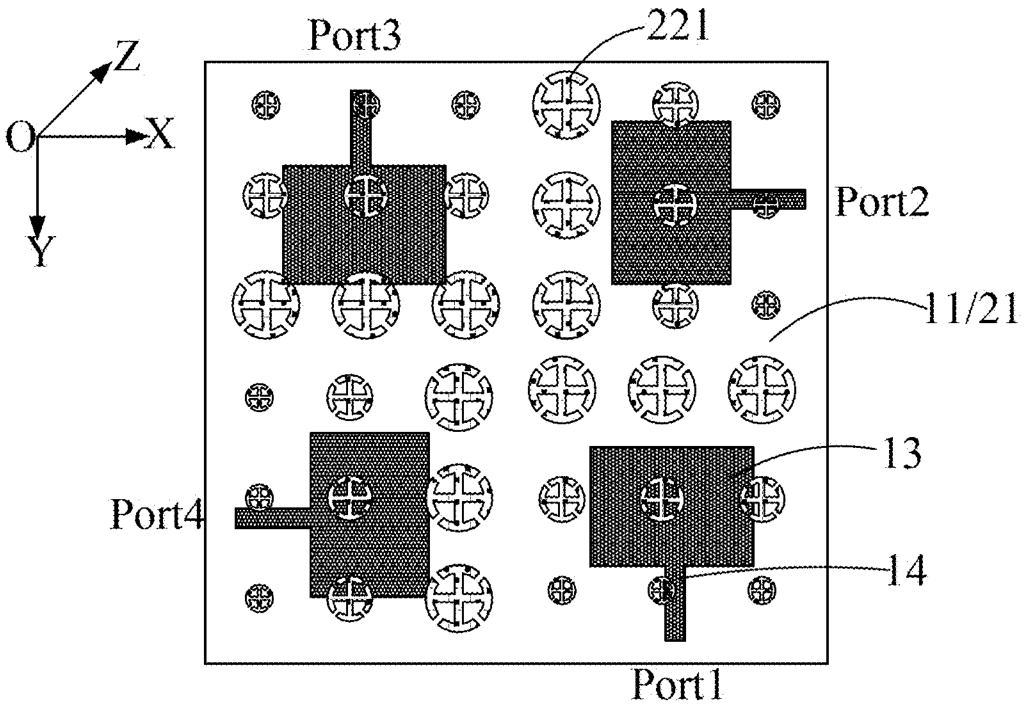
FIG. 36 is a top view of the multi-beam antenna according to a second embodiment of the present disclosure.
Figure 37:
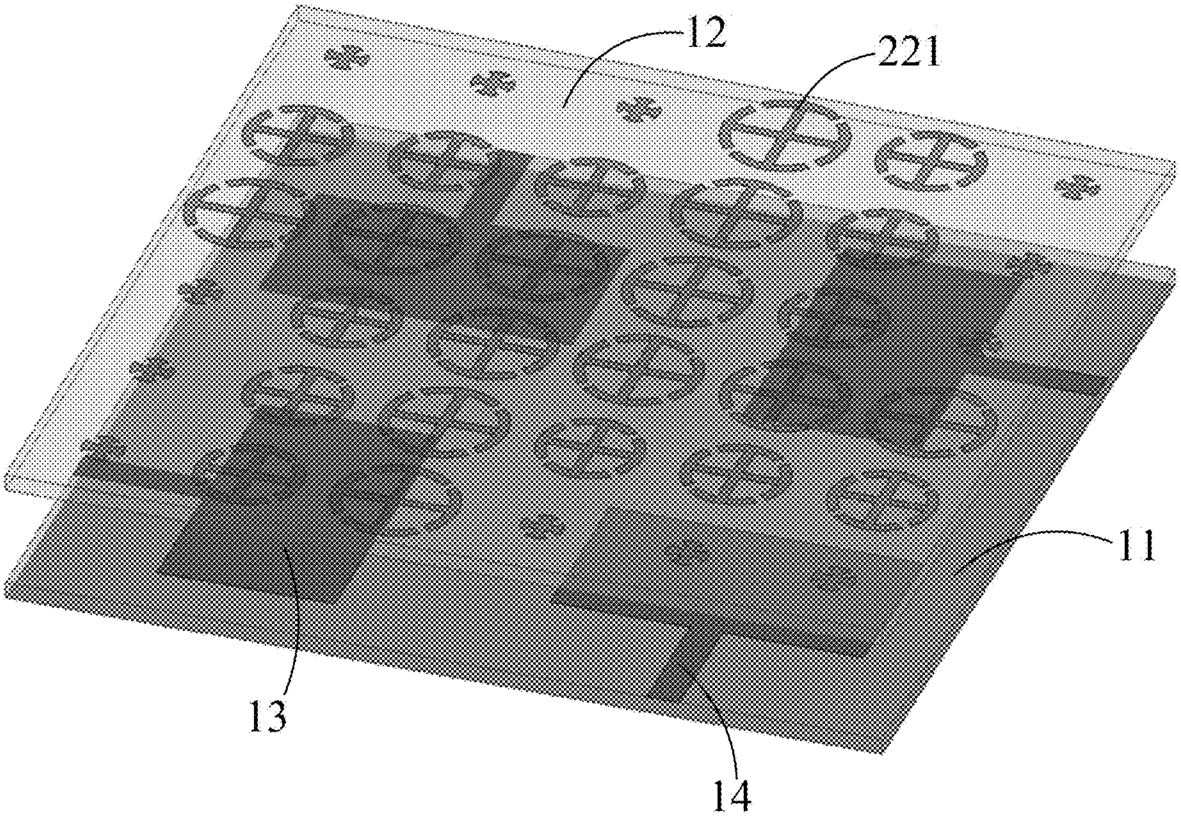
FIG. 37 is a solid view of the multi-beam antenna according to the second embodiment of the present disclosure.

FIG. 36 is a top view of the multi-beam antenna according to a second embodiment of the present disclosure, and FIG. 37 is a solid view of the multi-beam antenna according to the second embodiment of the present disclosure. As shown in FIGS. 36 and 37, the multi-beam antenna is substantially the same as that in the first embodiment, and the antenna unit in the fourth quadrant of the coordinate system is taken as a reference. The antenna unit in the first quadrant is obtained through rotating the antenna unit in the fourth quadrant around the Z-axis by 90°, the antenna unit in the second quadrant is obtained through rotating the antenna unit in the fourth quadrant around the Z-axis by 180°, and the antenna unit in the third quadrant is obtained through rotating the antenna unit in the fourth quadrant around the Z-axis by 270°. However, in the first embodiment, the first distances for the patch structures 221 in each patch unit 22 in the fourth quadrant decrease from left to right, and the first distances for the patch structures 221 from top to down are equal. In the second embodiment, the first distances for the patch structures 221 in each patch unit 22 in the fourth quadrant decrease from top to bottom, and the first distances for the patch structures 221 from left to right are equal. In other words, in the first embodiment, the patch units 22 in the fourth quadrant are arranged side by side in the column direction, while in the second embodiment, the patch units 22 in the fourth quadrant are arranged side by side in the row direction.

Figure 38:
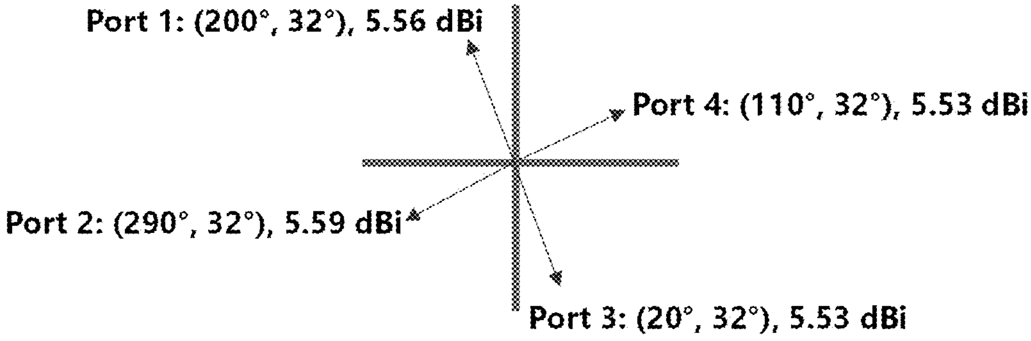
FIG. 38 is a schematic diagram showing beam directions (φ, θ) and gains obtained in accordance with a pattern simulation result of the multi-beam antenna according to the second embodiment of the present disclosure.
Figure 39:
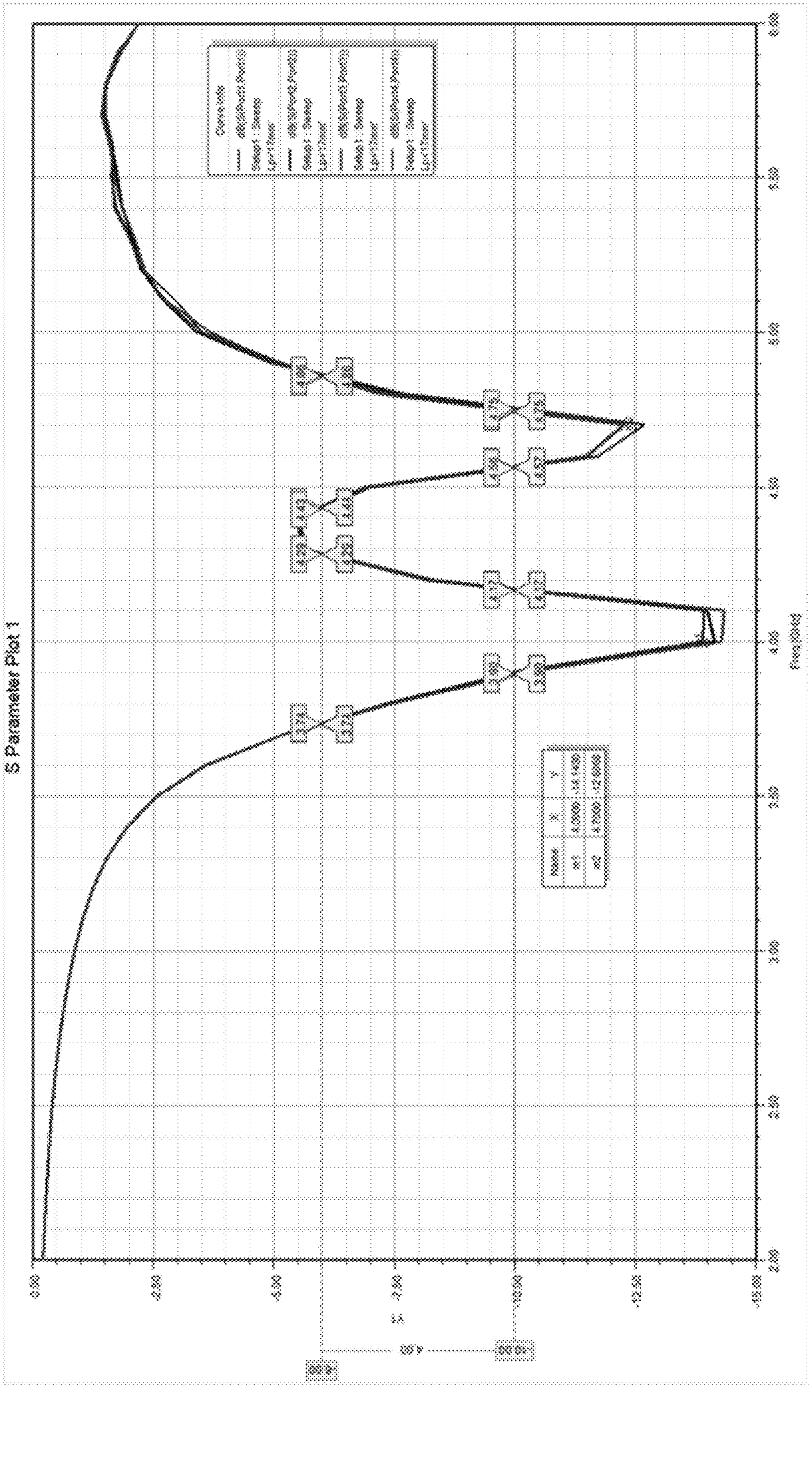
FIG. 39 is a simulation diagram of the S parameters of Port 1, Port 2, Port 3, and Port 4 of the multi-beam antenna according to the second embodiment of the present disclosure.
Figure 40:
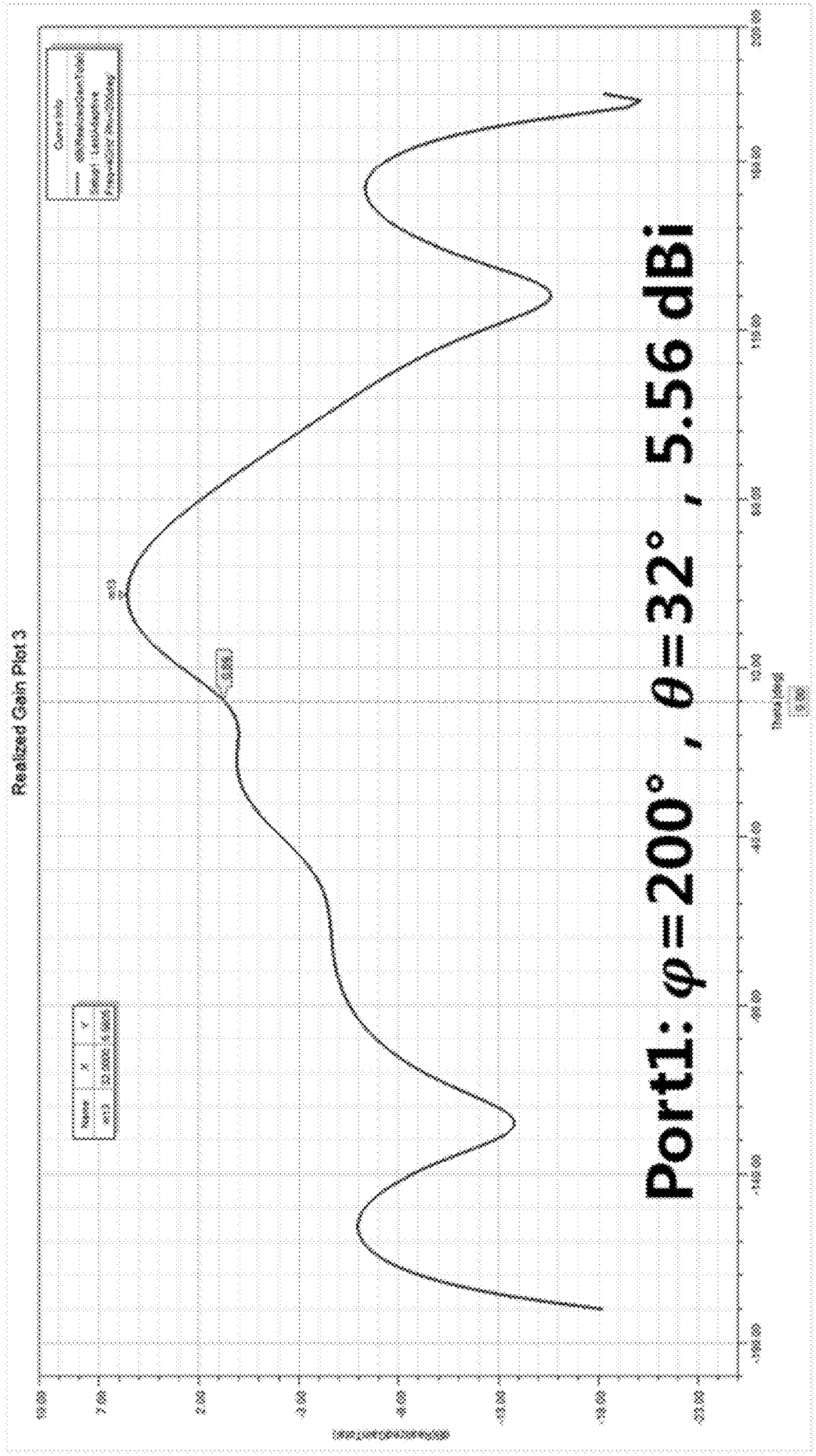
FIG. 40 is a two-dimensional simulation diagram of the multi-beam antenna when Port 1 is excited according to the second embodiment of the present disclosure.
Figure 41:
FIG. 41 is a two-dimensional simulation diagram of the multi-beam antenna when Port 2 is excited according to the second embodiment of the present disclosure.
Figure 42:
FIG. 42 is a two-dimensional simulation diagram of the multi-beam antenna when Port 3 is excited according to the second embodiment of the present disclosure.
Figure 43:
FIG. 43 is a two-dimensional simulation diagram of the multi-beam antenna when Port 4 is excited according to the second embodiment of the present disclosure.
Figure 44:
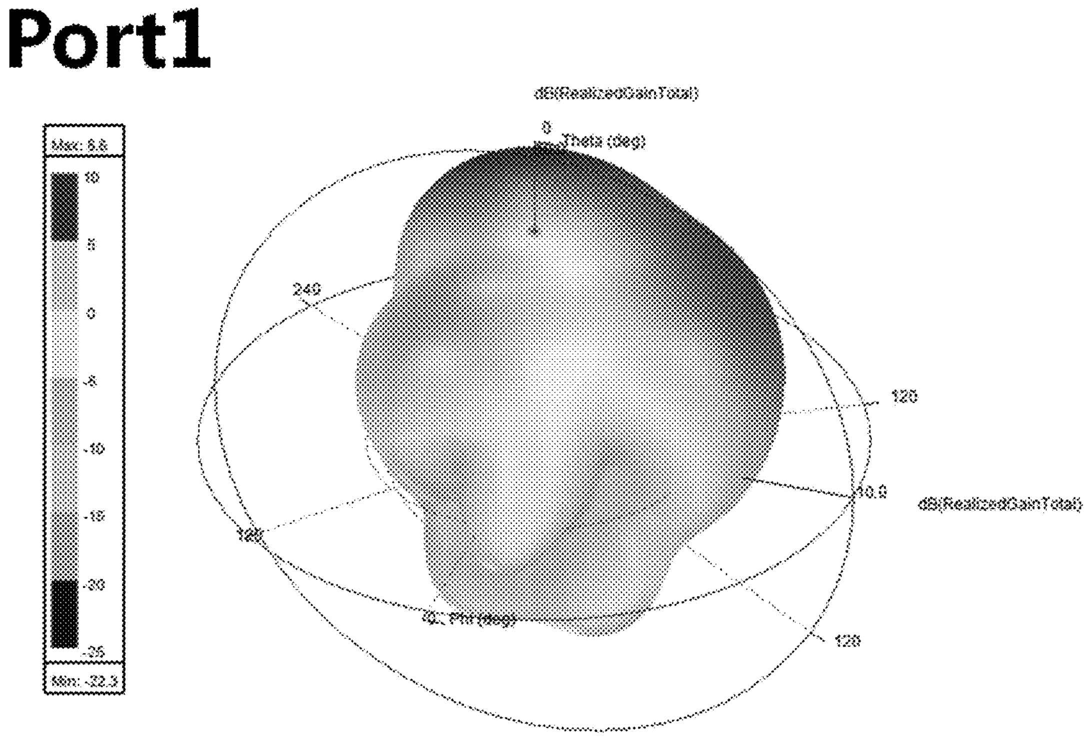
FIG. 44 is a three-dimensional simulation diagram of the multi-beam antenna when Port 1 is excited according to the second embodiment of the present disclosure.
Figure 45:
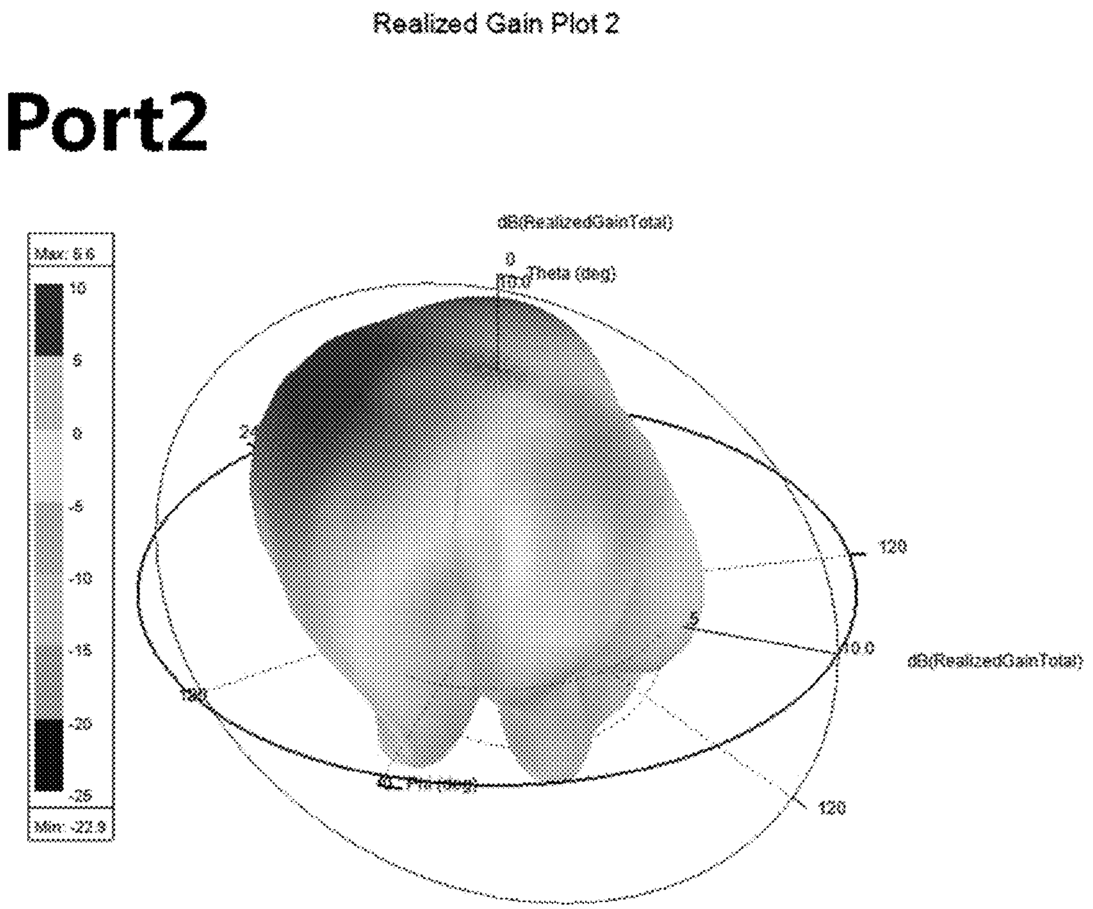
FIG. 45 is a three-dimensional simulation diagram of the multi-beam antenna when Port 2 is excited according to the second embodiment of the present disclosure.
Figure 46:
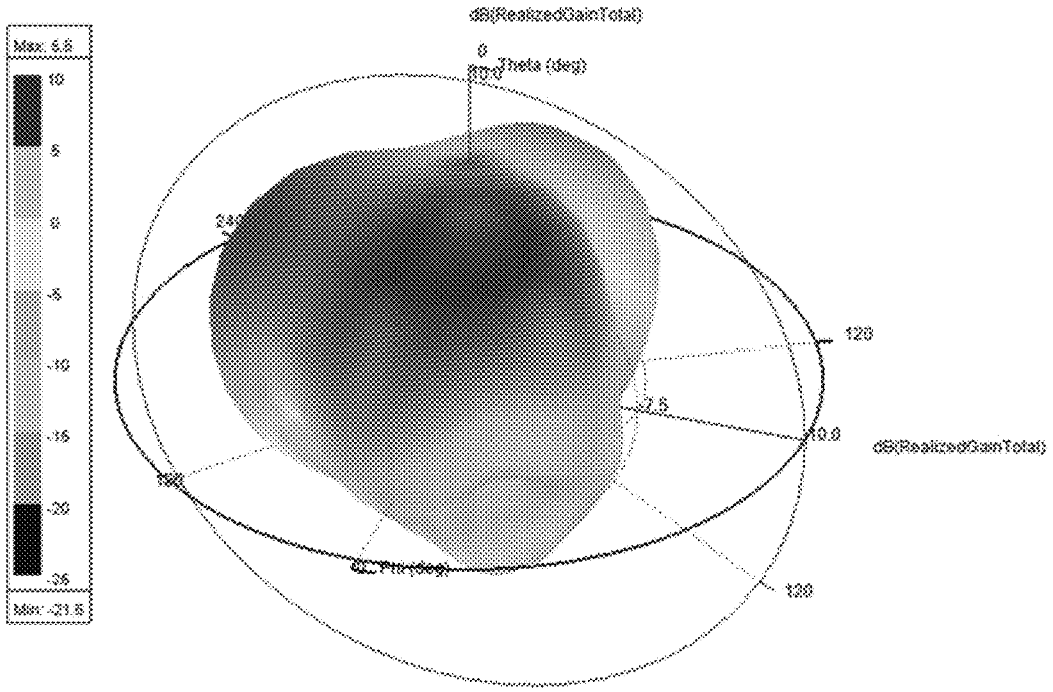
FIG. 46 is a three-dimensional simulation diagram of the multi-beam antenna when Port 3 is excited according to the second embodiment of the present disclosure.
Figure 47:
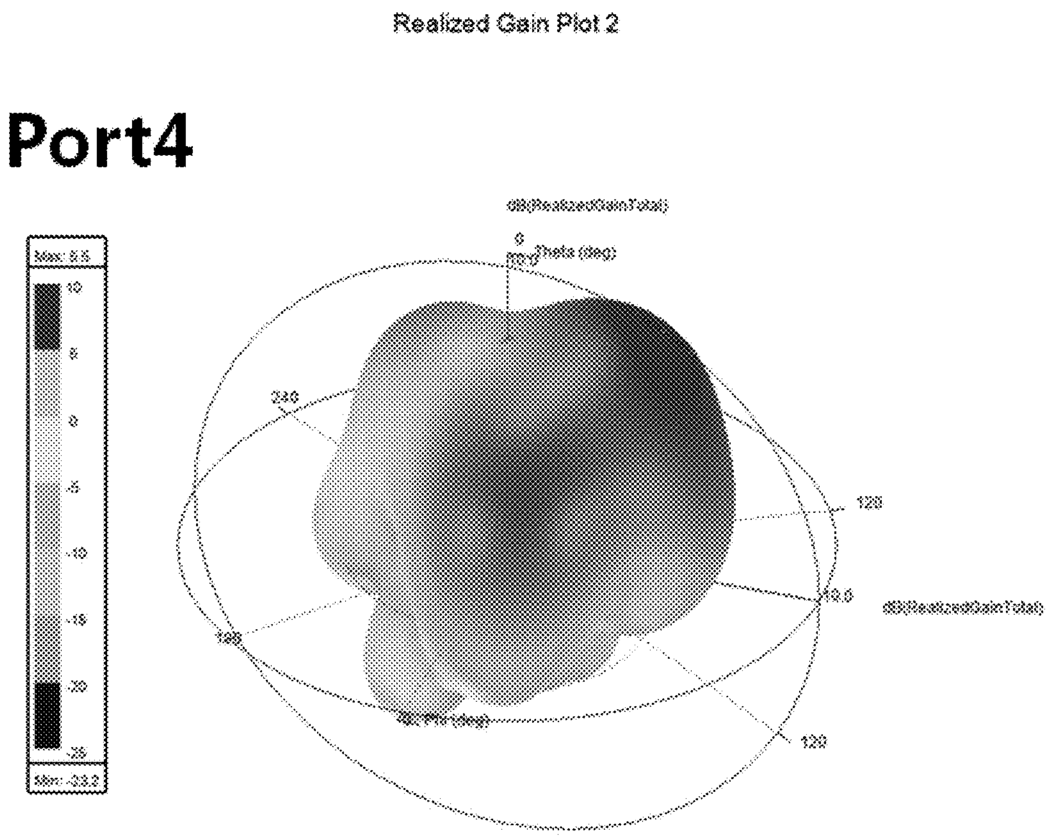
FIG. 47 is a three-dimensional simulation diagram of the multi-beam antenna when Port 4 is excited according to the second embodiment of the present disclosure.

When the four antenna units are each the antenna unit in FIG. 36 and the first distances for the three patch structures 221 in the patch unit 22 of each antenna unit are R1=6 mm, R2=5.1 mm and R3=2 mm, different feed ports are excited so as to obtain different beam directions. FIG. 38 is a schematic diagram showing beam directions (φ, θ) and gains obtained in accordance with a pattern simulation result of the multi-beam antenna according to the second embodiment of the present disclosure. As shown in FIG. 38, for the four beams, φ is 200°/290°/20°/110° with a difference of 90°, θ is 32°, and a maximum gain of the antenna is 5.53 dBi to 5.59 dBi. As compared with the first embodiment, in the second embodiment, the metasurface units are arranged in a different way, so that the four beams are caused to deflect by 10° more in the clockwise direction. FIG. 39 is a simulation diagram of the S parameters of Port 1, Port 2, Port 3, and Port 4 of the multi-beam antenna according to the second embodiment of the present disclosure, FIG. 40 is a two-dimensional simulation diagram of the multi-beam antenna when Port 1 is excited according to the second embodiment of the present disclosure, FIG. 41 is a two-dimensional simulation diagram of the multi-beam antenna when Port 2 is excited according to the second embodiment of the present disclosure, FIG. 42 is a two-dimensional simulation diagram of the multi-beam antenna when Port 3 is excited according to the second embodiment of the present disclosure, FIG. 43 is a two-dimensional simulation diagram of the multi-beam antenna when Port 4 is excited according to the second embodiment of the present disclosure, FIG. 44 is a three-dimensional simulation diagram of the multi-beam antenna when Port 1 is excited according to the second embodiment of the present disclosure, FIG. 45 is a three-dimensional simulation diagram of the multi-beam antenna when Port 2 is excited according to the second embodiment of the present disclosure, FIG. 46 is a three-dimensional simulation diagram of the multi-beam antenna when Port 3 is excited according to the second embodiment of the present disclosure, and FIG. 47 is a three-dimensional simulation diagram of the multi-beam antenna when Port 4 is excited according to the second embodiment of the present disclosure. Specific simulation results are shown in FIGS. 39 to 47.

Figure 48:
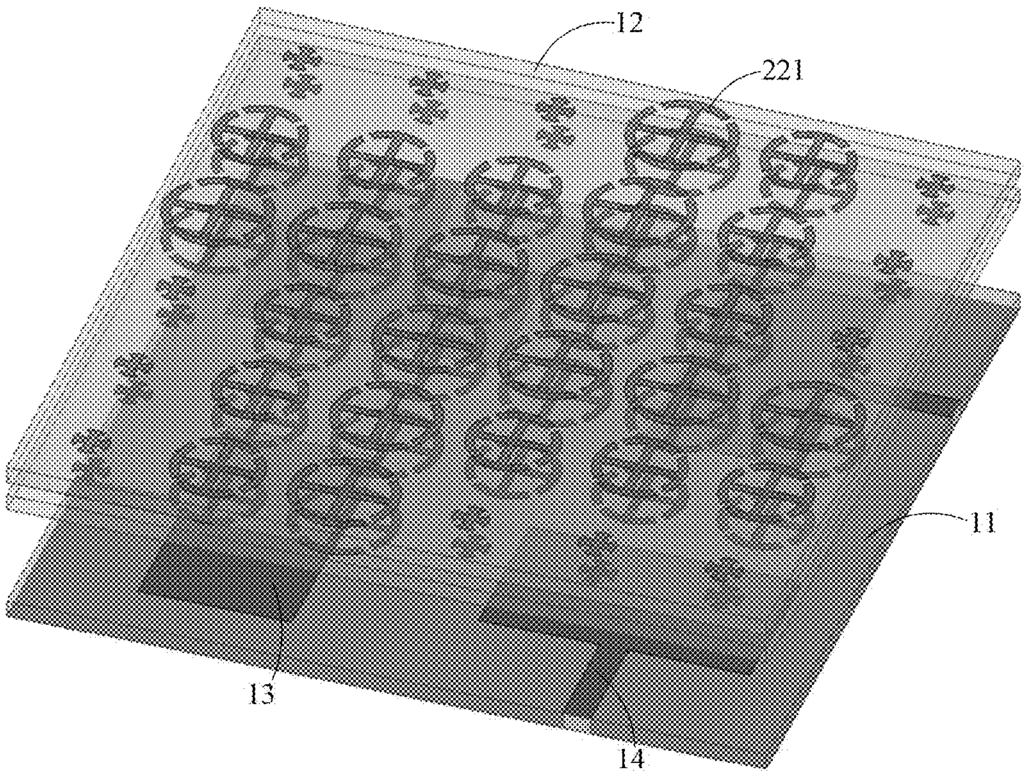
FIG. 48 is a solid view of the multi-beam antenna according to a third embodiment of the present disclosure.

FIG. 48 is a solid view of the multi-beam antenna according to a third embodiment of the present disclosure. As shown in FIG. 48, the multi-beam antenna is substantially the same as that in the second embodiment, and a difference merely lies in that there are two layers of metasurfaces. The two layers of metasurfaces are spaced apart from each other by a spacing hg1. For example, hg1=3 mm.

Figure 49:
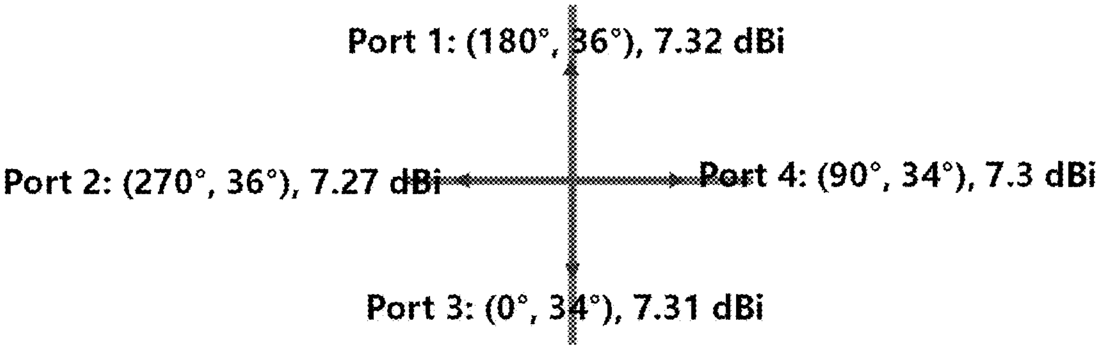
FIG. 49 is a schematic diagram showing beam directions (φ, θ) and gains obtained in accordance with a pattern simulation result of the multi-beam antenna according to the third embodiment of the present disclosure.
Figure 50:
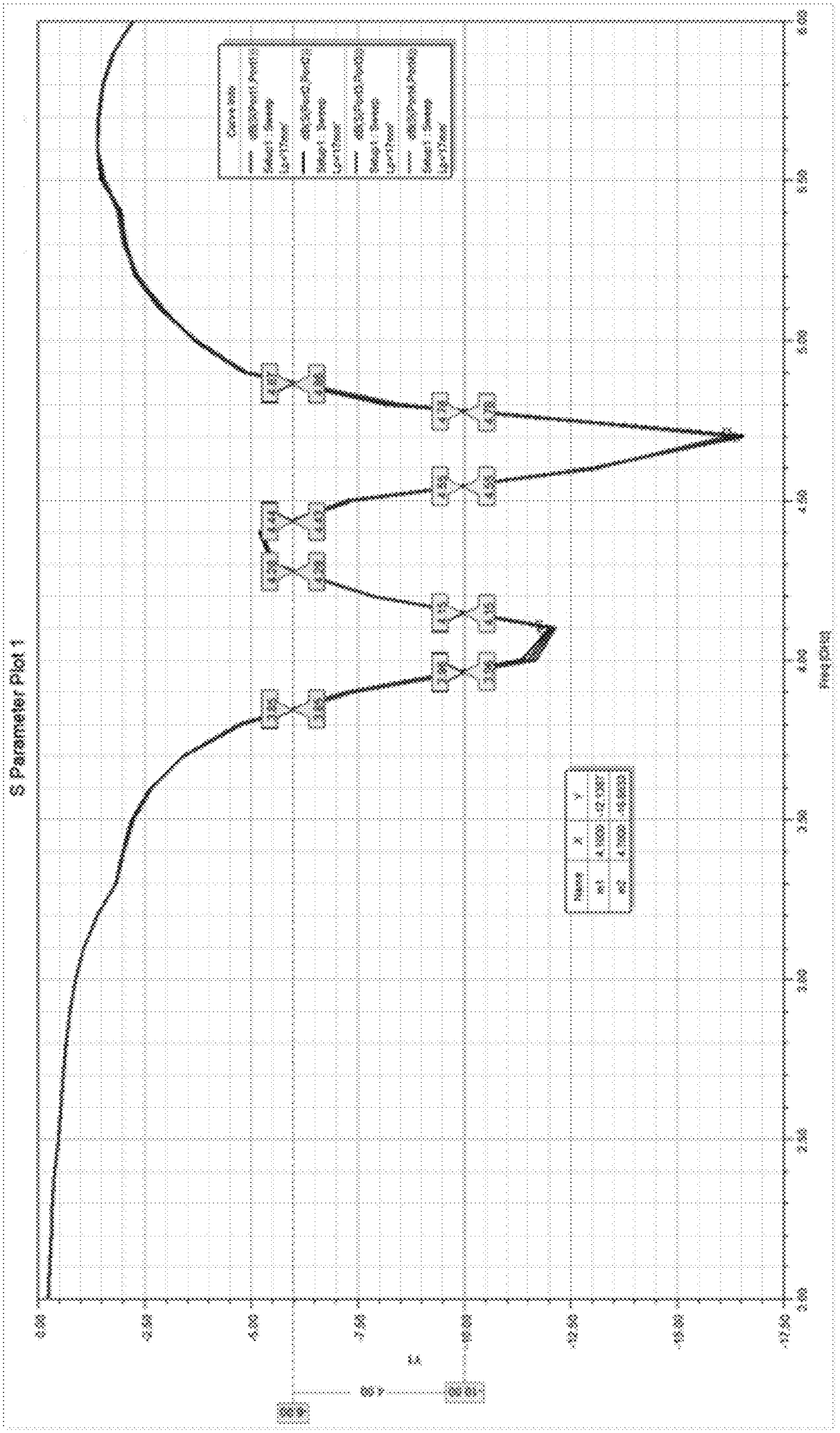
FIG. 50 is a simulation diagram of the S parameters of Port 1, Port 2, Port 3, and Port 4 of the multi-beam antenna according to the third embodiment of the present disclosure.
Figure 51:
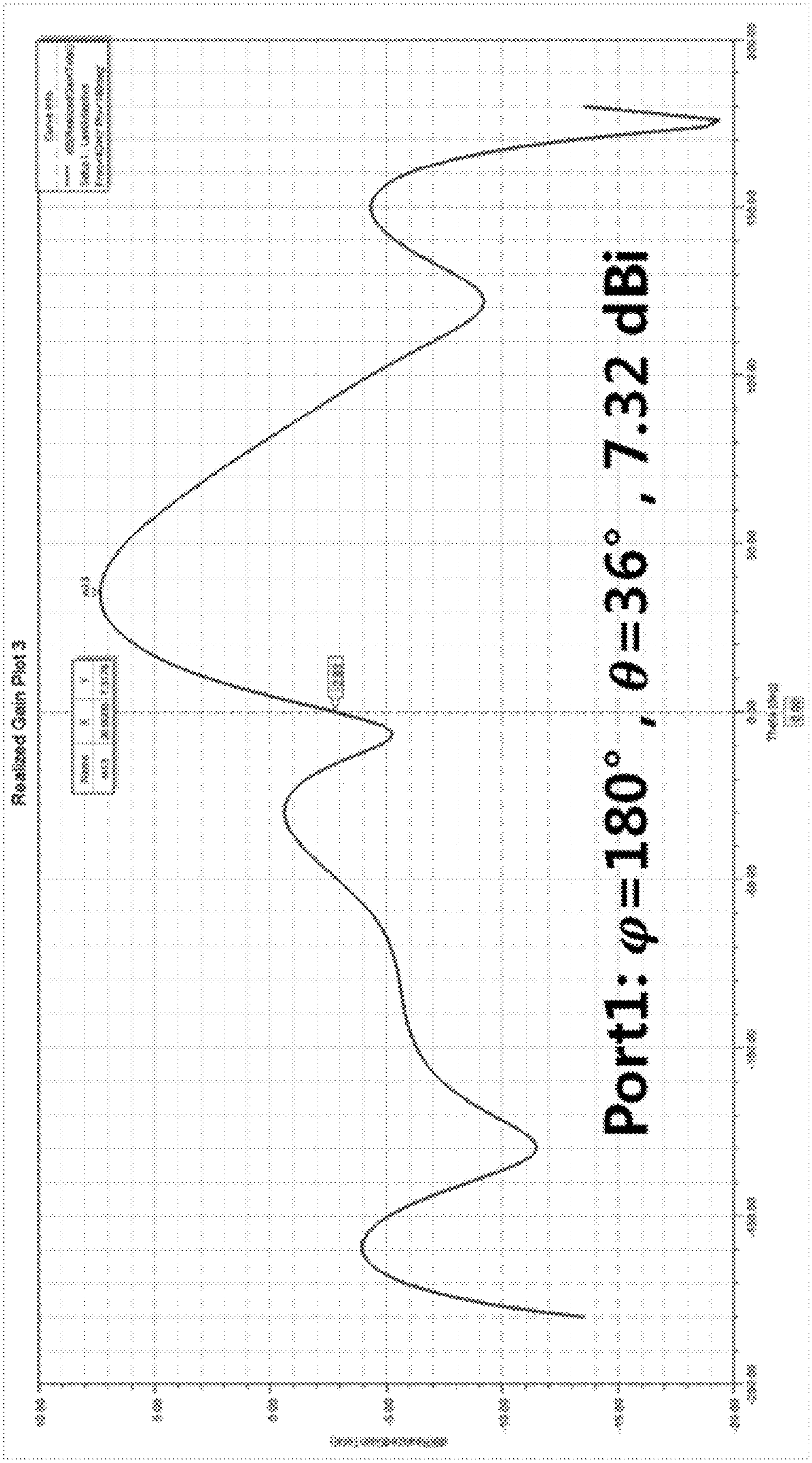
FIG. 51 is a two-dimensional simulation diagram of the multi-beam antenna when Port 1 is excited according to the third embodiment of the present disclosure.
Figure 52:
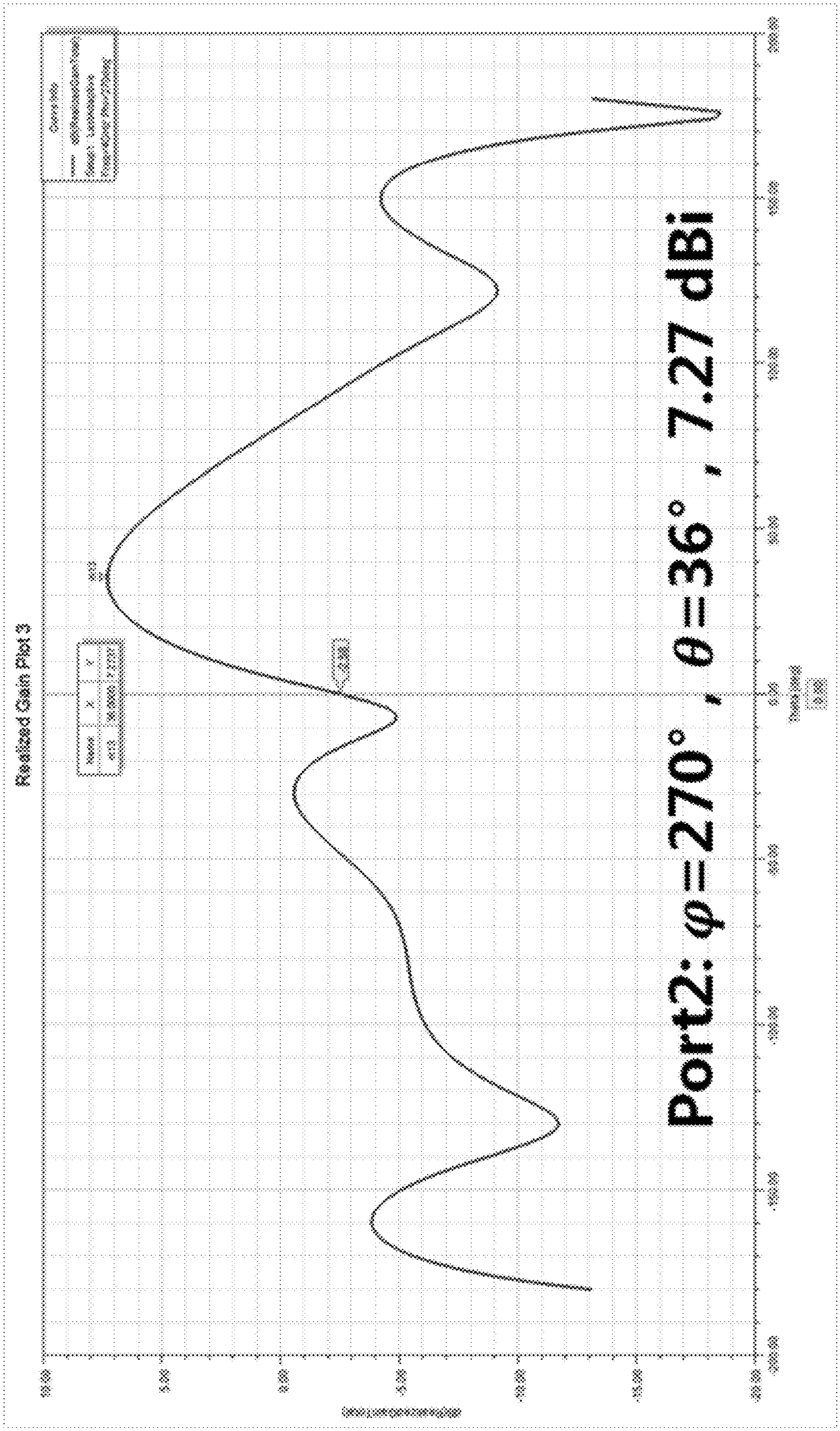
FIG. 52 is a two-dimensional simulation diagram of the multi-beam antenna when Port 2 is excited according to the third embodiment of the present disclosure.
Figure 53:
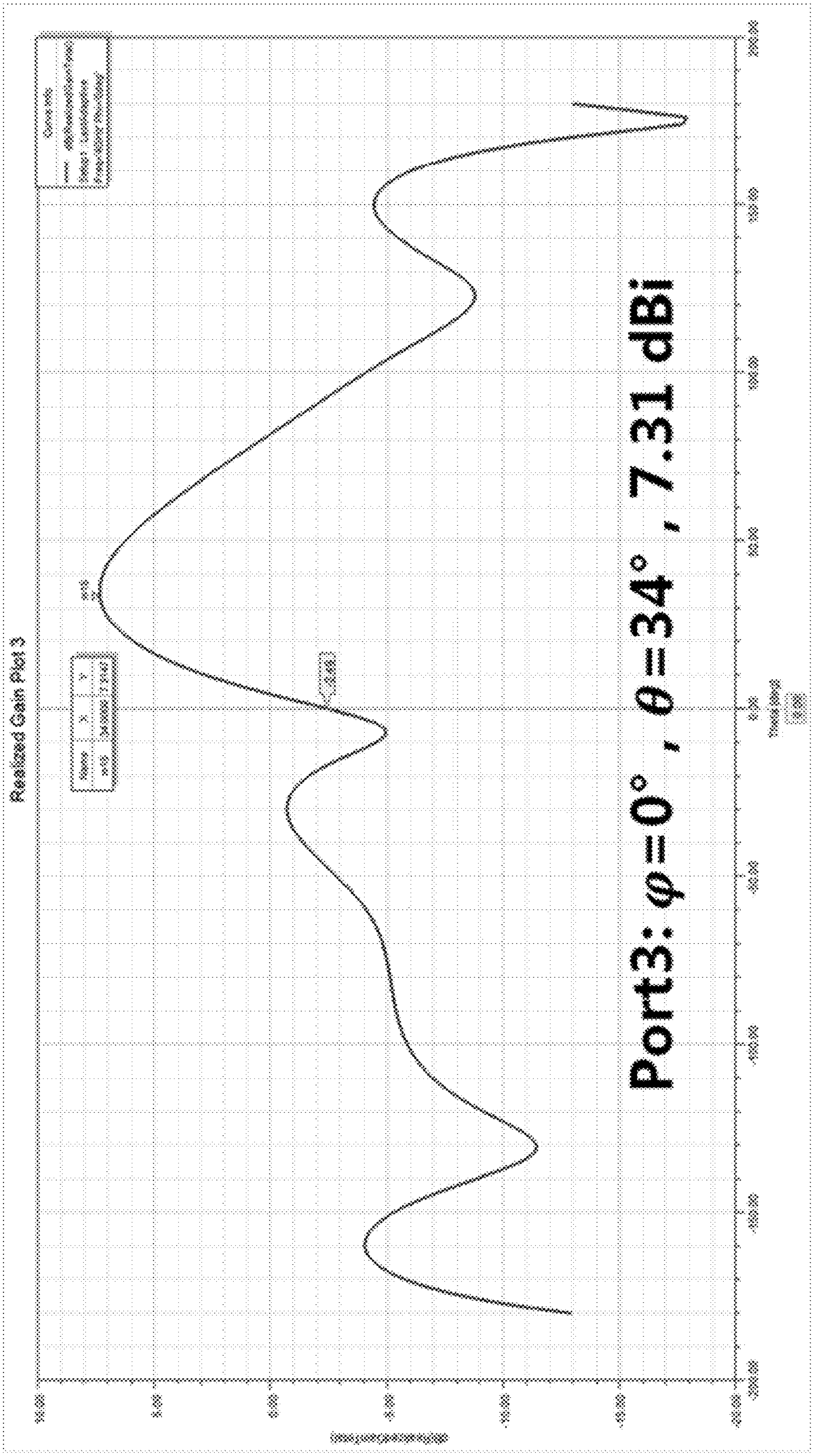
FIG. 53 is a two-dimensional simulation diagram of the multi-beam antenna when Port 3 is excited according to the third embodiment of the present disclosure.
Figure 54:
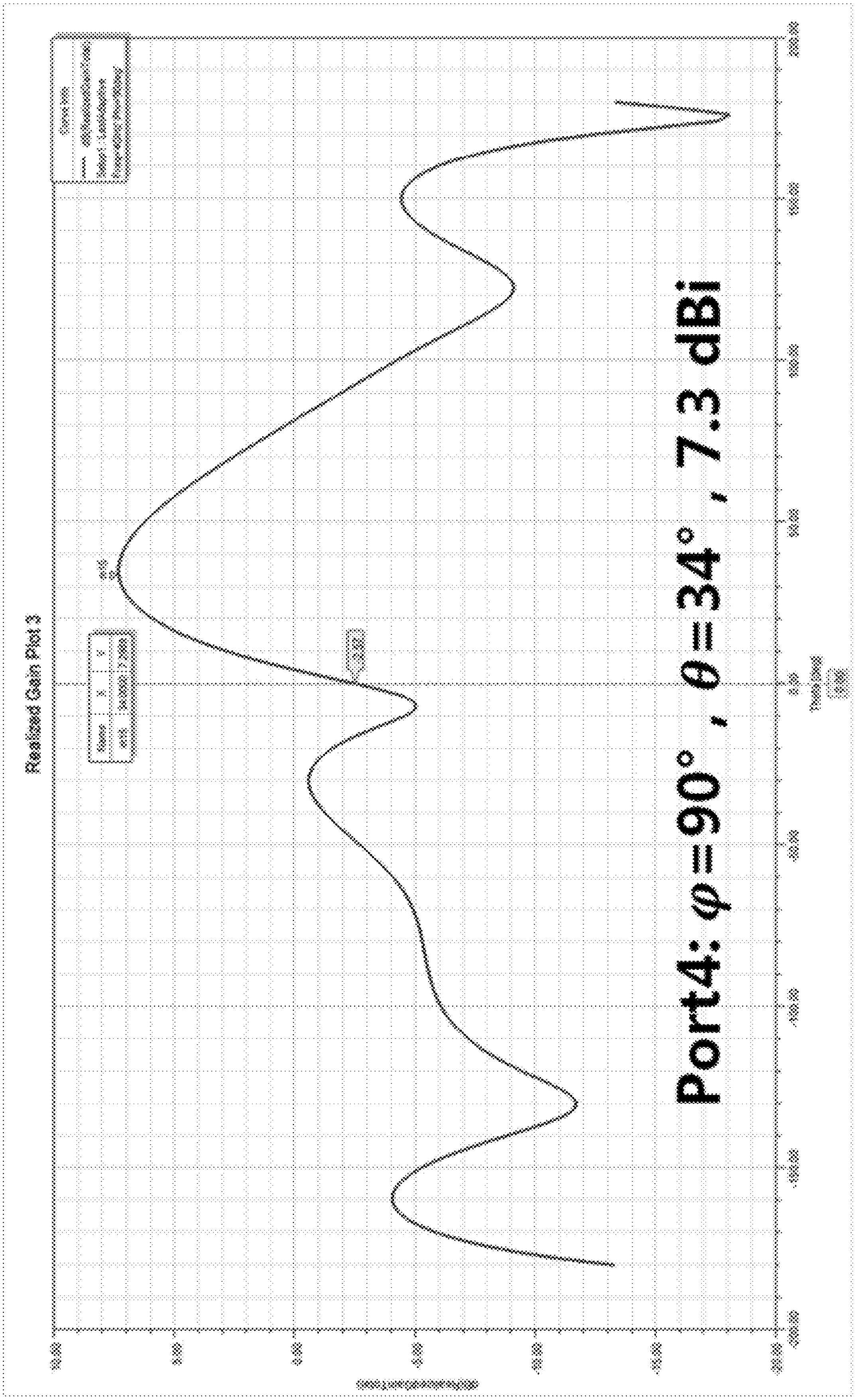
FIG. 54 is a two-dimensional simulation diagram of the multi-beam antenna when Port 4 is excited according to the third embodiment of the present disclosure.
Figure 55:
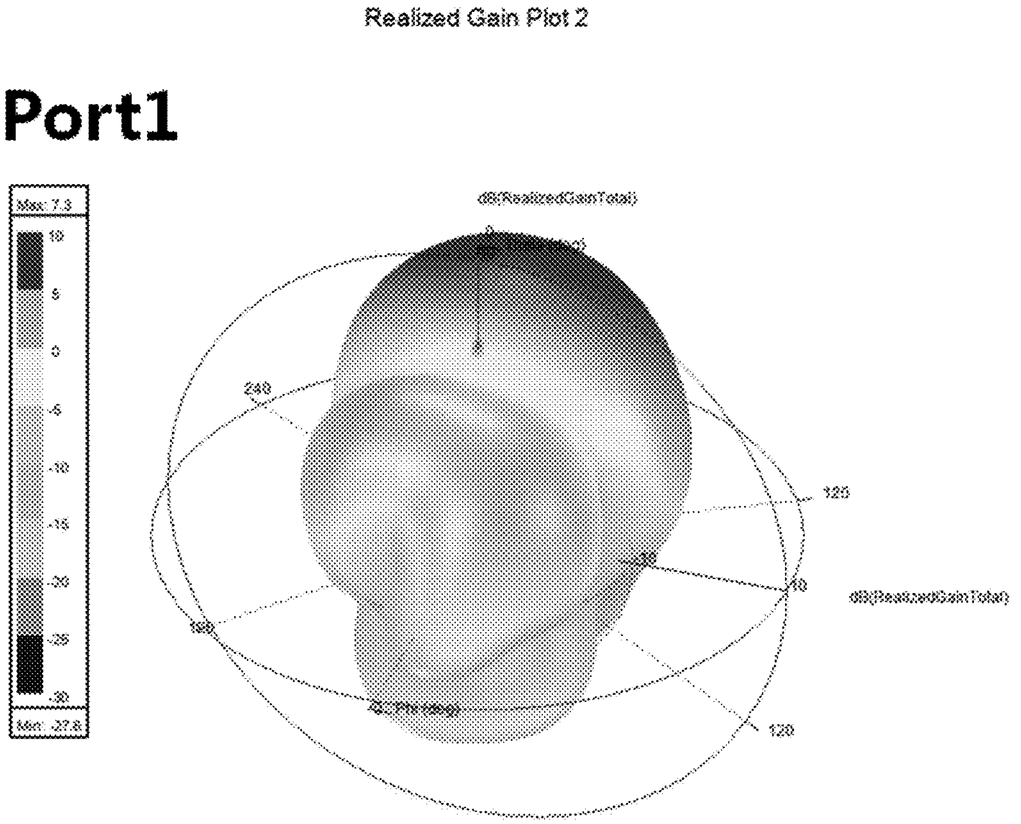
FIG. 55 is a three-dimensional simulation diagram of the multi-beam antenna when Port 1 is excited according to the third embodiment of the present disclosure.
Figure 56:
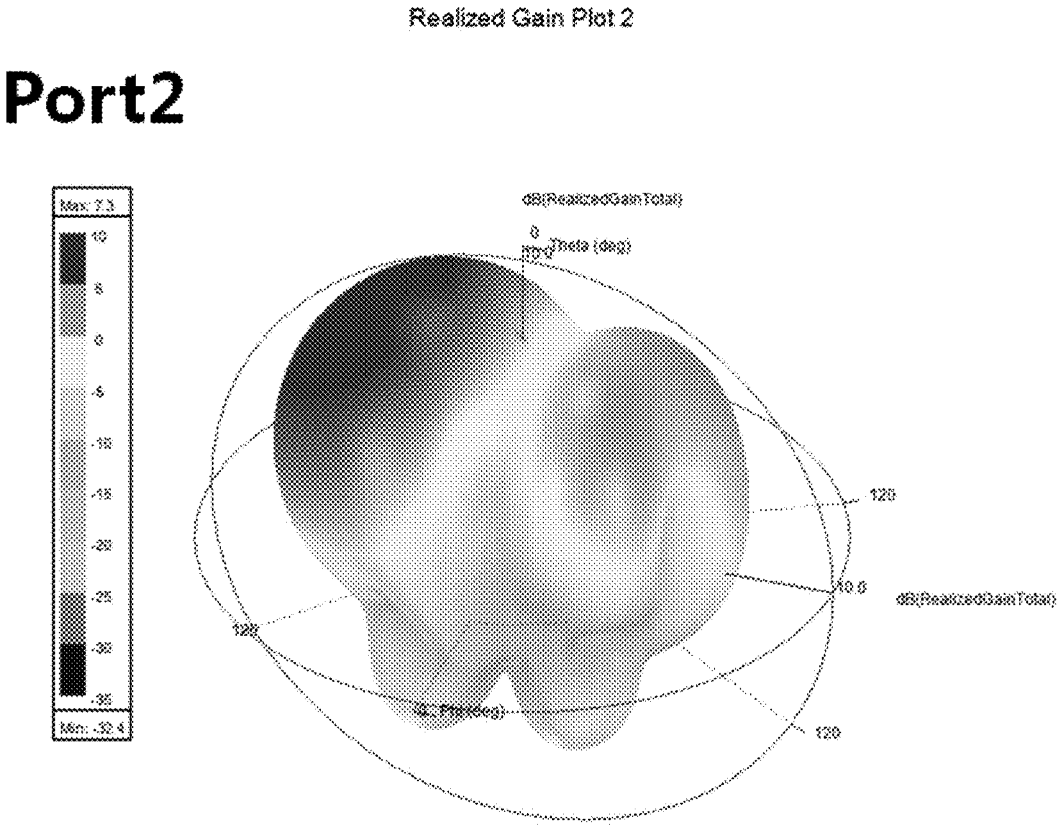
FIG. 56 is a three-dimensional simulation diagram of the multi-beam antenna when Port 2 is excited according to the third embodiment of the present disclosure.
Figure 57:
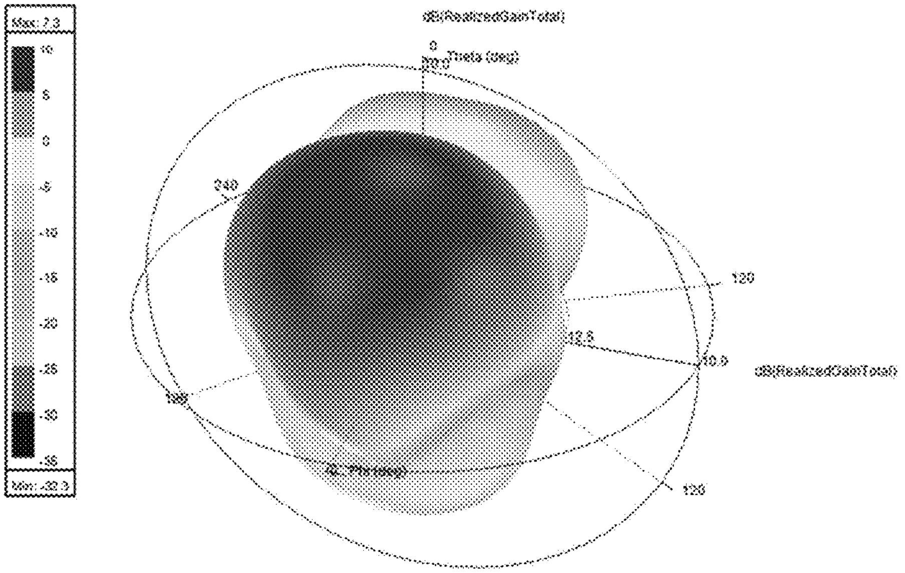
FIG. 57 is a three-dimensional simulation diagram of the multi-beam antenna when Port 3 is excited according to the third embodiment of the present disclosure.
Figure 58:
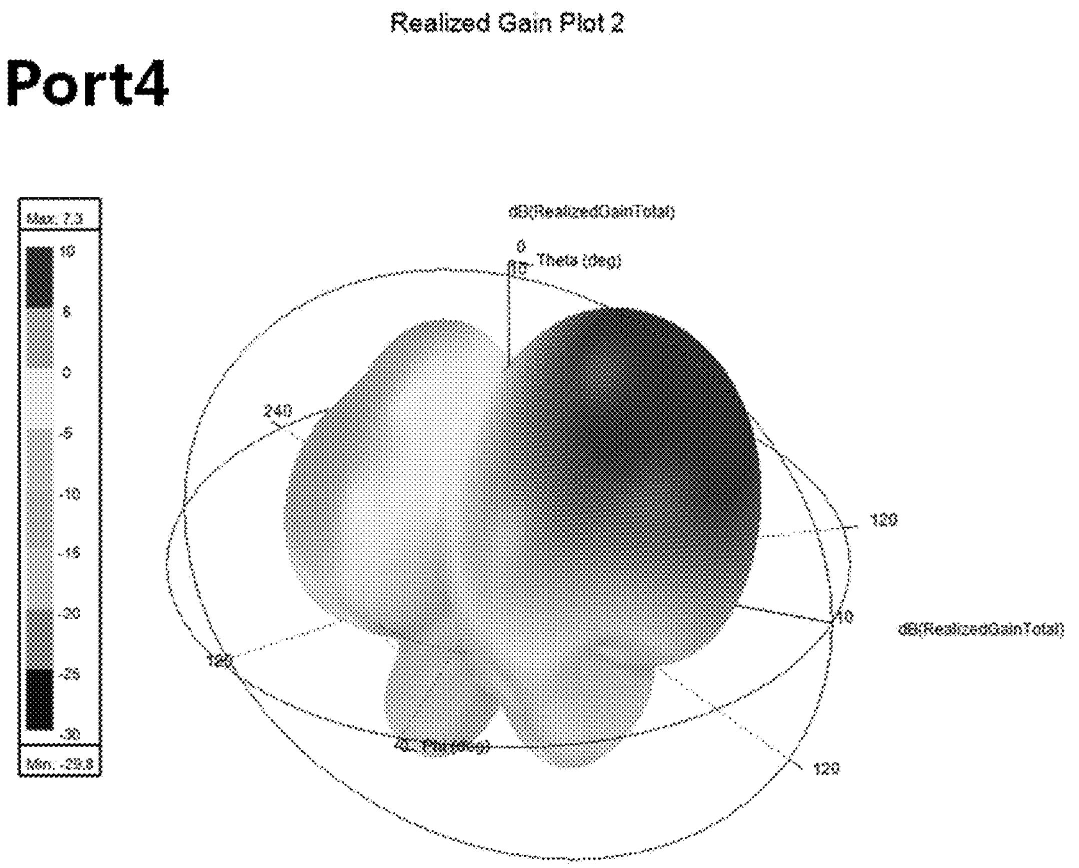
FIG. 58 is a three-dimensional simulation diagram of the multi-beam antenna when Port 4 is excited according to the third embodiment of the present disclosure.

When the four antenna units are each the antenna unit in FIG. 48 and the first distances for the three patch structures 221 in the patch unit 22 of each antenna unit are R1=6 mm, R2=5.1 mm and R3=2 mm, different feed ports are excited so as to obtain different beam directions. FIG. 49 is a schematic diagram showing beam directions (φ, θ) and gains obtained in accordance with a pattern simulation result of the multi-beam antenna according to the third embodiment of the present disclosure. As shown in FIG. 49, through the two layers of metasurfaces, it is able to provide a higher antenna unit gain, e.g., from 5.6 dBi (in the second embodiment) to 7.3 dBi. In addition, the four beams are deflected through the two layers of metasurfaces by φ exactly to the horizontal and vertical directions. The scanning angle θ is 34° to 36°. FIG. 50 is a simulation diagram of the S parameters of Port 1, Port 2, Port 3, and Port 4 of the multi-beam antenna according to the third embodiment of the present disclosure, FIG. 51 is a two-dimensional simulation diagram of the multi-beam antenna when Port 1 is excited according to the third embodiment of the present disclosure, FIG. 52 is a two-dimensional simulation diagram of the multi-beam antenna when Port 2 is excited according to the third embodiment of the present disclosure, FIG. 53 is a two-dimensional simulation diagram of the multi-beam antenna when Port 3 is excited according to the third embodiment of the present disclosure, FIG. 54 is a two-dimensional simulation diagram of the multi-beam antenna when Port 4 is excited according to the third embodiment of the present disclosure, FIG. 55 is a three-dimensional simulation diagram of the multi-beam antenna when Port 1 is excited according to the third embodiment of the present disclosure, FIG. 56 is a three-dimensional simulation diagram of the multi-beam antenna when Port 2 is excited according to the third embodiment of the present disclosure, FIG. 57 is a three-dimensional simulation diagram of the multi-beam antenna when Port 3 is excited according to the third embodiment of the present disclosure, and FIG. 58 is a three-dimensional simulation diagram of the multi-beam antenna when Port 4 is excited according to the third embodiment of the present disclosure. Specific simulation results are shown in FIGS. 50 to 58.

Figure 59:
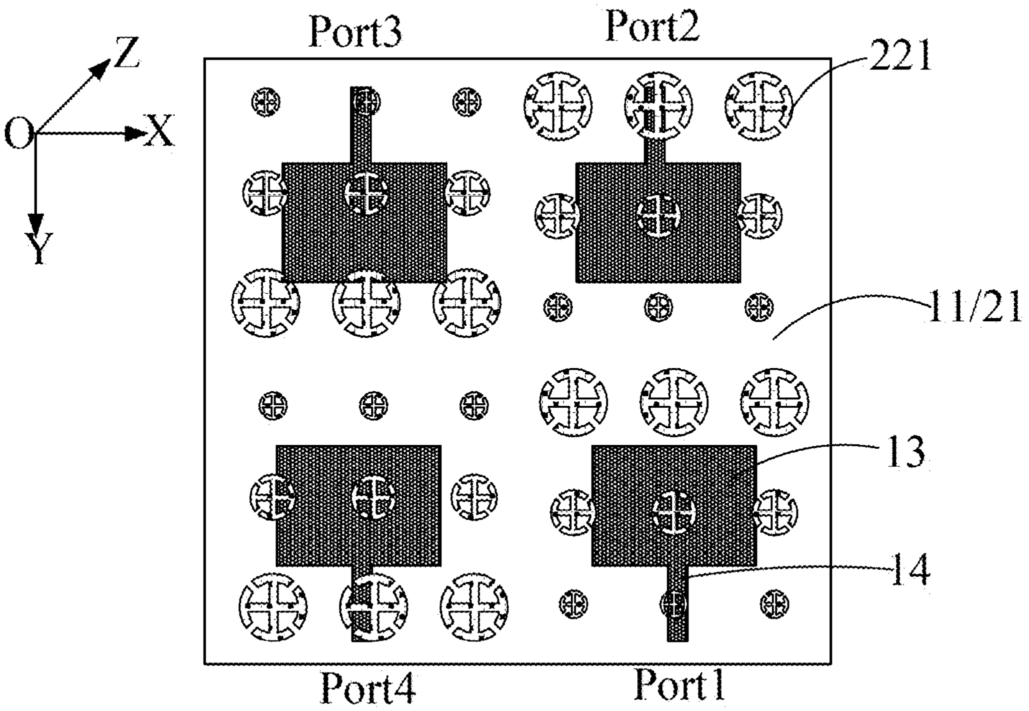
FIG. 59 is a top view of the multi-beam antenna according to a fourth embodiment of the present disclosure.
Figure 60:
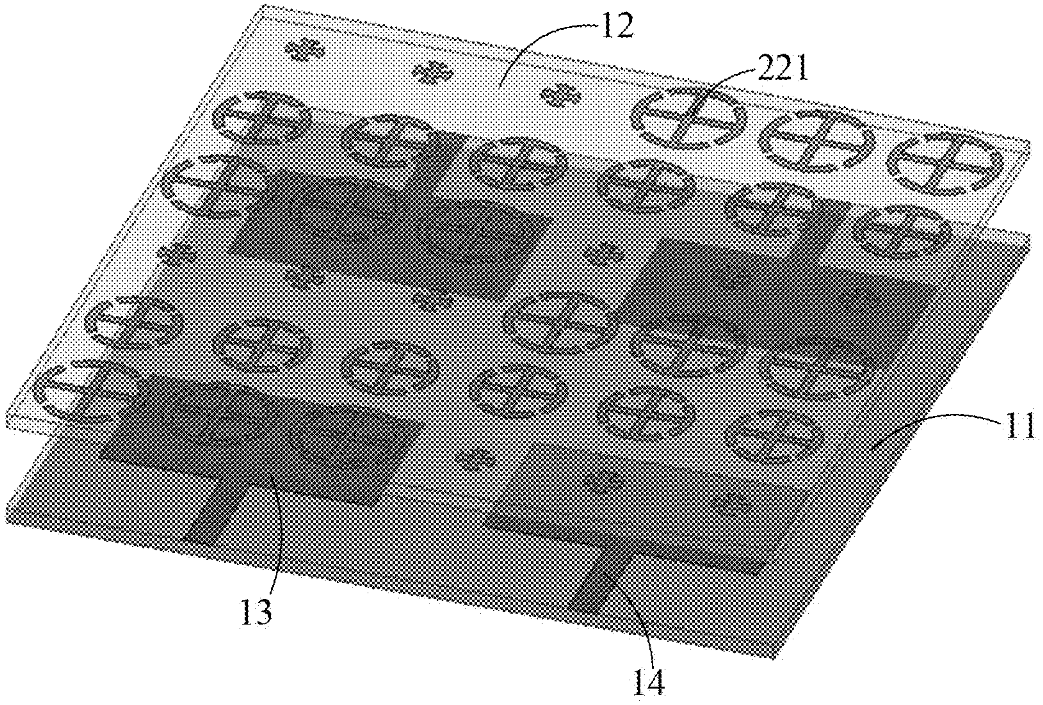
FIG. 60 is a solid view of the multi-beam antenna according to the fourth embodiment of the present disclosure.

FIG. 59 is a top view of the multi-beam antenna according to a fourth embodiment of the present disclosure, and FIG. 60 is a solid view of the multi-beam antenna according to the fourth embodiment of the present disclosure. As shown in FIGS. 59 and 60, the multi-beam antenna is substantially the same as that in the second embodiment, and a difference merely lies in that a coordinate system is established with a center of the multi-beam antenna as an origin, a row direction as an X-axis, a column direction as a Y-axis, and a thickness direction of the multi-beam antenna as a Z-axis. Two adjacent antenna units in the row or column direction are arranged symmetrically with each other about a plane formed by the Y-axis, the origin, and the Z-axis. For example, the structures of the antenna units in the first quadrant and the fourth quadrant are completely the same, and the structures of the antenna units in the second quadrant and the third quadrant are completely the same. The antenna units in the second quadrant and the fourth quadrant have beam directions opposite to each other, and the antenna units in the first quadrant and the third quadrant have beam directions opposite to each other.

Figure 61:
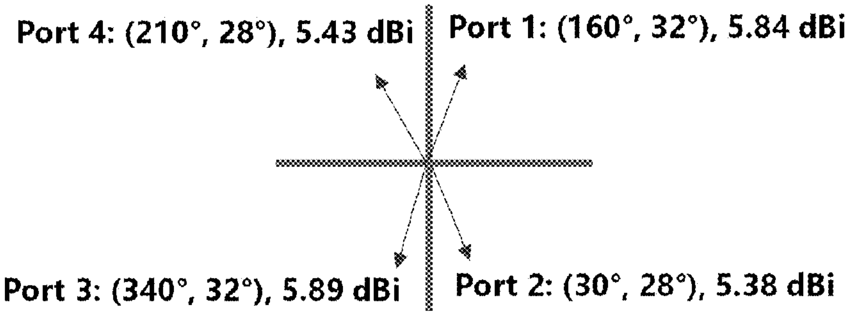
FIG. 61 is a schematic diagram showing beam directions (φ, θ) and gains obtained in accordance with a pattern simulation result of the multi-beam antenna according to the fourth embodiment of the present disclosure.
Figure 62:
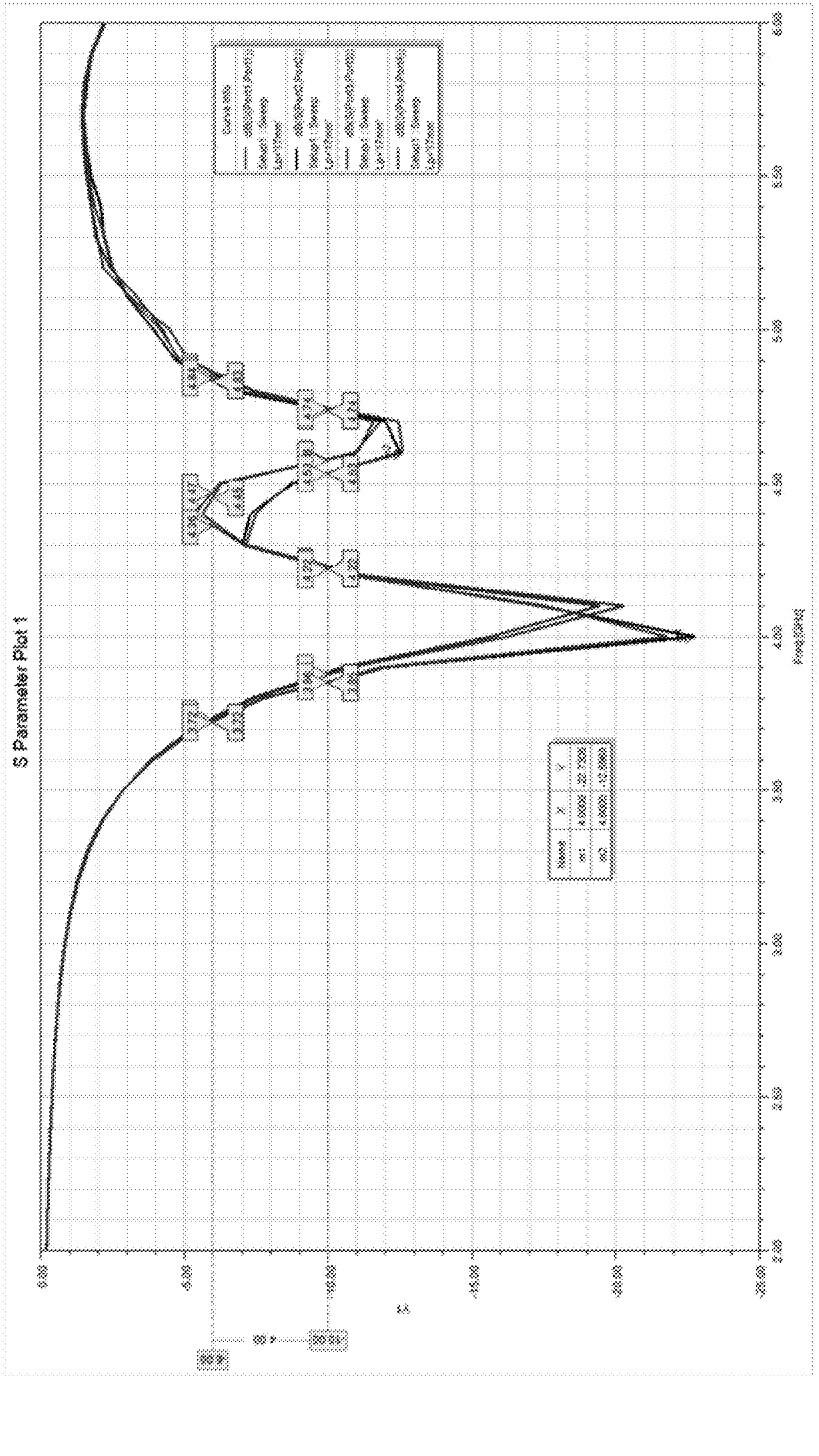
FIG. 62 is a simulation diagram of the S parameters of Port 1, Port 2, Port 3, and Port 4 of the multi-beam antenna according to the fourth embodiment of the present disclosure.
Figure 63:
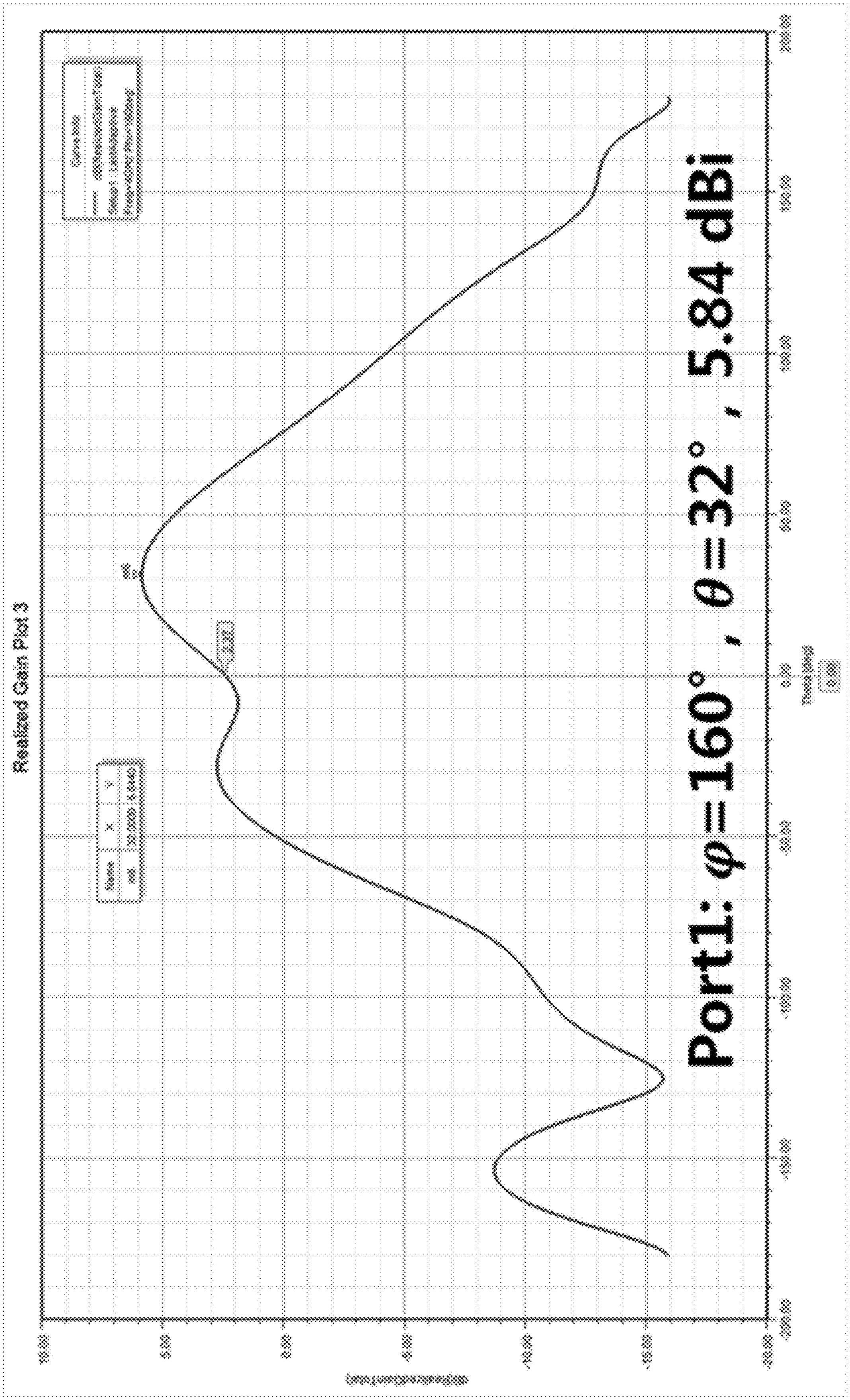
FIG. 63 is a two-dimensional simulation diagram of the multi-beam antenna when Port 1 is excited according to the fourth embodiment of the present disclosure.
Figure 64:
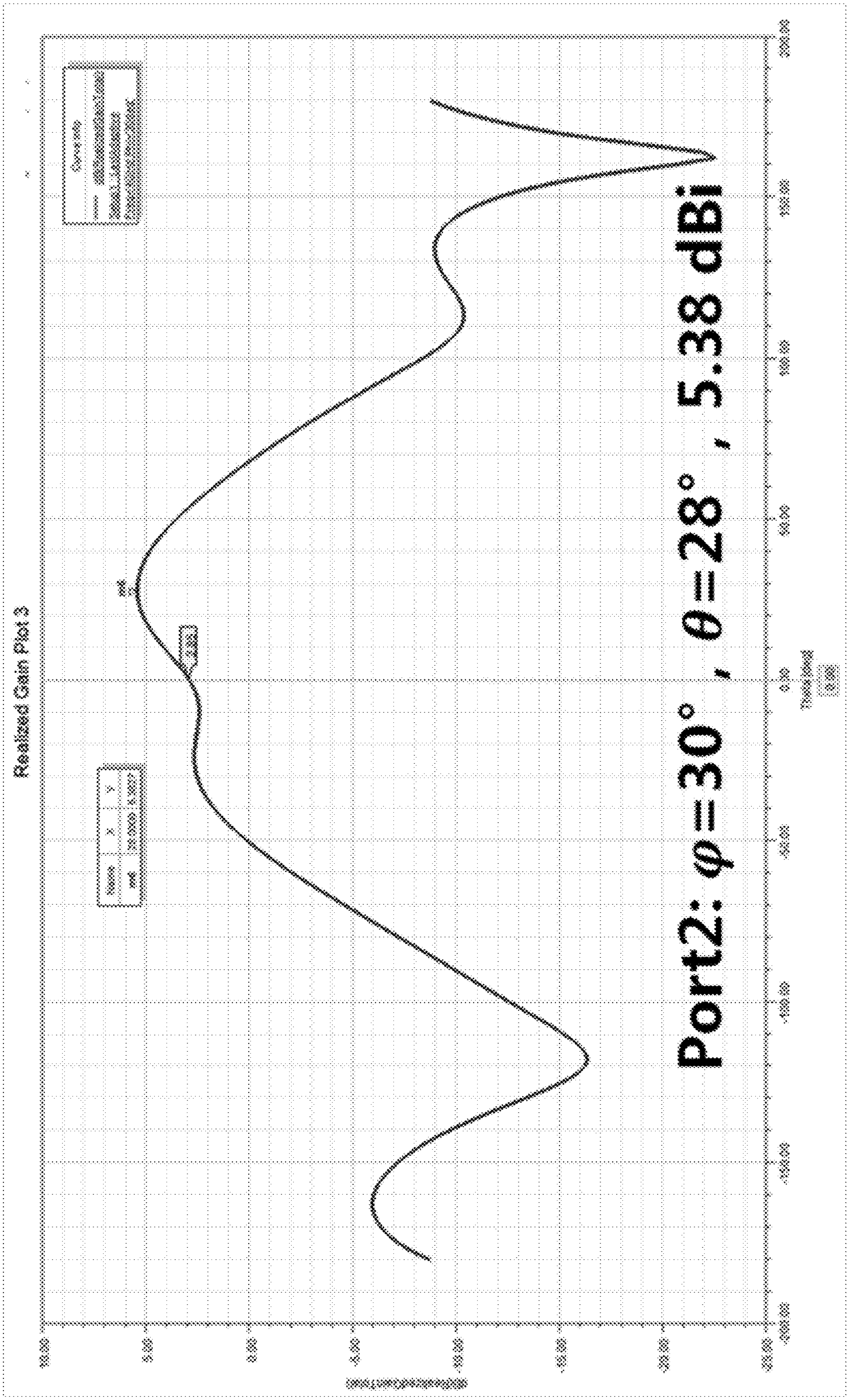
FIG. 64 is a two-dimensional simulation diagram of the multi-beam antenna when Port 2 is excited according to the fourth embodiment of the present disclosure.
Figure 65:
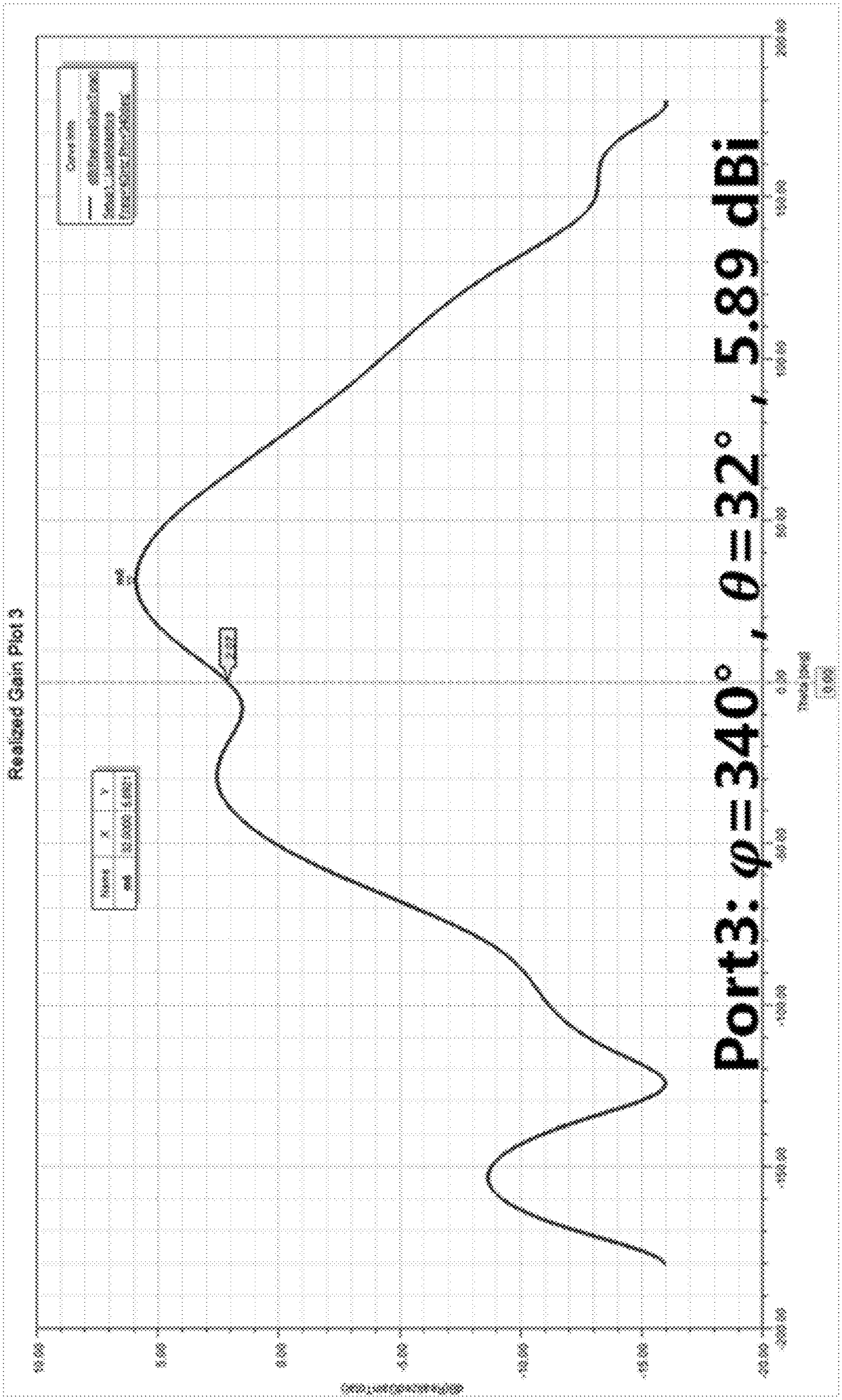
FIG. 65 is a two-dimensional simulation diagram of the multi-beam antenna when Port 3 is excited according to the fourth embodiment of the present disclosure.
Figure 66:
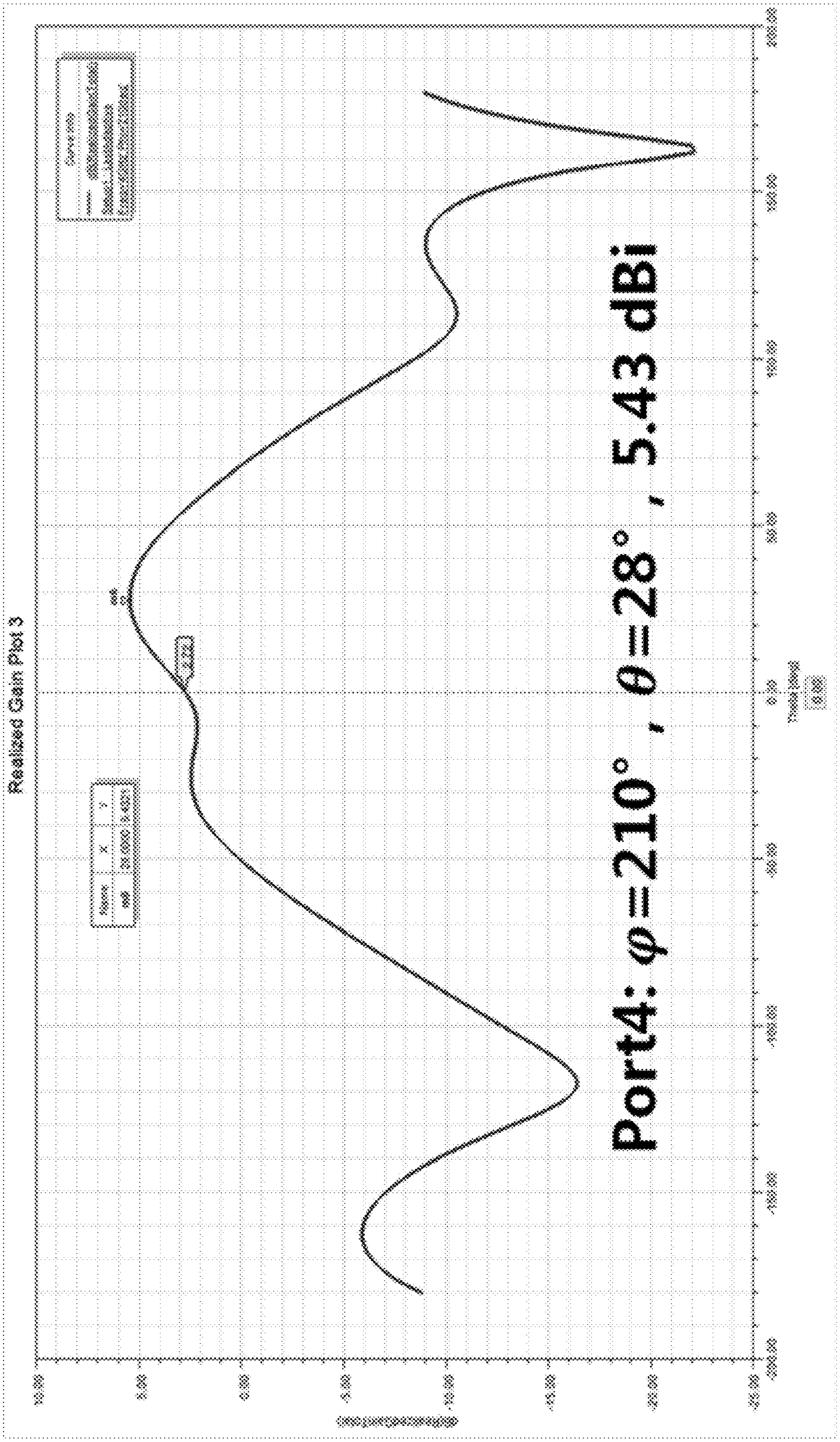
FIG. 66 is a two-dimensional simulation diagram of the multi-beam antenna when Port 4 is excited according to the fourth embodiment of the present disclosure.
Figure 67:
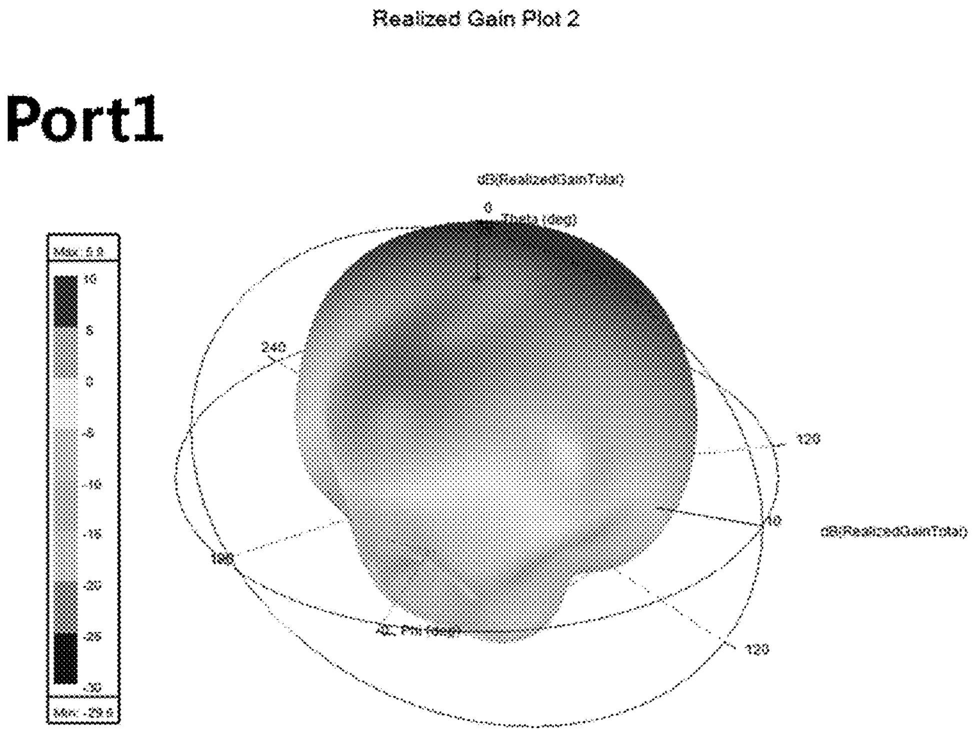
FIG. 67 is a three-dimensional simulation diagram of the multi-beam antenna when Port 1 is excited according to the fourth embodiment of the present disclosure.
Figure 68:
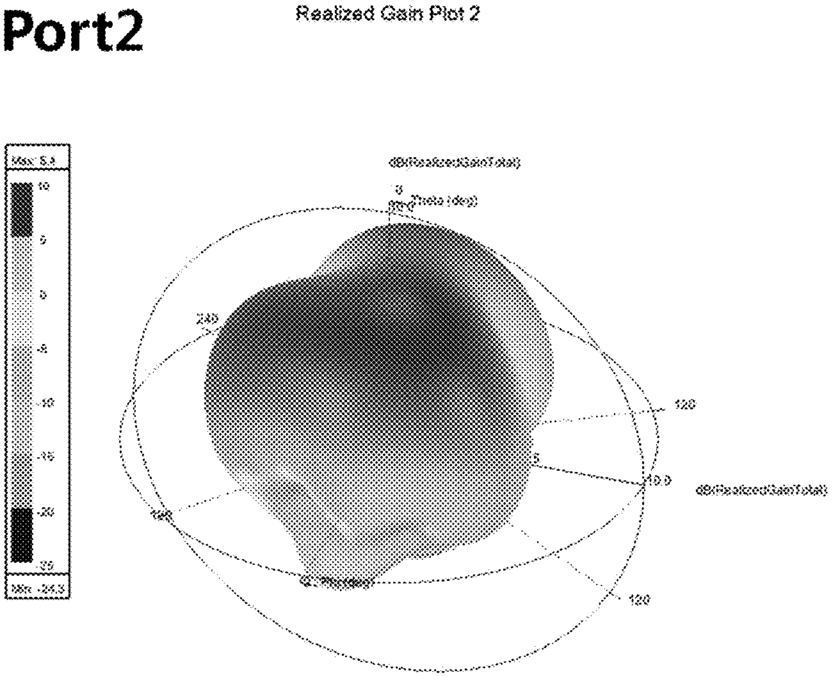
FIG. 68 is a three-dimensional simulation diagram of the multi-beam antenna when Port 2 is excited according to the fourth embodiment of the present disclosure.
Figure 69:
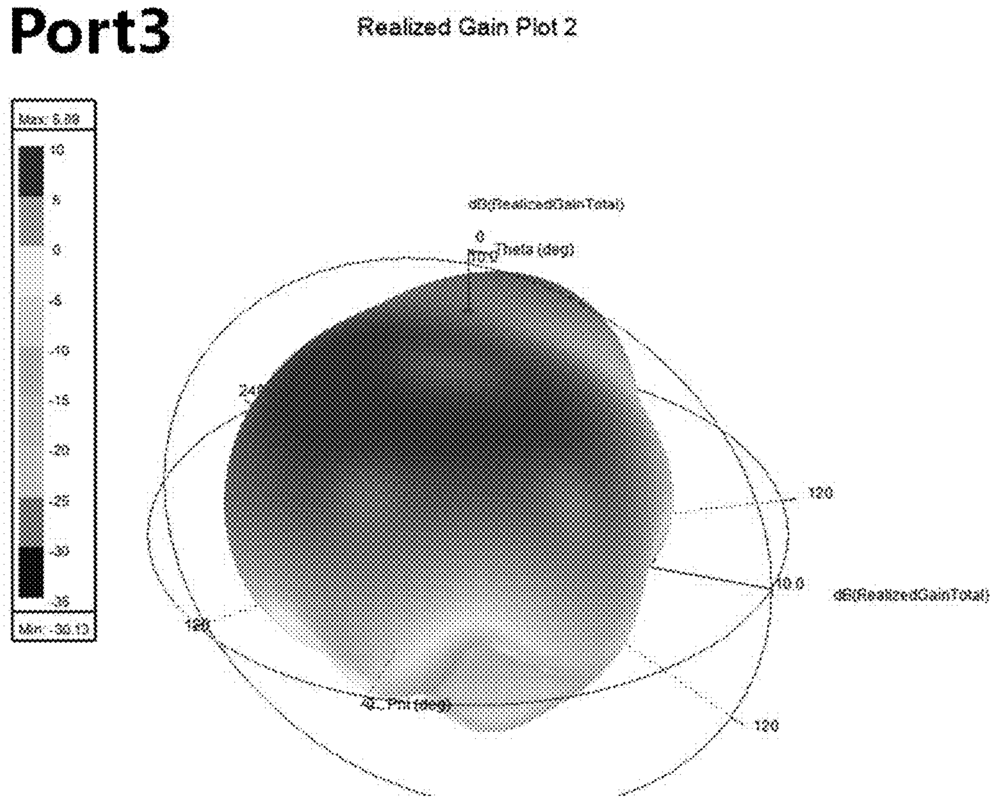
FIG. 69 is a three-dimensional simulation diagram of the multi-beam antenna when Port 3 is excited according to the fourth embodiment of the present disclosure.
Figure 70:
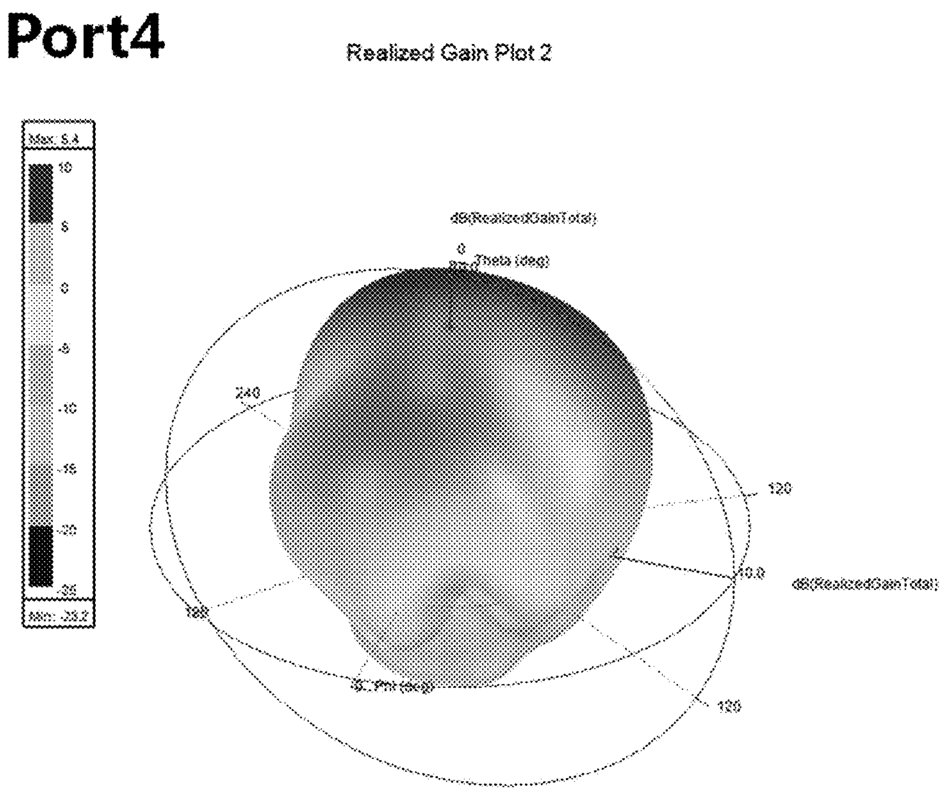
FIG. 70 is a three-dimensional simulation diagram of the multi-beam antenna when Port 4 is excited according to the fourth embodiment of the present disclosure.

When the four antenna units are each the antenna unit in FIG. 59 and the first distances for the three patch structures 221 in the patch unit 22 of each antenna unit are R1=6 mm, R2=5.1 mm and R3=2 mm, different feed ports are excited so as to obtain different beam directions. FIG. 61 is a schematic diagram showing beam directions (φ, θ) and gains obtained in accordance with a pattern simulation result of the multi-beam antenna according to the fourth embodiment of the present disclosure. As shown in FIG. 61, the antenna units in the second quadrant and the fourth quadrant have a same structure but have beam directions opposite to each other, so for the beams, φ are 160° and 340° with a difference of 180°, and the scanning angle θ is 32°. The antenna units in the first quadrant and the third quadrant have a same structure but have beam directions opposite to each other. For the beams, φ are 30° and 210°, and θ is 28°. Based on the above, apart from an angle of 90° between two adjacent beams, the antenna units may be further arranged symmetrical with each other so that an angle between two adjacent beams not pointing opposite directions is 50°. FIG. 62 is a simulation diagram of the S parameters of Port 1, Port 2, Port 3, and Port 4 of the multi-beam antenna according to the fourth embodiment of the present disclosure, FIG. 63 is a two-dimensional simulation diagram of the multi-beam antenna when Port 1 is excited according to the fourth embodiment of the present disclosure, FIG. 64 is a two-dimensional simulation diagram of the multi-beam antenna when Port 2 is excited according to the fourth embodiment of the present disclosure, FIG. 65 is a two-dimensional simulation diagram of the multi-beam antenna when Port 3 is excited according to the fourth embodiment of the present disclosure, FIG. 66 is a two-dimensional simulation diagram of the multi-beam antenna when Port 4 is excited according to the fourth embodiment of the present disclosure, FIG. 67 is a three-dimensional simulation diagram of the multi-beam antenna when Port 1 is excited according to the fourth embodiment of the present disclosure, FIG. 68 is a three-dimensional simulation diagram of the multi-beam antenna when Port 2 is excited according to the fourth embodiment of the present disclosure, FIG. 69 is a three-dimensional simulation diagram of the multi-beam antenna when Port 3 is excited according to the fourth embodiment of the present disclosure, and FIG. 70 is a three-dimensional simulation diagram of the multi-beam antenna when Port 4 is excited according to the fourth embodiment of the present disclosure. Specific simulation results are shown in FIGS. 62 to 70.

Figure 71:
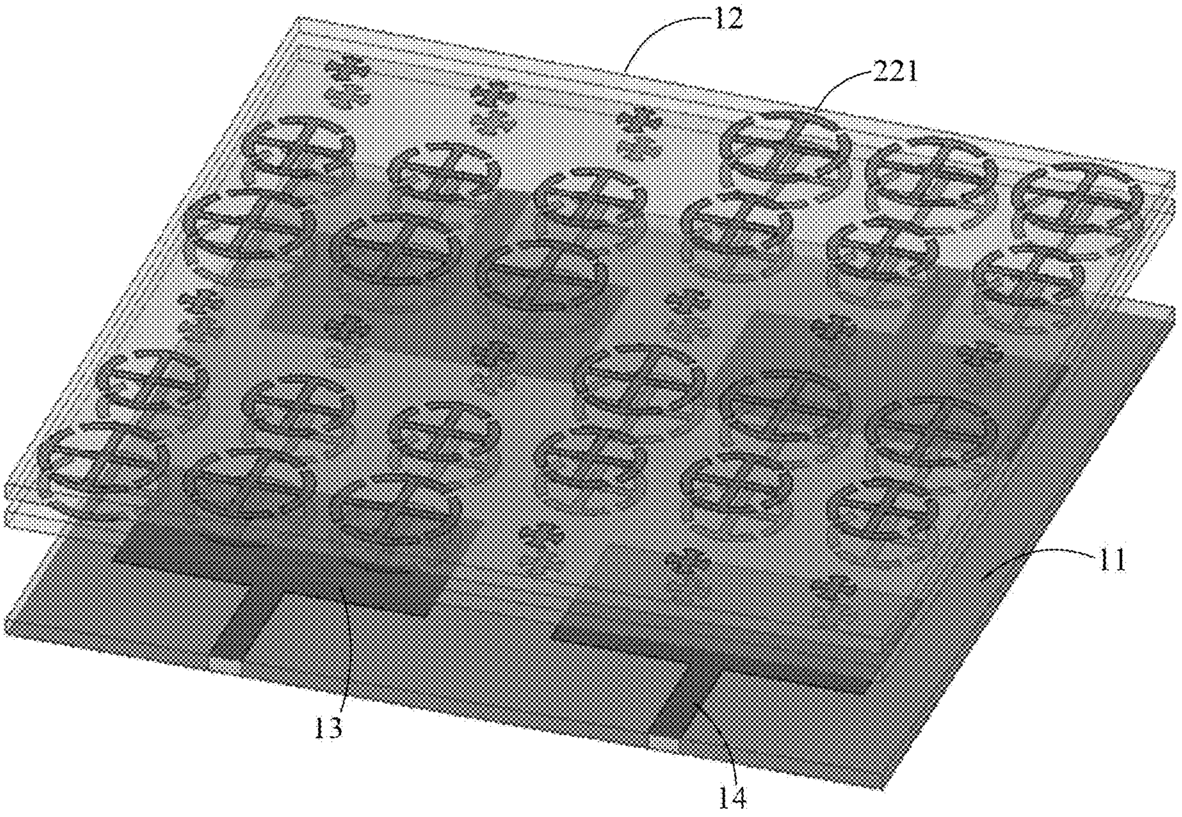
FIG. 71 is a solid view of the multi-beam antenna according to a fifth embodiment of the present disclosure.

FIG. 71 is a solid view of the multi-beam antenna according to a fifth embodiment of the present disclosure. As shown in FIG. 71, the multi-beam antenna is substantially the same as that in the fourth embodiment, and a difference merely lies in that there two layers of metasurfaces. The two layers of metasurfaces are spaced apart from each other by a spacing hg1. For example, hg1=3 mm.

Figure 72:
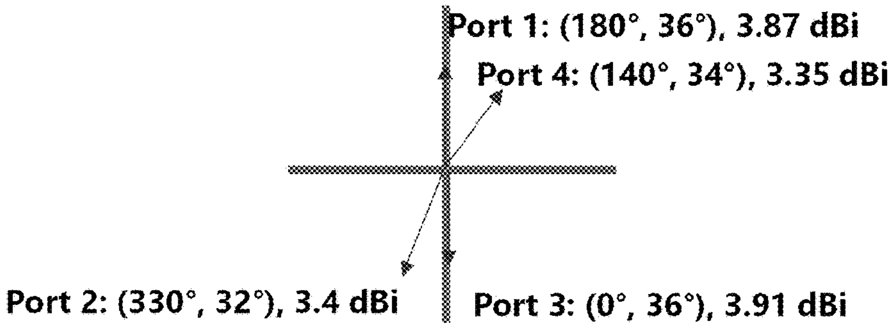
FIG. 72 is a schematic diagram showing beam directions (φ, θ) and gains obtained in accordance with a pattern simulation result of the multi-beam antenna according to the fifth embodiment of the present disclosure.
Figure 73:
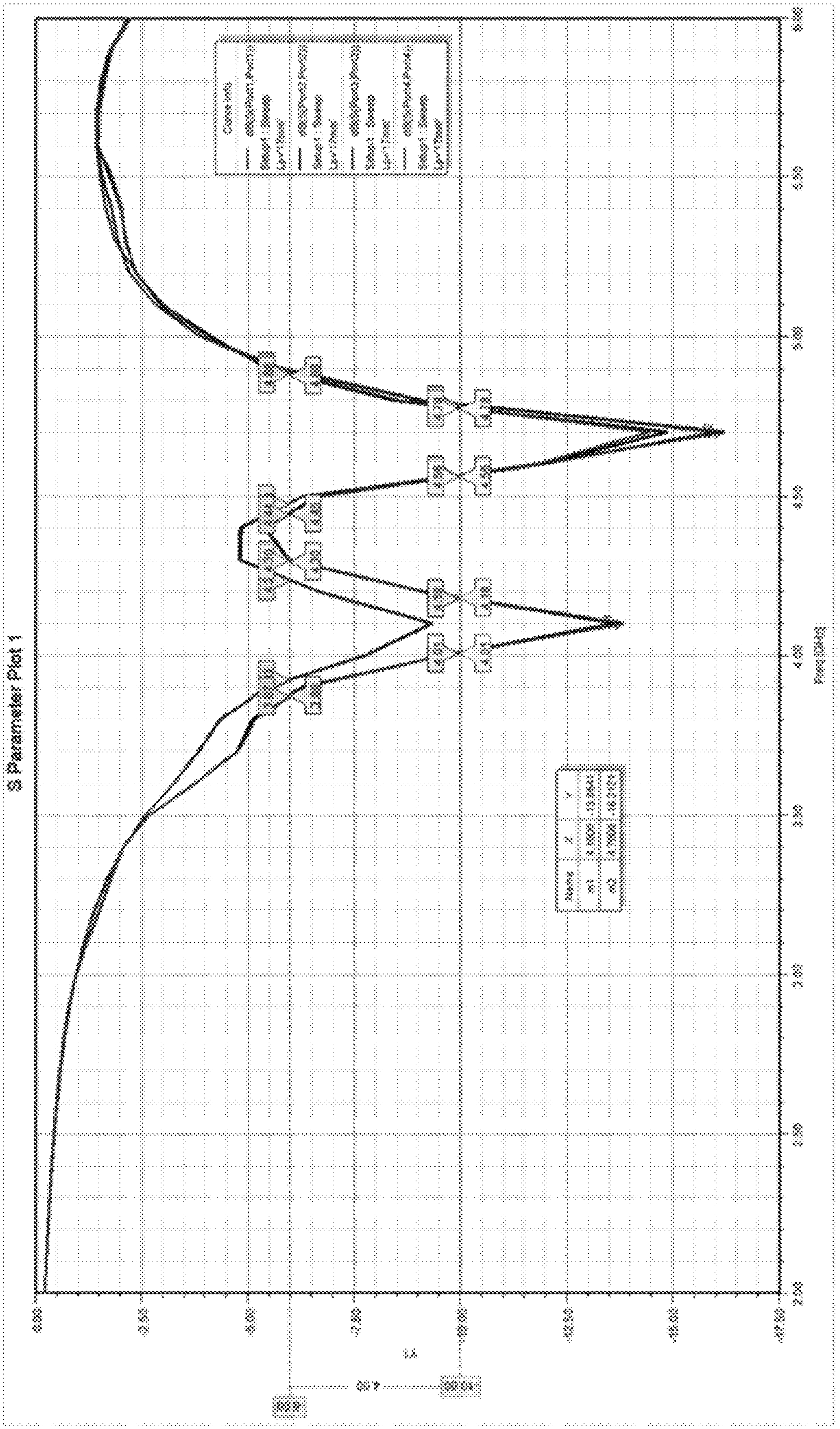
FIG. 73 is a simulation diagram of the S parameters of Port 1, Port 2, Port 3, and Port 4 of the multi-beam antenna according to the fifth embodiment of the present disclosure.
Figure 74:
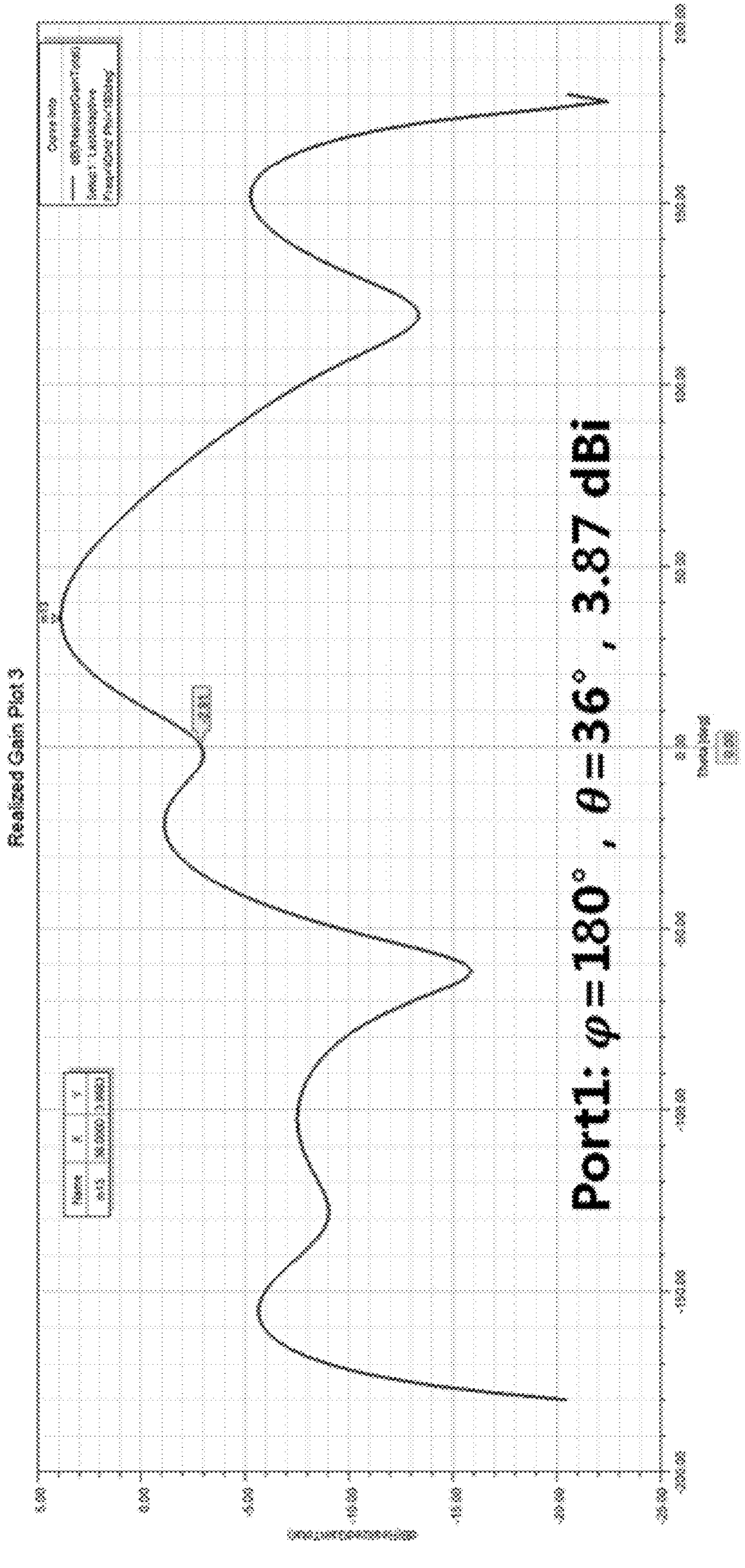
FIG. 74 is a two-dimensional simulation diagram of the multi-beam antenna when Port 1 is excited according to the fifth embodiment of the present disclosure.
Figure 75:
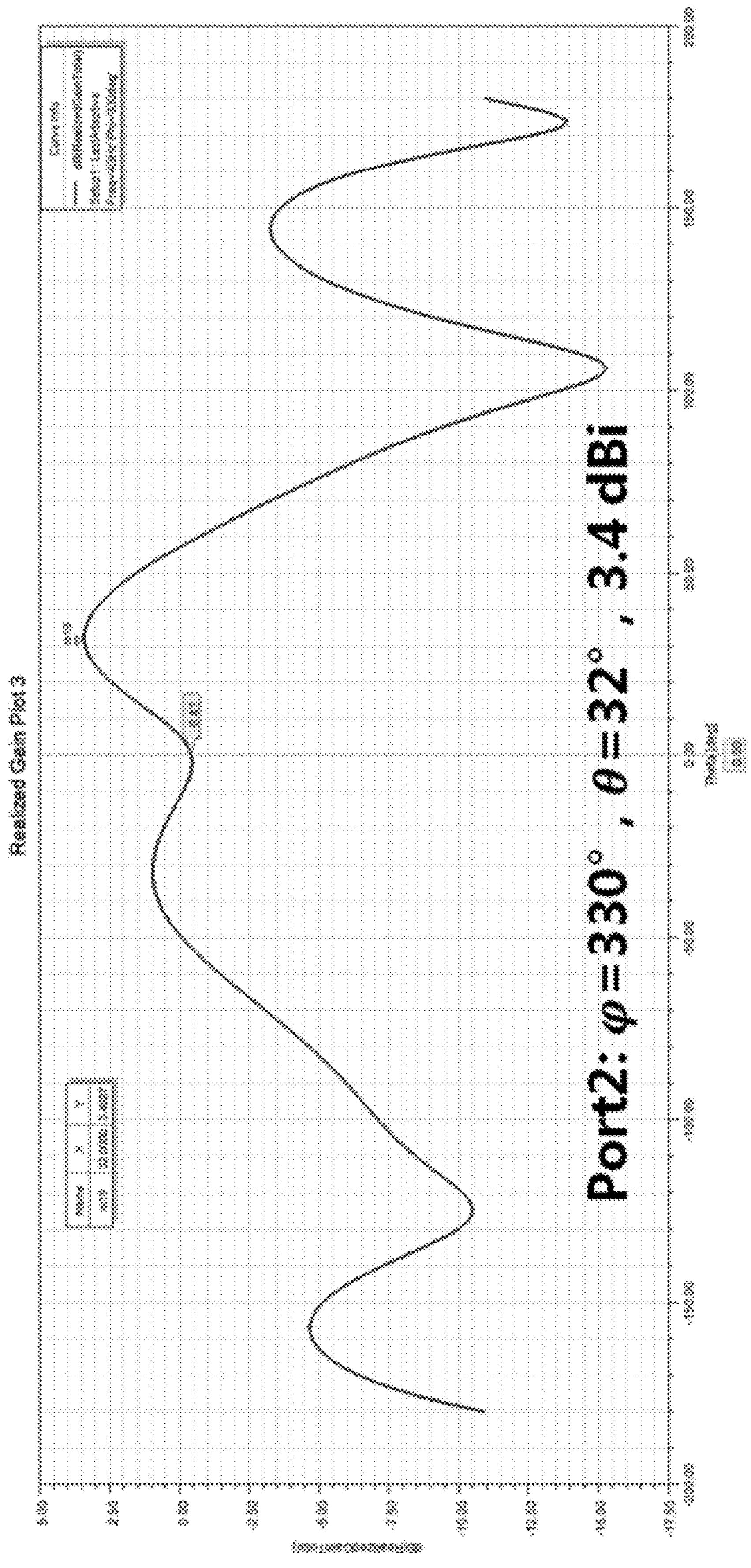
FIG. 75 is a two-dimensional simulation diagram of the multi-beam antenna when Port 2 is excited according to the fifth embodiment of the present disclosure.
Figure 76:
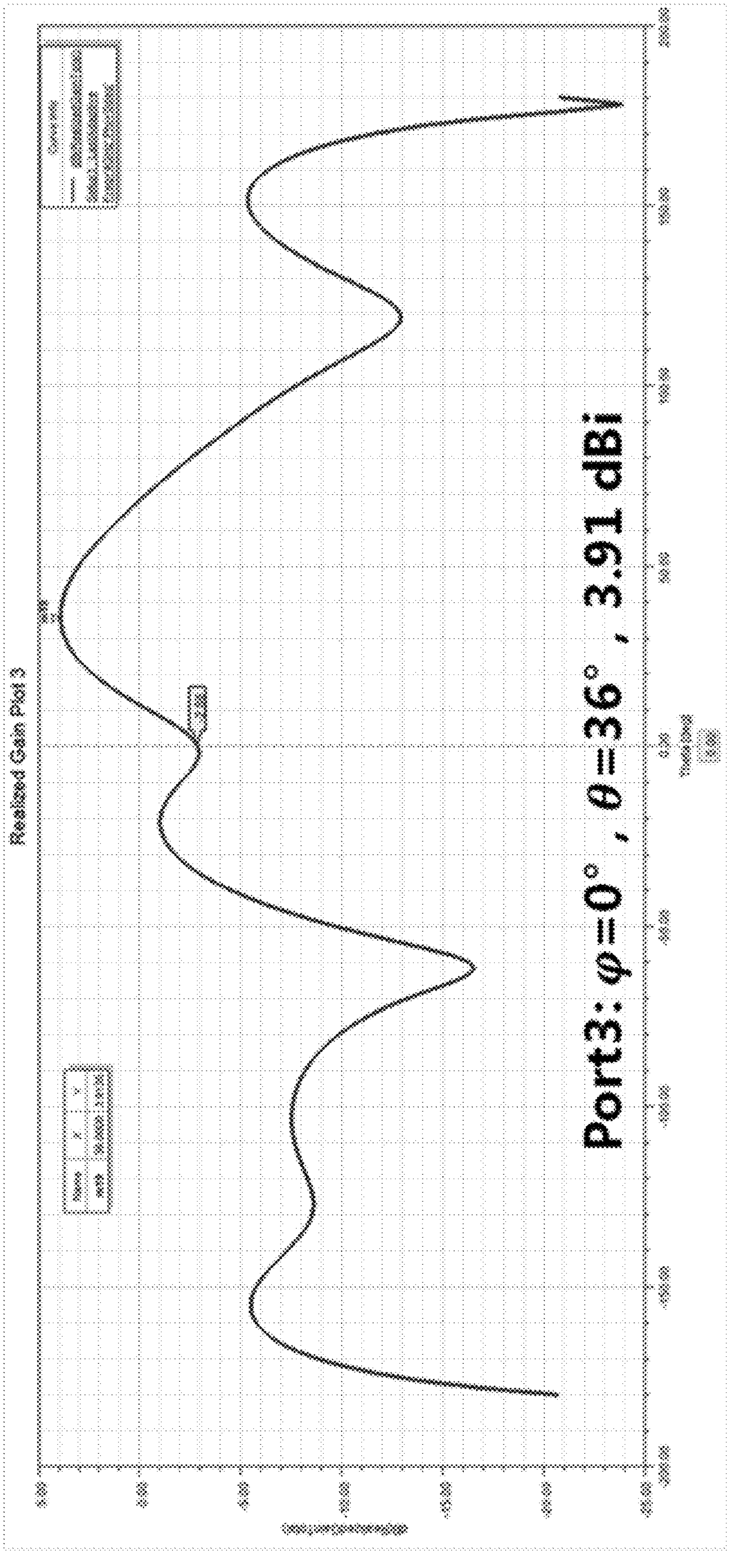
FIG. 76 is a two-dimensional simulation diagram of the multi-beam antenna when Port 3 is excited according to the fifth embodiment of the present disclosure.
Figure 77:
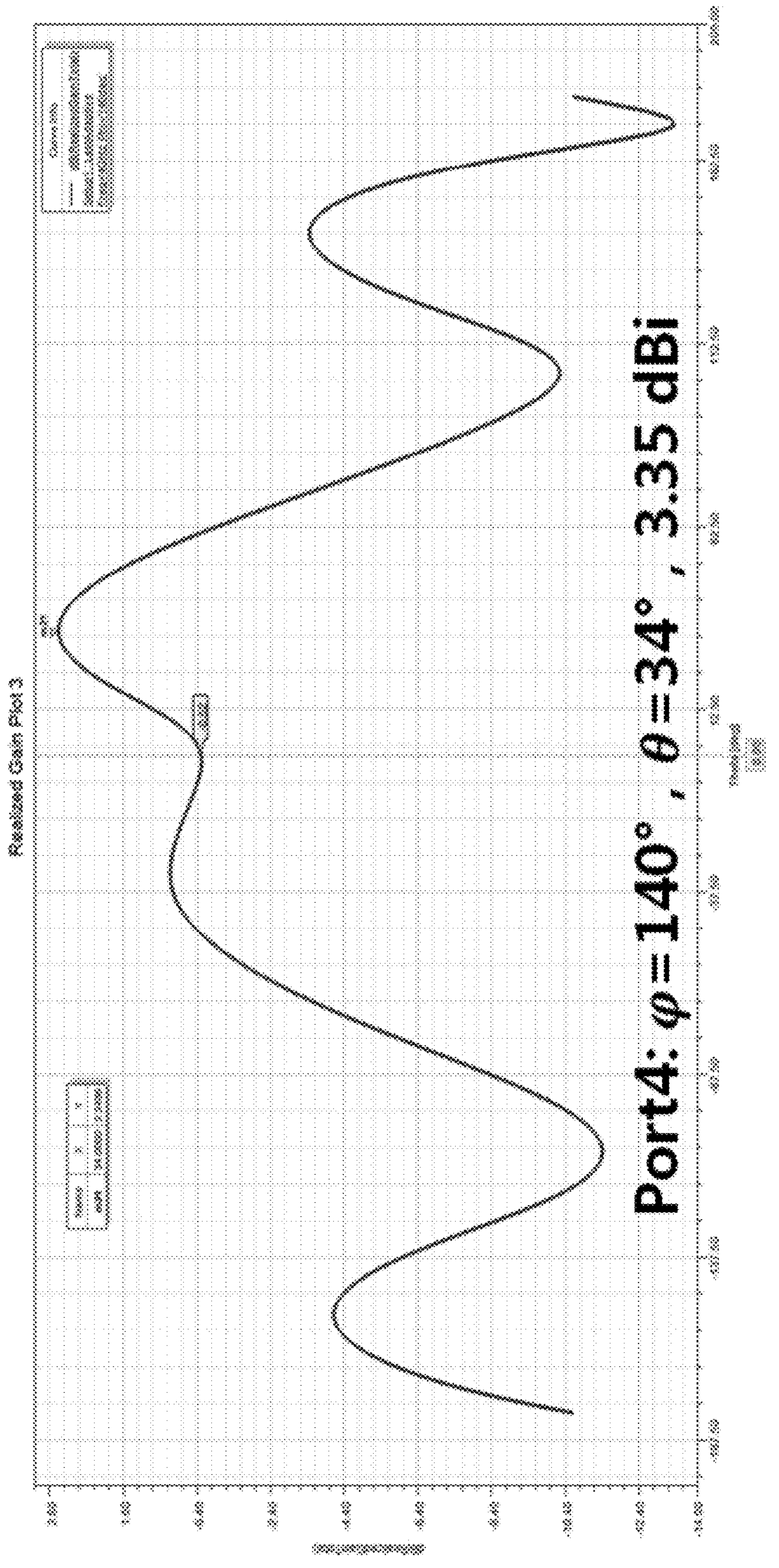
FIG. 77 is a two-dimensional simulation diagram of the multi-beam antenna when Port 4 is excited according to the fifth embodiment of the present disclosure.
Figure 78:
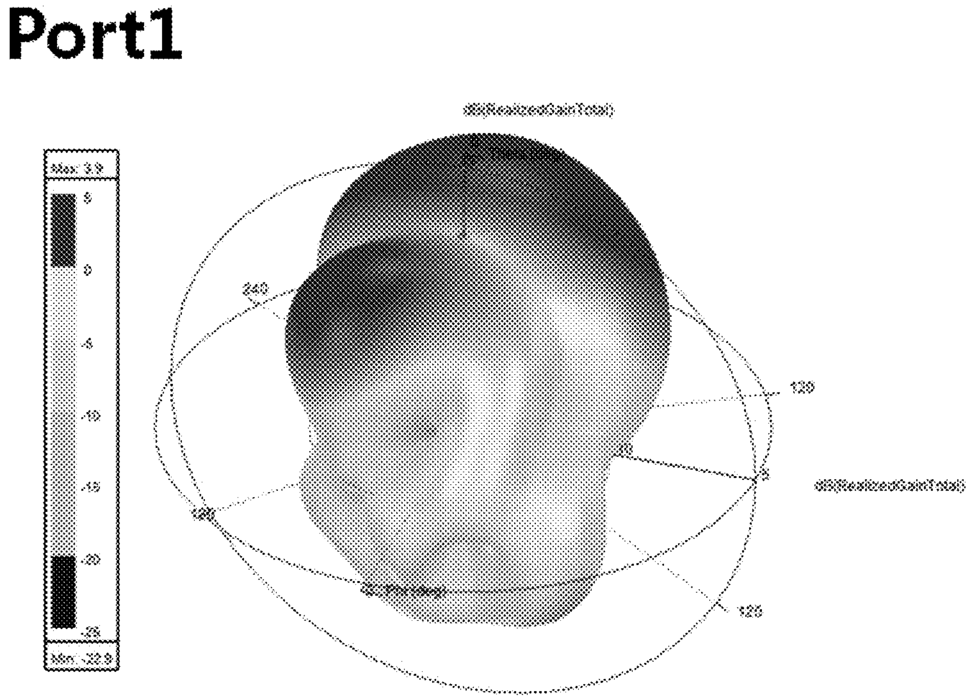
FIG. 78 is a three-dimensional simulation diagram of the multi-beam antenna when Port 1 is excited according to the fifth embodiment of the present disclosure.
Figure 79:
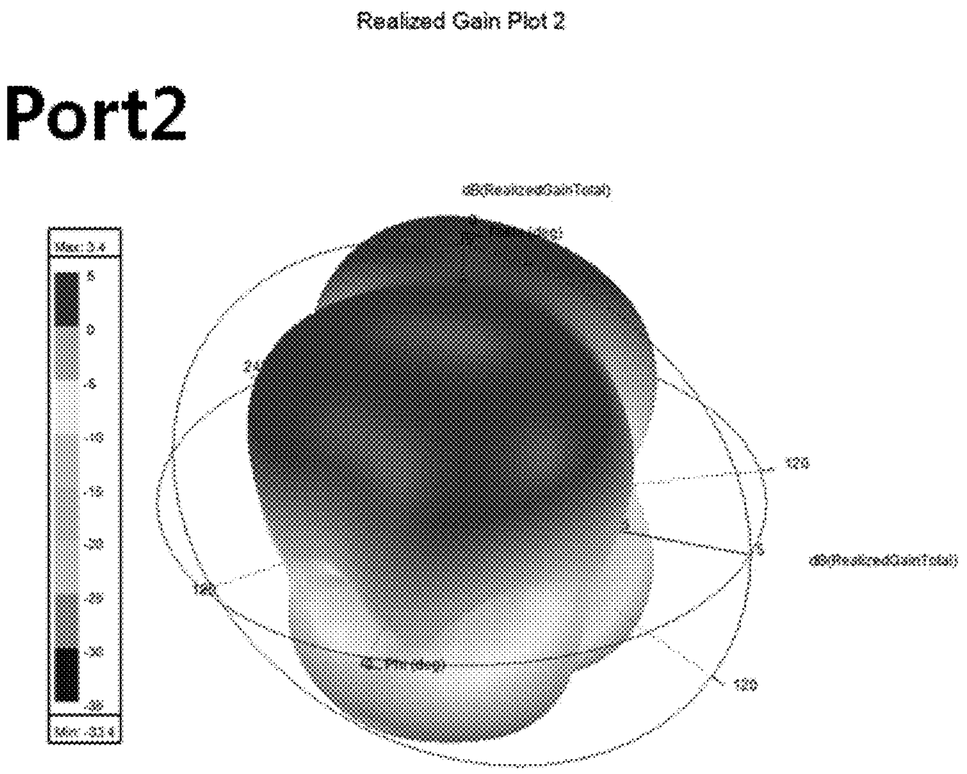
FIG. 79 is a three-dimensional simulation diagram of the multi-beam antenna when Port 2 is excited according to the fifth embodiment of the present disclosure.
Figure 80:
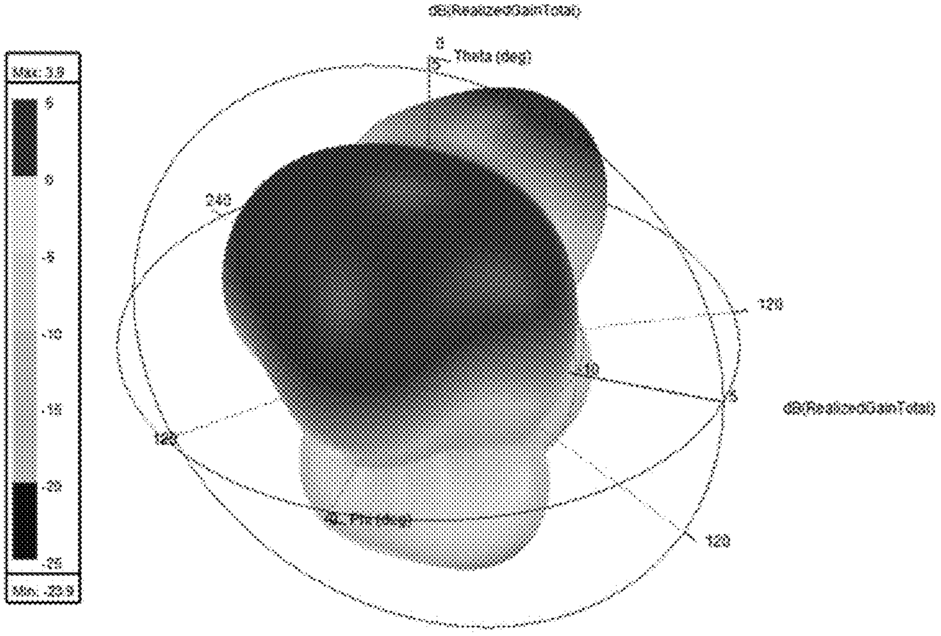
FIG. 80 is a three-dimensional simulation diagram of the multi-beam antenna when Port 3 is excited according to the fifth embodiment of the present disclosure.
Figure 81:
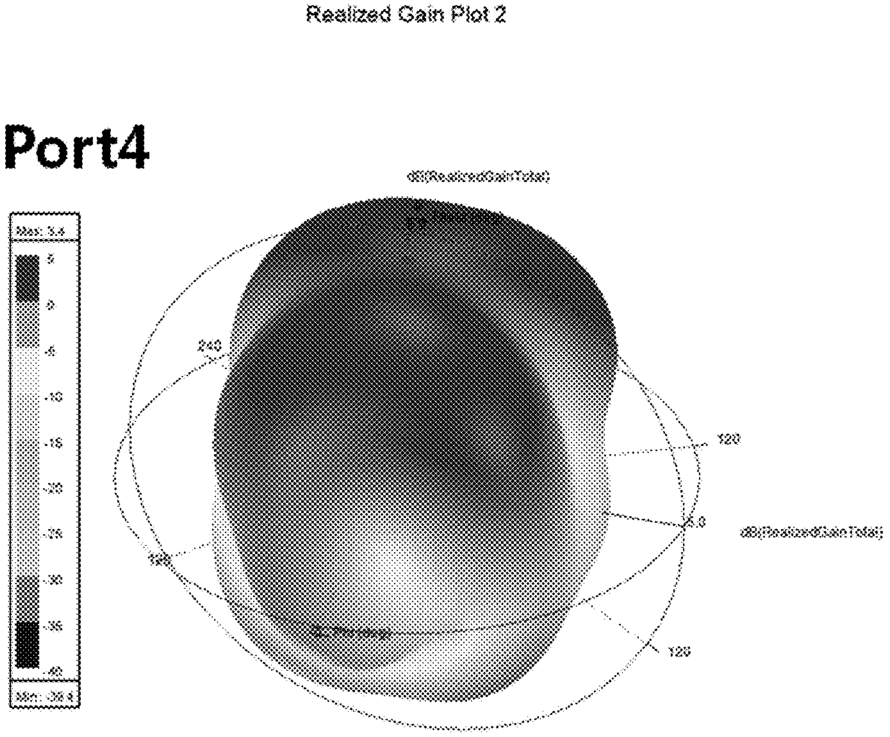
FIG. 81 is a three-dimensional simulation diagram of the multi-beam antenna when Port 4 is excited according to the fifth embodiment of the present disclosure.

When the four antenna units are each the antenna unit in FIG. 71 and the first distances for the three patch structures 221 in the patch unit 22 of each antenna unit are R1=6 mm, R2=5.1 mm and R3=2 mm, different feed ports are excited to obtain different beam directions. FIG. 72 is a schematic diagram showing beam directions (φ, θ) and gains obtained in accordance with a pattern simulation result of the multi-beam antenna according to the fifth embodiment of the present disclosure. As shown in FIG. 72, directions of the four beams are (180°, 36°), (330°, 32°), (0°, 36°), and (140°, 34°) respectively, and a maximum gain of the antenna is 3.4 dBi to 3.91 dBi. As compared with the fourth embodiment, in the fifth embodiment, the angle between two adjacent beams not pointing opposite directions is smaller. In addition, due to an additional layer of metasurface, frequency shift may be introduced, so the gain of the antenna at 4 GHz may decrease to some extent. FIG. 73 is a simulation diagram of the S parameters of Port 1, Port 2, Port 3, and Port 4 of the multi-beam antenna according to the fifth embodiment of the present disclosure, FIG. 74 is a two-dimensional simulation diagram of the multi-beam antenna when Port 1 is excited according to the fifth embodiment of the present disclosure, FIG. 75 is a two-dimensional simulation diagram of the multi-beam antenna when Port 2 is excited according to the fifth embodiment of the present disclosure, FIG. 76 is a two-dimensional simulation diagram of the multi-beam antenna when Port 3 is excited according to the fifth embodiment of the present disclosure, FIG. 77 is a two-dimensional simulation diagram of the multi-beam antenna when Port 4 is excited according to the fifth embodiment of the present disclosure, FIG. 78 is a three-dimensional simulation diagram of the multi-beam antenna when Port 1 is excited according to the fifth embodiment of the present disclosure, FIG. 79 is a three-dimensional simulation diagram of the multi-beam antenna when Port 2 is excited according to the fifth embodiment of the present disclosure, FIG. 80 is a three-dimensional simulation diagram of the multi-beam antenna when Port 3 is excited according to the fifth embodiment of the present disclosure, and FIG. 81 is a three-dimensional simulation diagram of the multi-beam antenna when Port 4 is excited according to the fifth embodiment of the present disclosure. Specific simulation results are shown in FIGS. 73 to 81.

In some embodiments of the present disclosure, regardless of the modes of the multi-beam antenna, the multi-beam antenna further includes a transceiver unit, a Radio Frequency (RF) transceiver, a signal amplifier, a power amplifier, and a filter unit. The antenna in a communication device may serve as a transmitting antenna or a receiving antenna. The transceiver unit includes a baseband and a receiving end. The baseband provides a signal on at least one frequency band, e.g., 2G signal, 3G signal, 4G signal or 5G signal, and transmits the signal to the RF transceiver. Upon the receipt of a signal, the signal is processed by the filter unit, the power amplifier, the signal amplifier and the RF transceiver, and then transmitted to the receiving end in the transceiver unit. The receiving end may be, for example, an intelligent gateway.

Further, the RF transceiver is coupled to the transceiver unit, and configured to modulate a signal from the transceiver unit, or demodulate a signal received by the antenna and then transmit the signal to the transceiver unit. Specifically, the RF transceiver includes a transmitting circuitry, a receiving circuitry, a modulation circuitry, and a demodulation circuitry. After the transmitting circuitry receives various signals from the baseband, the modulation circuitry modulates the signals and then transmit them to the antenna. The antenna receives the signal and transmits it to the receiving circuitry of the RF transceiver. The receiving circuitry transmits the signal to the demodulation circuitry. The demodulation circuitry demodulates the signal and then transmits the signal to the receiving end.

Further, the RF transceiver is coupled to the signal amplifier and the power amplifier, the signal amplifier and the power amplifier are coupled to the filter unit, and the filter unit is coupled to at least one antenna. During the transmission of a signal, the signal amplifier is configured to increase a signal-to-noise ratio of the signal from the RF transceiver and then transmit the signal to the filter unit. The power amplifier is configured to amplify power of the signal from the RF transceiver and then transmit the signal to the filter unit. The filter unit specifically includes a duplexer and a filtration circuitry. The filter unit combines the signals from the signal amplifier and the power amplifier, filters out a noise, then transmits the filtered signal to the antenna. The antenna sends the signal. During the reception of a signal, the antenna receives the signal and transmits it to the filter unit. The filter unit filters out a noise from the signal and then transmits the filtered signal to the signal amplifier and the power amplifier. The signal amplifier amplifies the signal to increase a signal-to-noise ratio. The power amplifier amplifies power of the signal. The processed signal is transmitted to the RF transceiver, and the RF transceiver transmits the signal to the transceiver unit.

In some embodiments of the present disclosure, the signal amplifier includes various signal amplifiers, e.g., a low noise amplifier, which will not be particularly defined herein.

In some embodiments of the present disclosure, the multi-beam antenna further includes a power management unit coupled to the power amplifier and configured to apply a voltage to the power amplifier for amplifying the signal.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An antenna unit, comprising:

a first dielectric substrate having a first surface and a second surface arranged opposite to the first surface;

a reference electrode layer arranged at a side of the second surface away from the first surface;

a first feed line and a radiation layer arranged at a side of the second surface away from the first surface, the first feed line being electrically coupled to the radiation layer; and at least one layer of metasurface including a second dielectric substrate and at least one patch unit, the second dielectric substrate having a third surface and a fourth surface arranged opposite to the third surface, the second surface being arranged opposite to the third surface, the patch unit being arranged at a side of the fourth surface away from the third surface, and the patch unit including a plurality of patch structures arranged at intervals and side by side, wherein for any one of the patch units, an electromagnetic wave radiated by the radiation layer has different transmission phases after passing through the plurality of patch structures, and transmission phases of the plurality of patch structures increase or decrease sequentially.

2. The antenna unit according to claim 1, wherein for any one of the patch units, an electromagnetic wave radiated by the radiation layer has an equal phase difference after passing through adjacent patch structures.

3. The antenna unit according to claim 2, wherein the patch structure includes a first sub-patch, a second sub-patch, a third sub-patch, a fourth sub-patch, a fifth sub-patch, and a sixth sub-patch;

the first sub-patch and the second sub-patch are arranged in a crosswise manner;

orthogonal projections of the third sub-patch, the fourth sub-patch, the fifth sub-patch and the sixth sub-patch onto the first dielectric substrate are all of an annular-sector shape;

each of the orthogonal projections of the third sub-patch, the fourth sub-patch, the fifth sub-patch and the sixth sub-patch onto the first dielectric substrate has a first arc edge and a second arc edge arranged opposite to the first arc edge, and the first arc edges of the orthogonal projections of the third sub-patch, the fourth sub-patch, the fifth sub-patch and the sixth sub-patch onto the first dielectric substrate are located on a same circle, and the second arc edges of orthogonal projections of the third sub-patch, the fourth sub-patch, the fifth sub-patch and the sixth sub-patch onto the first dielectric substrate are located on a same circle; and two ends of the first sub-patch are respectively coupled to the third sub-patch and the fourth sub-patch, and two ends of the second sub-patch are respectively coupled to the fifth sub-patch and the sixth sub-patch.

4. The antenna unit according to claim 2, wherein the radiation layer is formed integrally with the first feed line.

5. The antenna unit according to claim 2, wherein there is a plurality of layers of metasurfaces, a spacing is provided between adjacent metasurfaces, and the patch structures in the metasurfaces are arranged in a one-to-one manner.

6. The antenna unit according to claim 1, wherein the plurality of patch structures on the metasurface is arranged in an array form, the patch units are arranged side by side in a row direction, and the plurality of patch structures arranged side by side in the row direction has an equal transmission phase for the electromagnetic wave.

7. The antenna unit according to claim 6, wherein the patch structure includes a first sub-patch, a second sub-patch, a third sub-patch, a fourth sub-patch, a fifth sub-patch, and a sixth sub-patch;

the first sub-patch and the second sub-patch are arranged in a crosswise manner;

orthogonal projections of the third sub-patch, the fourth sub-patch, the fifth sub-patch and the sixth sub-patch onto the first dielectric substrate are all of an annular-sector shape;

each of the orthogonal projections of the third sub-patch, the fourth sub-patch, the fifth sub-patch and the sixth sub-patch onto the first dielectric substrate has a first arc edge and a second arc edge arranged opposite to the first arc edge, and the first arc edges of the orthogonal projections of the third sub-patch, the fourth sub-patch, the fifth sub-patch and the sixth sub-patch onto the first dielectric substrate are located on a same circle, and the second arc edges of orthogonal projections of the third sub-patch, the fourth sub-patch, the fifth sub-patch and the sixth sub-patch onto the first dielectric substrate are located on a same circle; and two ends of the first sub-patch are respectively coupled to the third sub-patch and the fourth sub-patch, and two ends of the second sub-patch are respectively coupled to the fifth sub-patch and the sixth sub-patch.

8. The antenna unit according to claim 6, wherein the radiation layer is formed integrally with the first feed line.

9. The antenna unit according to claim 6, wherein there is a plurality of layers of metasurfaces, a spacing is provided between adjacent metasurfaces, and the patch structures in the metasurfaces are arranged in a one-to-one manner.

10. The antenna unit according to claim 1, wherein the plurality of patch structures on the metasurface is arranged in an array form, the patch units are arranged side by side in a column direction, and the plurality of patch structures arranged side by side in the column direction has an equal transmission phase for the electromagnetic wave.

11. The antenna unit according to claim 10, wherein the patch structure includes a first sub-patch, a second sub-patch, a third sub-patch, a fourth sub-patch, a fifth sub-patch, and a sixth sub-patch;

the first sub-patch and the second sub-patch are arranged in a crosswise manner;

orthogonal projections of the third sub-patch, the fourth sub-patch, the fifth sub-patch and the sixth sub-patch onto the first dielectric substrate are all of an annular-sector shape;

each of the orthogonal projections of the third sub-patch, the fourth sub-patch, the fifth sub-patch and the sixth sub-patch onto the first dielectric substrate has a first arc edge and a second arc edge arranged opposite to the first arc edge, and the first arc edges of the orthogonal projections of the third sub-patch, the fourth sub-patch, the fifth sub-patch and the sixth sub-patch onto the first dielectric substrate are located on a same circle, and the second arc edges of orthogonal projections of the third sub-patch, the fourth sub-patch, the fifth sub-patch and the sixth sub-patch onto the first dielectric substrate are located on a same circle; and two ends of the first sub-patch are respectively coupled to the third sub-patch and the fourth sub-patch, and two ends of the second sub-patch are respectively coupled to the fifth sub-patch and the sixth sub-patch.

12. The antenna unit according to claim 10, wherein the radiation layer is formed integrally with the first feed line.

13. The antenna unit according to claim 1, wherein the patch structure includes a first sub-patch, a second sub-patch, a third sub-patch, a fourth sub-patch, a fifth sub-patch, and a sixth sub-patch;

the first sub-patch and the second sub-patch are arranged in a crosswise manner;

orthogonal projections of the third sub-patch, the fourth sub-patch, the fifth sub-patch and the sixth sub-patch onto the first dielectric substrate are all of an annular-sector shape;

each of the orthogonal projections of the third sub-patch, the fourth sub-patch, the fifth sub-patch and the sixth sub-patch onto the first dielectric substrate has a first arc edge and a second arc edge arranged opposite to the first arc edge, and the first arc edges of the orthogonal projections of the third sub-patch, the fourth sub-patch, the fifth sub-patch and the sixth sub-patch onto the first dielectric substrate are located on a same circle, and the second arc edges of orthogonal projections of the third sub-patch, the fourth sub-patch, the fifth sub-patch and the sixth sub-patch onto the first dielectric substrate are located on a same circle; and two ends of the first sub-patch are respectively coupled to the third sub-patch and the fourth sub-patch, and two ends of the second sub-patch are respectively coupled to the fifth sub-patch and the sixth sub-patch.

14. The antenna unit according to claim 13, wherein a spacing between the third sub-patch and the fifth sub-patch is a first spacing, a spacing between the third sub-patch and the sixth sub-patch is a second spacing, a spacing between the fourth sub-patch and the fifth sub-patch is a third spacing, a spacing between the fourth sub-patch and the sixth sub-patch is a fourth spacing, and values of the first spacing, the second spacing, the third spacing and the fourth spacing are equal.

15. The antenna unit according to claim 1, wherein the radiation layer is formed integrally with the first feed line.

16. The antenna unit according to claim 1, wherein there is a plurality of layers of metasurfaces, a spacing is provided between adjacent metasurfaces, and the patch structures in the metasurfaces are arranged in a one-to-one manner.

17. A multi-beam antenna, comprising a plurality of the antenna units according to claim 1, wherein at least two of the antenna units have different feed directions.

18. The multi-beam antenna according to claim 17, wherein the multi-beam antenna includes four antenna units arranged in an array form and having different feed directions.

19. The multi-beam antenna according to claim 18, wherein a coordinate system is established with a center of the multi-beam antenna as an origin, a row direction as an X-axis, a column direction as a Y-axis, and a thickness direction of the multi-beam antenna as a Z-axis; and two of the plurality antenna units arranged adjacent to each other in the row or column direction are arranged rotationally symmetrical with each other about the Z-axis.

20. The multi-beam antenna according to claim 18, wherein a coordinate system is established with a center of the multi-beam antenna as an origin, a row direction as an X-axis, a column direction as a Y-axis, and a thickness direction of the multi-beam antenna as a Z-axis; and two of the plurality antenna units arranged adjacent to each other in the row or column direction are arranged symmetrical with each other about a plane formed by the Y-axis, the origin, and the Z-axis.

* * * * *